US012029989B2

(12) United States Patent
Miller et al.

(10) Patent No.: US 12,029,989 B2
(45) **Date of Patent: *Jul. 9, 2024**

(54) CHIP RACKS INCLUDING A RACK FOR HOLDING CHIPS AND A CARD READER AND RELATED DEVICES

(71) Applicant: LNW Gaming, Inc., Las Vegas, NV (US)

(72) Inventors: Arthur C. Miller, Las Vegas, NV (US); Dean A. Isaacs, Las Vegas, NV (US); Russell D. Isaacs, Las Vegas, NV (US); William Florence, Shepherdstown, WV (US)

(73) Assignee: LNW Gaming, Inc., Las Vegas, NV (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/580,362

(22) Filed: Jan. 20, 2022

(65) Prior Publication Data

US 2022/0143490 A1 May 12, 2022

Related U.S. Application Data

(63) Continuation of application No. 16/741,703, filed on Jan. 13, 2020, now abandoned, which is a continuation of application No. 16/140,754, filed on Sep. 25, 2018, now Pat. No. 10,532,274, which is a continuation of application No. 29/569,103, filed on (Continued)

(51) Int. Cl.
*A63F 9/00* (2006.01)
*A63F 1/06* (2006.01)
*A63F 1/18* (2006.01)
*A63F 9/24* (2006.01)
(Continued)

(52) U.S. Cl.
CPC .................. *A63F 9/00* (2013.01); *A63F 1/06* (2013.01); *A63F 1/18* (2013.01); *A63F 11/0002* (2013.01); *G07F 17/32* (2013.01); *A63F 2009/2425* (2013.01); *A63F 2011/0006* (2013.01)

(58) Field of Classification Search
CPC ...... A63F 9/00; A63F 1/06; A63F 1/18; A63F 11/0002; A63F 2009/2425; A63F 2011/0006; G07F 17/32; G07F 17/322; G07F 17/3232
See application file for complete search history.

(56) References Cited

U.S. PATENT DOCUMENTS

| | | | |
|---|---|---|---|
| 233,829 | A | 11/1880 | Adt |
| 500,955 | A | 7/1893 | Rusk |

(Continued)

FOREIGN PATENT DOCUMENTS

| | | | |
|---|---|---|---|
| AU | 2003231630 | A1 | 9/2003 |
| CN | 201891317 | U | 7/2011 |

(Continued)

OTHER PUBLICATIONS

"TechArtInc" (YouTube video entitled "Tech Art Inc: MAXTime installation—For casinos that deal Blackjack" uploaded Jun. 9, 2011)(hereinafter 'MAXTime') (Year: 2011).*

(Continued)

*Primary Examiner* — Michael D Dennis

(57) ABSTRACT

Chip racks include a rack for holding chips and a card reader. Gaming devices may include such chip racks.

32 Claims, 69 Drawing Sheets

Related U.S. Application Data

Jun. 23, 2016, now Pat. No. Des. 839,965, which is a continuation-in-part of application No. 14/047,841, filed on Oct. 7, 2013, now Pat. No. 9,839,837, which is a continuation of application No. 13/452,255, filed on Apr. 20, 2012, now Pat. No. 8,567,784, which is a continuation-in-part of application No. 29/399,334, filed on Aug. 12, 2011, now Pat. No. Des. 692,068, and a continuation-in-part of application No. 29/399, 004, filed on Aug. 8, 2011, now Pat. No. Des. 692, 067, and a continuation-in-part of application No. 29/399,000, filed on Aug. 8, 2011, now Pat. No. Des. 692,066.

(51) Int. Cl.
*A63F 11/00* (2006.01)
*G07F 17/32* (2006.01)

(56) References Cited

U.S. PATENT DOCUMENTS

| | | | |
|---|---|---|---|
| 1,356,398 A | 10/1920 | Owens | |
| 1,488,025 A | 3/1924 | Poynter | |
| 1,579,276 A | 4/1926 | Birnberg | |
| 1,590,463 A | 6/1926 | Wood | |
| 1,919,922 A | 7/1933 | Baker et al. | |
| 2,046,595 A | 7/1936 | Yerkes | |
| 2,149,687 A | 3/1939 | Rivers | |
| 2,620,063 A | 12/1952 | Stanton | |
| 3,034,512 A | 5/1962 | Hunter | |
| 3,107,467 A | 10/1963 | Gates | |
| 3,165,319 A | 1/1965 | Benima | |
| 3,222,071 A | 12/1965 | Lang | |
| 3,306,462 A | 2/1967 | Da Cruz | |
| 3,312,473 A | 4/1967 | Friedman et al. | |
| 3,489,907 A | 1/1970 | Kenez | |
| 3,529,829 A | 9/1970 | Seifert | |
| 3,658,342 A | 4/1972 | Boren | |
| 3,690,670 A | 9/1972 | Cassady et al. | |
| 3,704,938 A | 12/1972 | Fanselow | |
| 3,706,874 A | 12/1972 | Lockard | |
| 3,716,238 A | 2/1973 | Porter | |
| 3,731,936 A | 5/1973 | Copeland | |
| 3,742,616 A | 7/1973 | Heller | |
| 3,743,294 A | 7/1973 | Forster | |
| 3,751,041 A | 8/1973 | Seifert | |
| 3,779,554 A | 12/1973 | Brix | |
| 3,814,436 A | 6/1974 | Boren | |
| 3,858,797 A | 1/1975 | Takeuchi | |
| 3,929,339 A | 12/1975 | Mattioli | |
| 4,026,309 A | 5/1977 | Howard | |
| D248,233 S | 6/1978 | Dibenedetto | |
| 4,146,229 A | 3/1979 | Morse | |
| D256,034 S | 7/1980 | Beaman | |
| 4,314,700 A | 2/1982 | Dylag | |
| D274,441 S | 6/1984 | Stevenson | |
| D276,442 S | 11/1984 | Holland | |
| 4,531,187 A | 7/1985 | Uhland | |
| 4,534,562 A | 8/1985 | Cuff et al. | |
| D285,858 S | 9/1986 | Ooki | |
| D285,859 S | 9/1986 | Ooki | |
| 4,667,959 A | 5/1987 | Pfeiffer et al. | |
| 4,814,589 A | 3/1989 | Storch et al. | |
| 4,822,050 A | 4/1989 | Normand et al. | |
| D303,863 S | 10/1989 | Purifoy | |
| D305,882 S | 2/1990 | Kato et al. | |
| D312,247 S | 11/1990 | Simoneaux et al. | |
| D317,951 S | 7/1991 | Miller | |
| 5,039,102 A | 8/1991 | Miller | |
| D319,825 S | 9/1991 | Andrew | |
| 5,067,713 A | 11/1991 | Soules et al. | |
| D323,490 S | 1/1992 | Jarilla-Valiente | |
| 5,110,134 A | 5/1992 | Laughlin et al. | |
| 5,166,502 A | 11/1992 | Rendleman et al. | |
| D335,751 S | 5/1993 | Johnson et al. | |
| 5,219,172 A | 6/1993 | Laughlin et al. | |
| 5,224,712 A | 7/1993 | Laughlin et al. | |
| 5,283,422 A | 2/1994 | Storch et al. | |
| 5,312,104 A | 5/1994 | Miller | |
| 5,362,053 A * | 11/1994 | Miller | A63F 1/18 273/304 |
| 5,364,106 A | 11/1994 | Laughlin et al. | |
| 5,374,061 A | 12/1994 | Albrecht | |
| 5,437,174 A | 8/1995 | Aydin | |
| 5,451,054 A | 9/1995 | Orenstein | |
| 5,531,331 A | 7/1996 | Barnett | |
| 5,574,309 A | 11/1996 | Papapietro et al. | |
| 5,651,548 A | 7/1997 | French et al. | |
| 5,669,816 A | 9/1997 | Garczynski et al. | |
| 5,681,039 A | 10/1997 | Miller | |
| 5,722,893 A | 3/1998 | Hill et al. | |
| 5,757,876 A | 5/1998 | Dam et al. | |
| 5,772,505 A | 6/1998 | Garczynski et al. | |
| 5,779,546 A | 7/1998 | Meissner et al. | |
| 5,781,647 A | 7/1998 | Fishbine et al. | |
| 5,809,482 A | 9/1998 | Strisower | |
| 5,933,244 A | 8/1999 | Kiritchenko | |
| 5,941,769 A | 8/1999 | Order | |
| 5,961,121 A | 10/1999 | Brown | |
| D417,059 S | 11/1999 | Richter | |
| 6,039,650 A | 3/2000 | Hill | |
| 6,126,166 A | 10/2000 | Lorson et al. | |
| 6,254,484 B1 | 7/2001 | McCrea, Jr. | |
| 6,267,671 B1 * | 7/2001 | Hogan | G06Q 30/02 463/25 |
| 6,299,536 B1 | 10/2001 | Hill | |
| 6,313,871 B1 | 11/2001 | Schubert | |
| 6,346,044 B1 | 2/2002 | McCrea, Jr. | |
| 6,431,984 B2 | 8/2002 | Coyer et al. | |
| 6,460,848 B1 | 10/2002 | Soltys et al. | |
| 6,514,140 B1 | 2/2003 | Storch | |
| 6,517,435 B2 | 2/2003 | Soltys et al. | |
| 6,517,436 B2 | 2/2003 | Soltys et al. | |
| 6,520,857 B2 | 2/2003 | Soltys et al. | |
| 6,527,271 B2 | 3/2003 | Soltys et al. | |
| 6,530,836 B2 | 3/2003 | Soltys et al. | |
| 6,532,297 B1 | 3/2003 | Lindquist | |
| 6,533,276 B2 | 3/2003 | Soltys et al. | |
| 6,567,159 B1 | 5/2003 | Corech | |
| 6,579,180 B2 | 6/2003 | Soltys et al. | |
| 6,595,857 B2 | 7/2003 | Soltys et al. | |
| 6,609,710 B1 | 8/2003 | Order | |
| 6,619,662 B2 | 9/2003 | Miller | |
| 6,626,750 B2 | 9/2003 | Momeny | |
| D481,519 S | 10/2003 | Lee | |
| 6,629,889 B2 | 10/2003 | Mothwurf | |
| 6,638,161 B2 * | 10/2003 | Soltys | A63F 1/18 273/138.2 |
| D482,735 S | 11/2003 | Evans | |
| 6,651,985 B2 | 11/2003 | Sines et al. | |
| 6,652,379 B2 | 11/2003 | Soltys et al. | |
| 6,663,490 B2 | 12/2003 | Soltys et al. | |
| 6,685,568 B2 | 2/2004 | Soltys et al. | |
| 6,688,979 B2 | 2/2004 | Soltys et al. | |
| 6,712,696 B2 | 3/2004 | Soltys et al. | |
| 6,758,751 B2 | 7/2004 | Soltys et al. | |
| 6,845,905 B2 | 1/2005 | Blad et al. | |
| 6,848,994 B1 | 2/2005 | Knust et al. | |
| 6,857,961 B2 | 2/2005 | Soltys et al. | |
| 6,964,612 B2 | 11/2005 | Soltys et al. | |
| 6,991,544 B2 | 1/2006 | Soltys et al. | |
| 7,011,309 B2 | 3/2006 | Soltys et al. | |
| 7,029,009 B2 | 4/2006 | Grauzer et al. | |
| D522,511 S | 6/2006 | Sekou | |
| D526,760 S | 8/2006 | Fraser | |
| D540,391 S | 4/2007 | Irie | |
| D541,004 S | 4/2007 | Berg | |
| 7,255,642 B2 | 8/2007 | Sines et al. | |
| 7,278,923 B2 | 10/2007 | Grauzer et al. | |
| 7,316,615 B2 | 1/2008 | Soltys et al. | |
| 7,374,170 B2 | 5/2008 | Grauzer et al. | |
| 7,390,256 B2 | 6/2008 | Soltys et al. | |

(56) References Cited

U.S. PATENT DOCUMENTS

| | | | | |
|---|---|---|---|---|
| 7,694,968 | B2 * | 4/2010 | Sims, Jr. | G02B 27/022 273/148 R |
| 7,717,427 | B2 | 5/2010 | Grauzer et al. | |
| 7,753,781 | B2 | 7/2010 | Storch | |
| 7,775,887 | B2 | 8/2010 | Kuhn et al. | |
| 7,780,512 | B2 | 8/2010 | Sines et al. | |
| 7,803,051 | B2 | 9/2010 | Kuhn et al. | |
| 7,933,448 | B2 | 4/2011 | Downs, III | |
| 8,118,305 | B2 | 2/2012 | Grauzer et al. | |
| 8,142,271 | B2 | 3/2012 | Kuhn et al. | |
| D657,427 | S * | 4/2012 | Gelinotte | G07G 1/009 D21/392 |
| 8,287,386 | B2 | 10/2012 | Miller et al. | |
| 8,387,987 | B2 | 3/2013 | Snow et al. | |
| 8,398,084 | B2 | 3/2013 | Hall | |
| D680,537 | S | 4/2013 | Miller et al. | |
| D690,895 | S | 10/2013 | Knox, Jr. | |
| D692,066 | S | 10/2013 | Miller et al. | |
| D692,067 | S | 10/2013 | Miller et al. | |
| D692,068 | S | 10/2013 | Miller et al. | |
| 8,567,784 | B2 | 10/2013 | Miller et al. | |
| 8,668,148 | B2 | 3/2014 | Gronau et al. | |
| D714,877 | S | 10/2014 | Kneitel | |
| 9,421,451 | B2 * | 8/2016 | Laughlin | A63F 1/18 |
| D844,045 | S | 3/2019 | Umeda | |
| D844,048 | S | 3/2019 | Abe et al. | |
| 2002/0086727 | A1 | 7/2002 | Soltys et al. | |
| 2002/0155869 | A1 | 10/2002 | Soltys et al. | |
| 2002/0165029 | A1 | 11/2002 | Soltys et al. | |
| 2003/0220136 | A1 | 11/2003 | Soltys et al. | |
| 2004/0219975 | A1 | 11/2004 | Soltys et al. | |
| 2005/0239542 | A1 | 10/2005 | Olsen | |
| 2005/0258597 | A1 | 11/2005 | Soltys et al. | |
| 2005/0282623 | A1 | 12/2005 | Matsuno et al. | |
| 2006/0019739 | A1 | 1/2006 | Soltys et al. | |
| 2006/0063577 | A1 | 3/2006 | Downs et al. | |
| 2006/0199649 | A1 | 9/2006 | Soltys et al. | |
| 2007/0026949 | A1 | 2/2007 | Charlier et al. | |
| 2007/0240462 | A1 | 10/2007 | James et al. | |
| 2009/0121428 | A1 | 5/2009 | Markov | |
| 2009/0191933 | A1 | 7/2009 | French | |
| 2009/0291762 | A1 | 11/2009 | Walker | |
| 2012/0241344 | A1 * | 9/2012 | Gronau | G07F 7/0893 206/445 |
| 2013/0099444 | A1 | 4/2013 | Miller | |
| 2013/0292901 | A1 | 11/2013 | Kneitel | |

FOREIGN PATENT DOCUMENTS

| | | | |
|---|---|---|---|
| DE | 1039429 | B | 9/1958 |
| DE | 3524641 | A1 | 1/1987 |
| DE | 3807127 | A1 | 9/1989 |
| EP | 0310516 | A1 | 4/1989 |
| FR | 1356398 | A | 3/1964 |
| FR | 2109213 | A5 | 5/1972 |
| FR | 2186839 | A5 | 1/1974 |
| FR | 2427107 | A1 | 12/1979 |
| FR | 2576518 | A1 | 8/1986 |
| GB | 2061490 | A | 5/1981 |
| WO | 99/42186 | A1 | 8/1999 |
| WO | 01/20489 | A1 | 3/2001 |
| WO | 2002/068074 | A2 | 9/2002 |
| WO | 2008/078169 | A2 | 7/2008 |

OTHER PUBLICATIONS

"Magellan Technology, MARS-24 Multi Antenna Reader System Product Brief, pp. 1-2" (Year: 2007).*

Casino Del Mar (YouTube video uploaded by @Gamenetincproduction on Dec. 20, 2010 at https://www.youtube.com/watch?v=WPYQ27GjFKc) (Year: 2010).*

Casino Industry products—Casino Chip Trays [Viewed on internet on Jun. 28, 2016] http://web.archive.org/web/20120418234345/http://www.servicecentralinc.com/casino-industry-products.htm; Published on Apr. 8, 2012 as per Wayback Machine.

Poker Table Supplies & Hardware [Viewed on internet on Jun. 28, 2016] http://web.archive.org/web/20111223215654/http://www.ryeparkpoker.com/table-parts/poker-table-hardware.htm; Published on Dec. 26, 2007 as per Wayback Machine.

* cited by examiner

CHIP RACKS INCLUDING A RACK FOR HOLDING CHIPS AND A CARD READER AND RELATED DEVICES

CROSS-REFERENCE TO RELATED APPLICATIONS

This application is a continuation of U.S. patent application Ser. No. 16/741,703, filed Jan. 13, 2020, which is a continuation of U.S. patent application Ser. No. 16/140,754, filed Sep. 25, 2018, now U.S. Pat. No. 10,532,274, issued Jan. 14, 2020, titled CHIP RACKS INCLUDING A RACK FOR HOLDING CHIPS AND A CARD READER AND RELATED DEVICES, which is a utility continuation application of U.S. Design patent application Ser. No. 29/569,103, filed Jun. 23, 2016, now U.S. Design Pat. D839,965, issued Feb. 5, 2019, titled CHIP RACKS, which is a continuation-in-part of U.S. patent application Ser. No. 14/047,841, filed Oct. 7, 2013, now U.S. Pat. No. 9,839,837, issued Dec. 12, 2017, titled INTEGRATED BLACKJACK HOLE CARD READERS AND CHIP RACKS, AND IMPROVED COVERS FOR CHIP RACKS, which is a continuation of U.S. patent application Ser. No. 13/452,255, filed Apr. 20, 2012, now U.S. Pat. No. 8,567,784, issued Oct. 29, 2013, titled INTEGRATED BLACKJACK HOLE CARD READERS AND CHIP RACKS, AND IMPROVED COVERS FOR CHIP RACKS, which is a continuation-in-part of the following: U.S. Design patent application ser. No. 29/399,334 filed Aug. 12, 2011, now U.S. Design Patent D692,068, issued Oct. 22, 2013, titled MODIFIED CHIP RACK WITH INTEGRATED HOLE CARD READER; of U.S. Design patent application Ser. No. 29/399,004, filed Aug. 8, 2011, now U.S. Design Patent D692,067, issued Oct. 22, 2013, titled CHIP RACK WITH INTEGRATED HOLE CARD READER; and of U.S. Design application Ser. No. 29/399,000, filed Aug. 8, 2011, now U.S. Design Patent D692,066, issued Oct. 22, 2013, titled CHIP RACK WITH INTEGRATED HOLE CARD READER; the disclosure of each of which is hereby incorporated herein in its entirety by this reference.

TECHNICAL FIELD

Embodiments of the disclosure relate generally to table wager games where chips are used, and, more particularly, to apparatus used for storing such chips having devices associated therewith for reading the hole card of a blackjack dealer during the game of "21."

BACKGROUND

The game of blackjack, or "21," is played in gambling casinos, private clubs and homes throughout the world. It is the most widely played table game in the world. A conventional gaming table used for playing blackjack has a plurality of player locations around the outer periphery of the table, and a dealer location located generally opposite the player locations. From the dealer's location, the dealer effects the operation of the game, including dealing of the cards, paying winning wagers and collecting losing wagers.

An important function of the dealer in modern day blackjack is to utilize a hole card reader ("reader") which is associated with most commercial blackjack tables adjacent the dealer position. One such reader in use today employs a refractive or reflective element located beneath the playing surface of the table which the dealer uses to read a portion of the hole, or down, card in the dealer's dealt hand to determine if the dealer has twenty-one when the up-facing card initially dealt to the dealer is an ace or has a value of ten. One such reader is disclosed in U.S. Pat. No. 5,681,039. In that patent, an "optical" type reader is disclosed in which, in one embodiment, an optical quality prism is associated with a housing. The reader defines an aperture over which is adapted to be placed the portion of the dealer's down card to be read when the dealer's up facing card is an ace or has a value of ten. If the dealer determines that he or she has blackjack upon the initial deal, the hand is called, thus resulting in increased hands per hour.

Heretofore, blackjack hole card readers have been installed in a special cutout created in the blackjack table at a location between the standard chip rack and the player positions. This has required the creation of an aperture in the table surface and felt covering ("layout") over the table, adding unnecessarily to the time to construct the table and/or retrofit the table to accommodate the hole card reader.

It would be advantageous to integrate the reader, whatever type of reader it may be (e.g. optical or digital), with the chip rack, so that the reader and the chip rack form a substantially integral unit which occupies the location in which the chip rack alone has heretofore been placed.

In addition, chip racks are typically provided with a locking cover to avoid the theft of chips when the chip rack is not being used but contains gambling chips. Heretofore, such covers are attached to the chip rack, or the table, or both, using a single locking mechanism, located centrally of one side edge of the cover. The use of a single locking connection has led to the opportunity to bend one or more corners of the cover away from the chip rack to permit unauthorized access to the contents of the chip rack. Therefore, it would be desirable to provide a fortified locking mechanism for chip rack covers.

BRIEF SUMMARY

One aspect of this disclosure is directed generally to the integration of blackjack hole card readers and chip racks. In one embodiment, a chip rack of standard configuration is provided, and defines a recess or opening into which the reader can be mounted. In other embodiments, the chip rack and reader are manufactured as a single unit. Numerous other structures for accomplishing the purposes of the disclosure are also contemplated.

A modified chip rack cover locking assembly is disclosed as well. In one such embodiment, a single locking device is associated with the cover, but two or more connections are made with the chip rack or gaming table so as to fortify the connection between the cover of the chip rack and the chip rack itself. Alternatively, two or more locking mechanisms may be employed.

DETAILED DESCRIPTION

Figure 1:
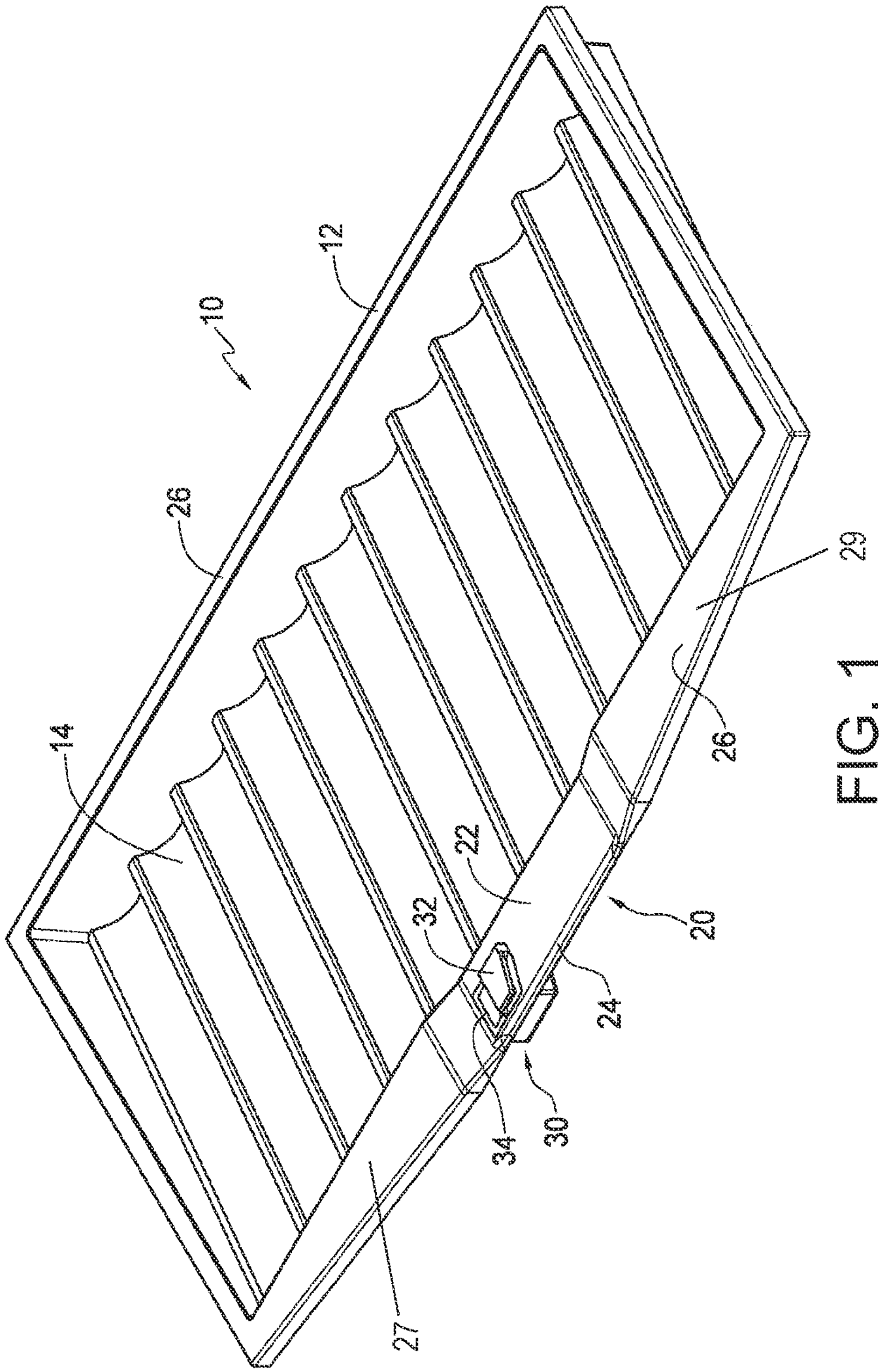
FIG. 1 is a left front perspective view of a first embodiment of an integrated blackjack hole card reader and chip rack.
Figure 2:
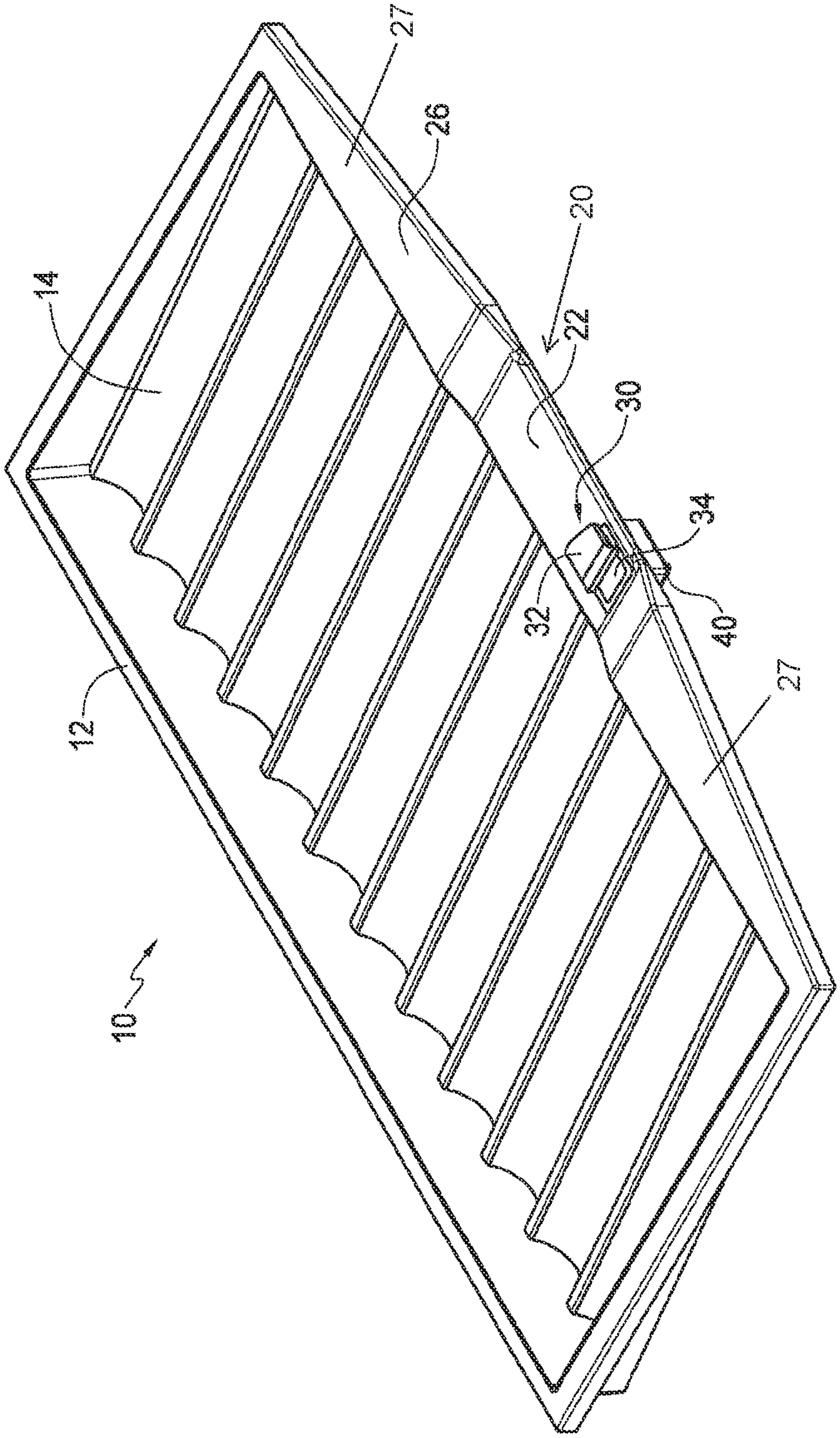
FIG. 2 is a right front perspective view thereof.
Figure 3:
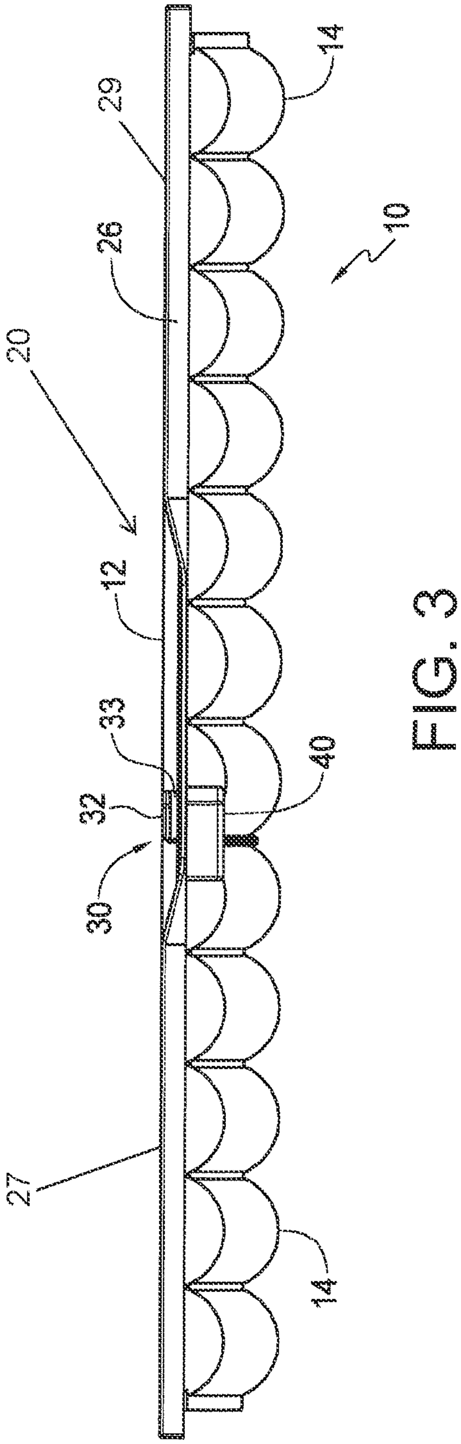
FIG. 3 is a front elevational view thereof.
Figure 4:
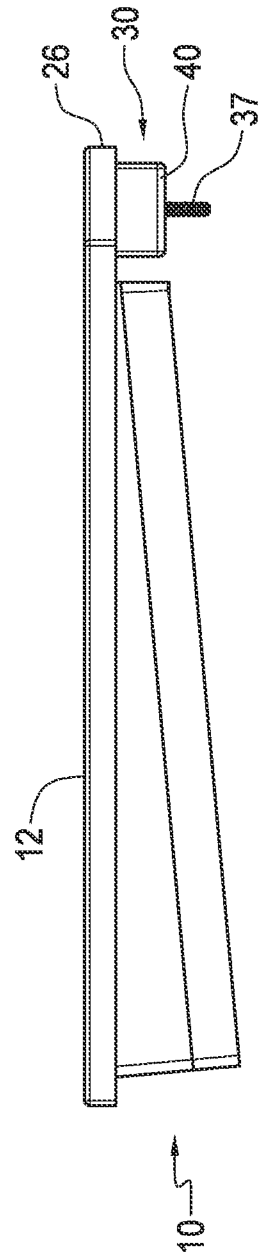
FIG. 4 is a right side elevational; view thereof.
Figure 5:
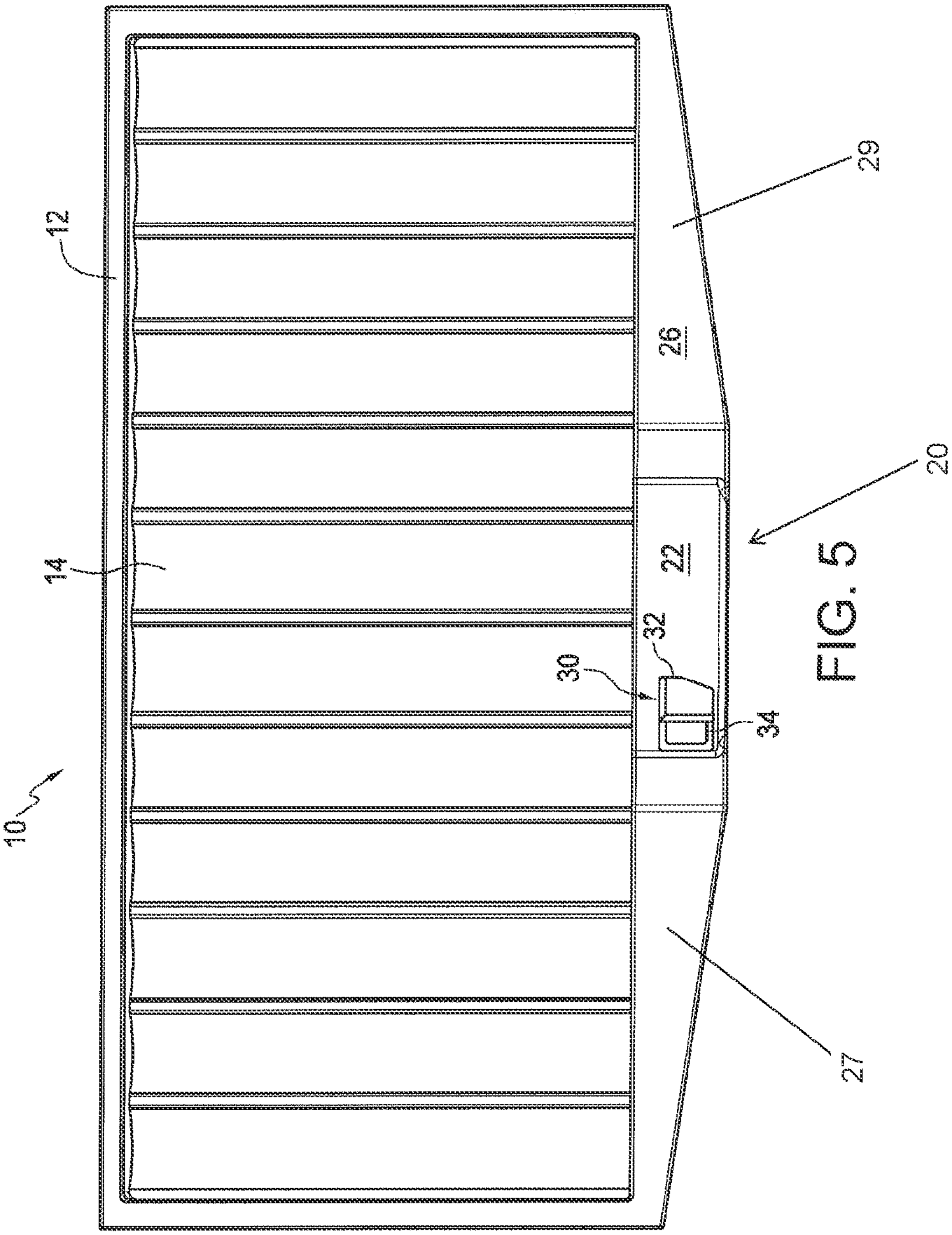
FIG. 5 is a top plan view thereof.
Figure 6:
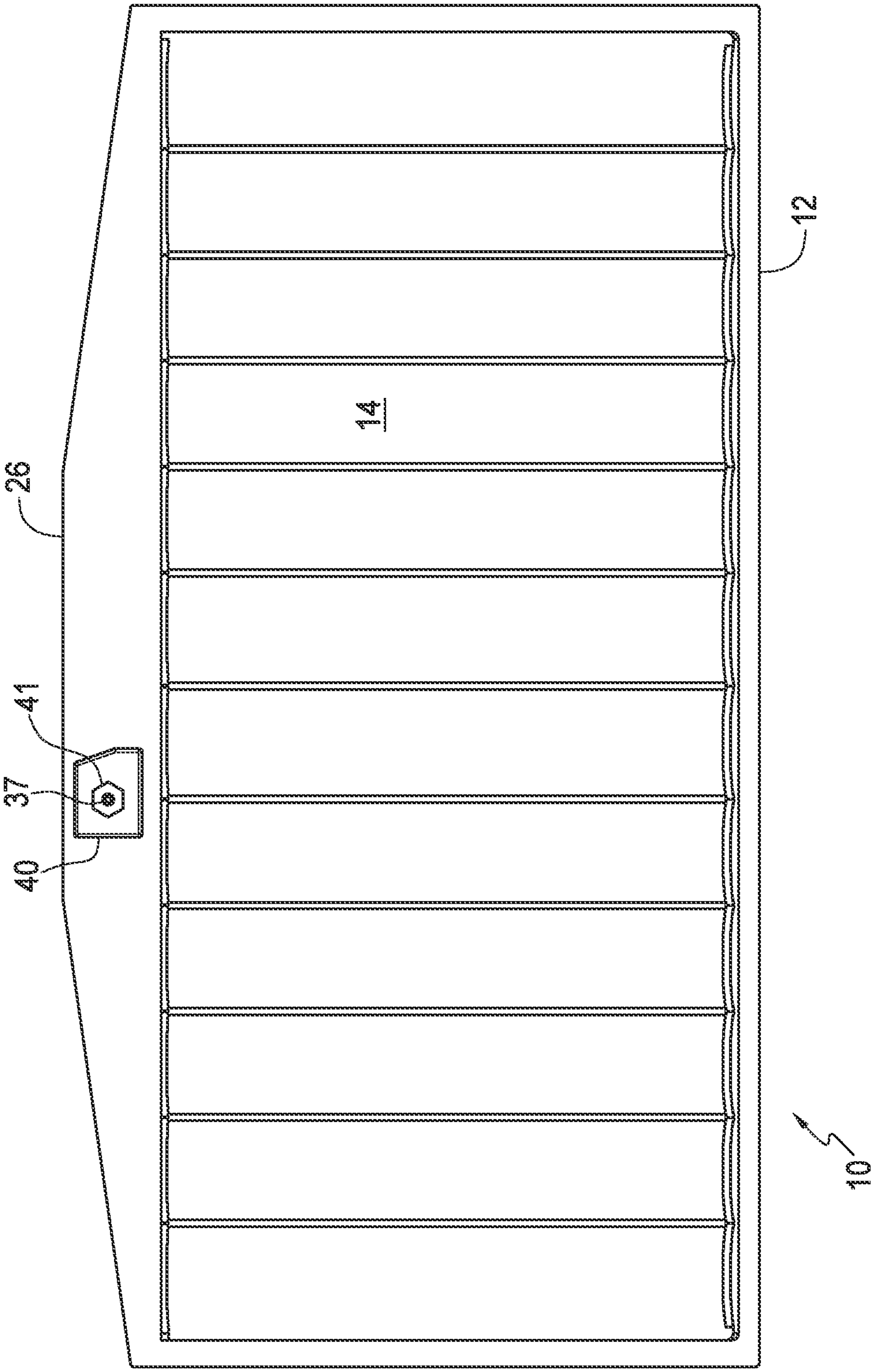
FIG. 6 is a bottom plan view thereof.
Figure 7:
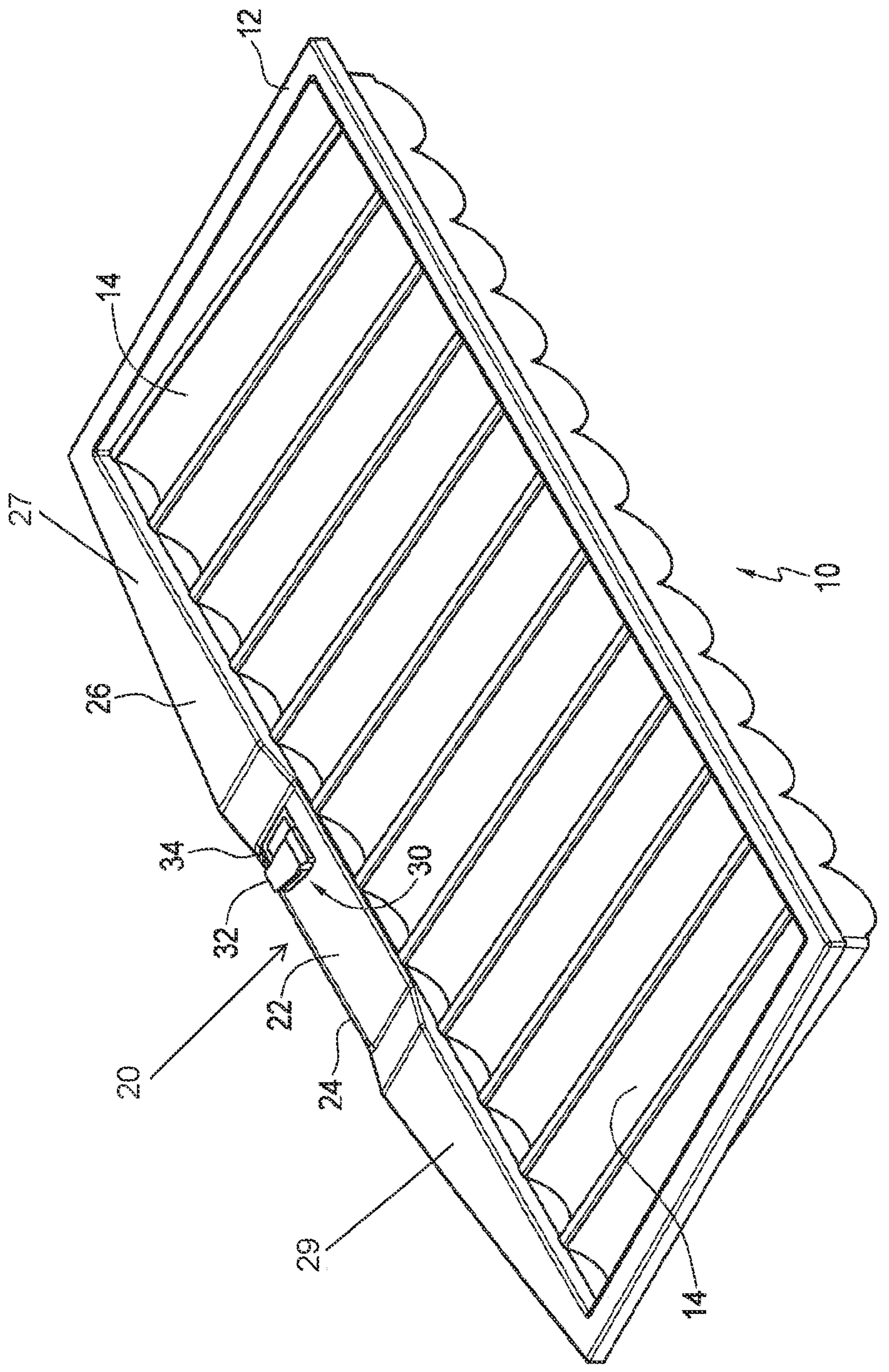
FIG. 7 is a left rear perspective view thereof.
Figure 8:
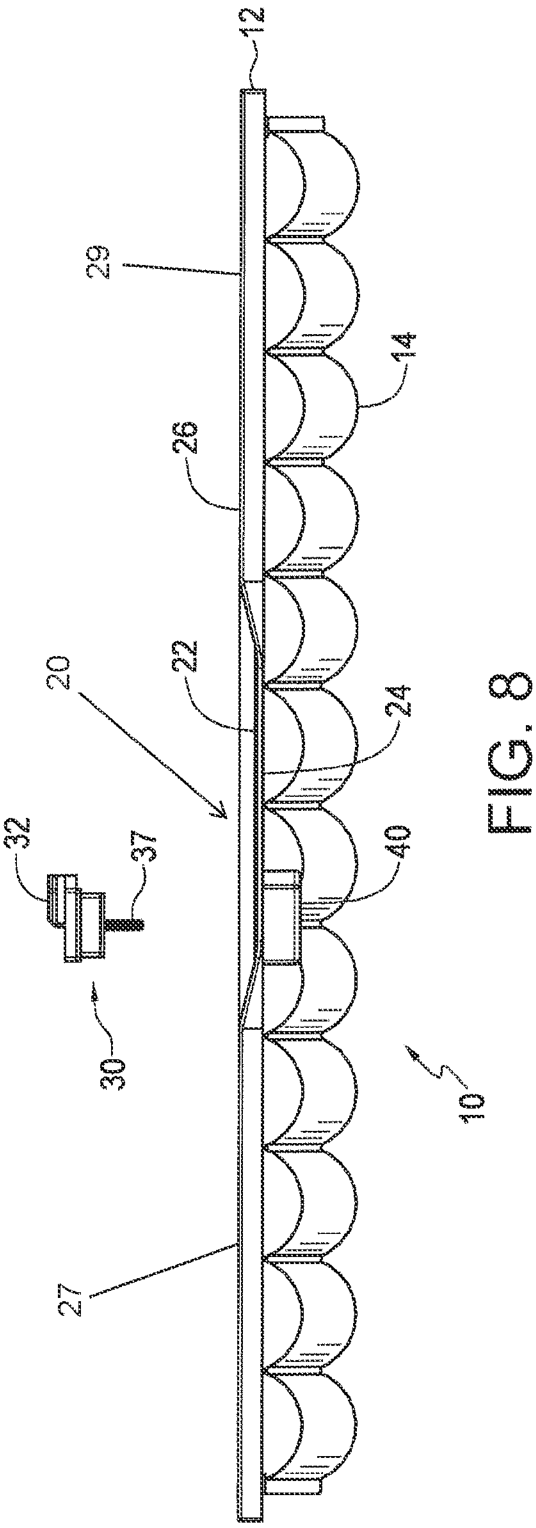
FIG. 8 is a front elevational partially exploded view thereof.
Figure 9:
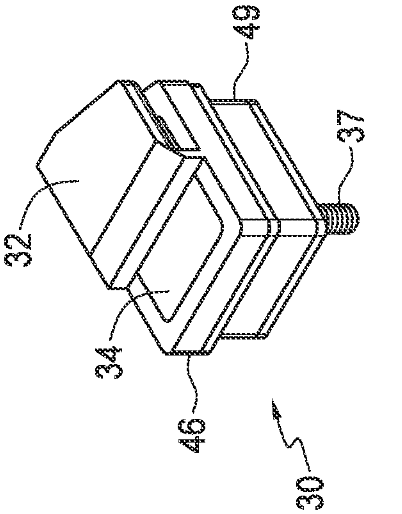
FIG. 9 is a right front assembled perspective view of a card reader suitable for use with the disclosure.
Figure 10:
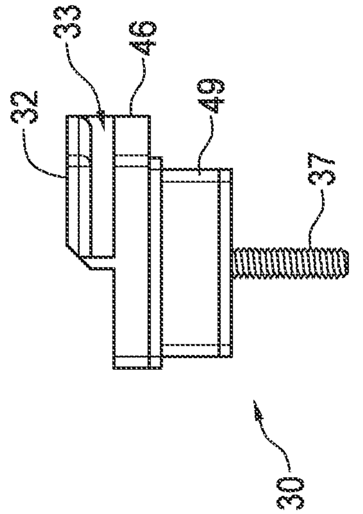
FIG. 10 is a front assembled elevational view thereof.
Figure 11:
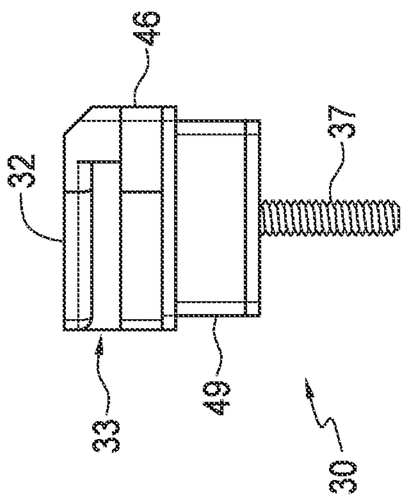
FIG. 11 is a left side assembled elevational view thereof.
Figure 12:
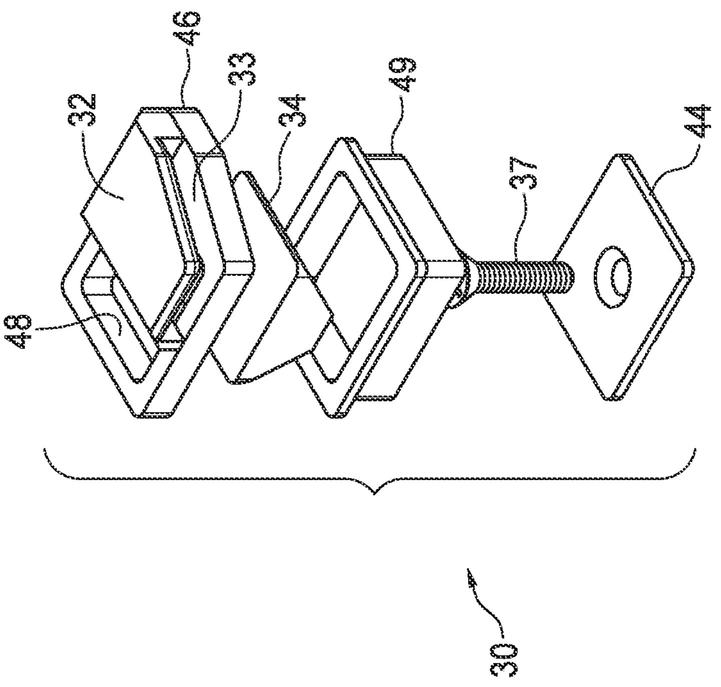
FIG. 12 is a left front exploded perspective view thereof.
Figure 13:
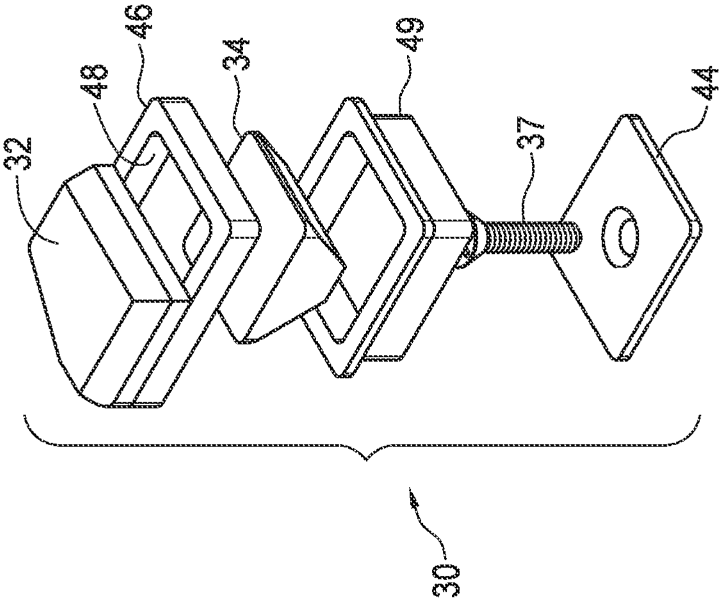
FIG. 13 is a right rear exploded perspective view thereof.
Figure 14:
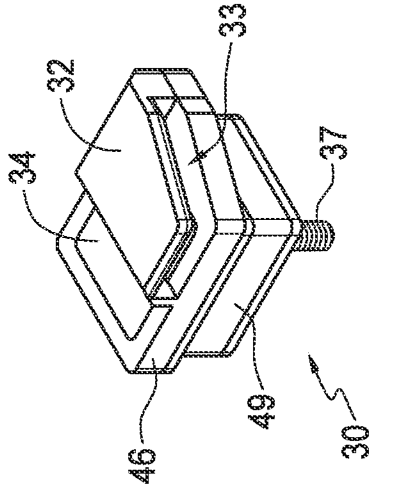
FIG. 14 is a left front assembled perspective view thereof.
Figure 15:
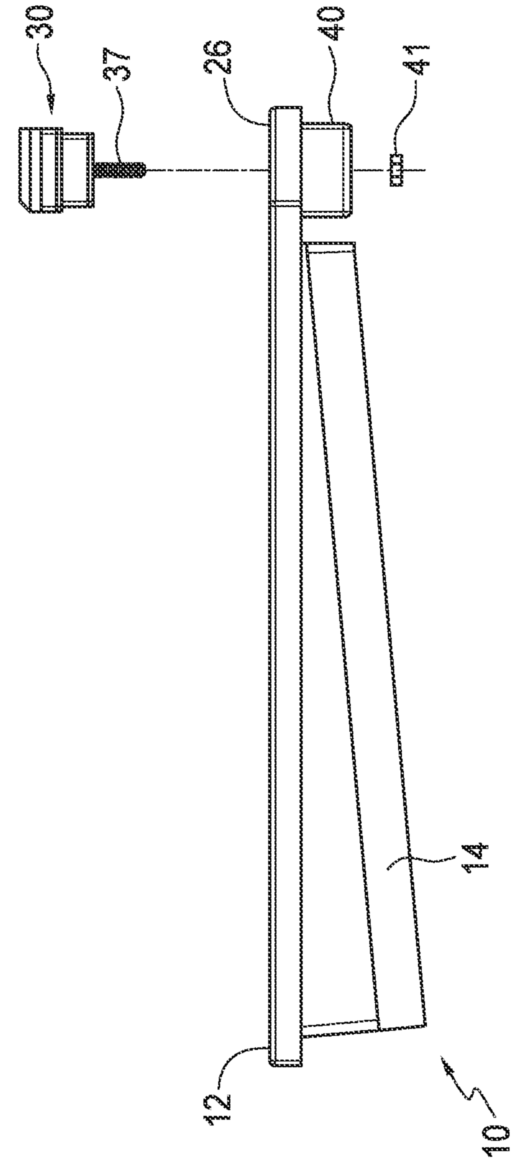
FIG. 15 is a right elevational partially exploded thereof.
Figure 16:
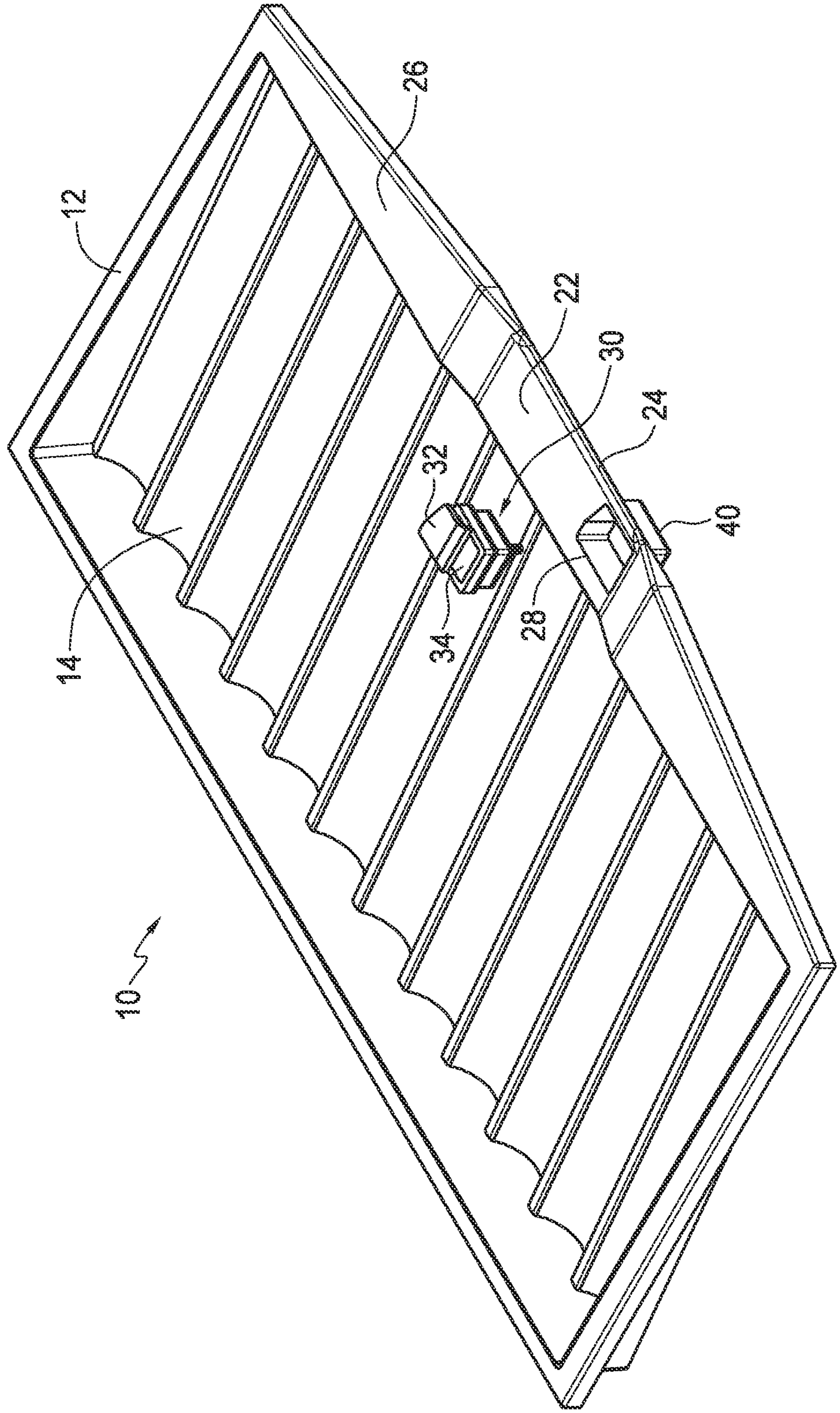
FIG. 16 is a right front partially exploded view thereof.

Before describing in detail exemplary embodiments of the disclosure herein, it should be observed that the inventive embodiments of the disclosure reside primarily in combinations of structural components and manufacturing, installation and use steps.

Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements.

The terms "comprises," "comprising," "comprise" or any other variation thereof are intended to cover a non-exclusive inclusion, such that a process, method, article, or apparatus that comprises a list of elements need not necessarily include only those elements, but may include other elements not expressly listed or inherent to such process, method, article, or apparatus.

The term "plurality of" as used in connection with any object or action means two or more of such objects or actions.

A claim element proceeded by the article "a" or "an" does not, without more constraints, preclude the existence of additional identical elements in the process, method, article, or apparatus that includes the element.

As used herein, the term "hole card reader" includes any device which can be used to assist the dealer in a game of blackjack to detect if he or she has been dealt 21 in the initial deal.

FIGS. 1 through 16 show a first embodiment of a chip rack and hole card reader, which comprises a chip rack or rack 10 which may be of standard configuration, and incorporates a plurality of chip slots 14 surrounded by a peripheral wall 12. It is to be noted that the number and size of chip slots 14 is not relevant to the embodiments disclosed herein, the number and size thereof being merely a matter of choice for the casino. In addition, the overall configuration of the chip rack and reader may take any shape desired, the particular shapes illustrated herein being merely illustrative of any of the myriad options thereof which will occur to those of skill in the art after having had the benefit of reviewing this disclosure.

Rack 10 defines a card receiving area 20, which may be comprised of a slightly lowered area 22, which may or may not have a beveled leading edge 24. Sidewalls 12 of chip rack 10 may be of any width desired, the embodiment shown herein including a slightly wider wall width on the dealer position-facing side 26. In the embodiment in which the card receiving area 22 is lowered relative to the remainder of side wall 26, side wall 26 includes planar sections 27 and 29 on either side of lowered area 22.

A hole card reader 30 is integrated with front wall 26 in such a way that it is oriented to receive the dealer's down card in the appropriate circumstances for reading by the dealer. Reader 30 may or may not incorporate a top piece 32. Reader 30 defines an aperture 48 (shown in FIGS. 12-13) through which the dealer may view a portion of his or her down card. A refractive or reflective element is associated with the reader 30, such as an optical prism 34 best seen in FIGS. 12-13, or a mirror, to refract or reflect the image of the portion of the dealer's down card placed in registry with aperture 48. In one embodiment, aperture 48 extends under top piece 32, such that when the dealer's down card is placed in registry with aperture 48 the portion of the dealer's down card to be read sits in registry with the reflective element, and can be seen by the dealer.

As best seen in FIGS. 8-16, reader 30 may be integrated with chip rack 10 in the form of a unitary reader component which can be removably fastened to rack 10. It is to be understood, however, as will be exemplified elsewhere in this disclosure, and/or as will occur to those of skill in the art after having read this disclosure, the card reader feature of the disclosure may be integrated with the chip rack in a number of different fashions. Similarly, the card reader may be of the "optical" type such as those shown herein, or may be a digital reader which detects whatever aspects of the dealer's hole card is necessary to give rise to an output signal to indicate that the dealer either does or, optionally, does not have blackjack.

In the embodiment shown, however, reader 30 is a removable component comprised generally of upper and lower housing sections 46, 49 respectively, a lower support plate 44, mounting bolt 37 and reflective member such as prism 34. Top piece 32 may optionally be employed, and, if so employed, may be connected to top housing section 46.

Upper housing section 46 defines aperture 48 through which the dealer may view the reflected portion of his or her down card to be read when the down card is placed in registry with aperture 46. Top piece 32 and upper housing section 46 define a slot 33 into which may be placed the dealer's down card. However, neither top piece 32 nor slot 33 is necessary elements of the functional aspects of the disclosure.

Mounting means such as bracket or pocket 40 may be employed to secure reader 30 to rack 10. Bracket 40 defines a lower aperture through which is passed a fastened such as bolt 37. Thereafter, a fastener such as nut 41 may be threaded thereon to removably connect reader 30 to rack 10. Other structure for mounting reader 30 to rack 10 will occur to those of skill in the art after having the benefit of reviewing this disclosure.

Rack 10, in the embodiment disclosed in FIGS. 1-8, defines an aperture 28 which is sized and shaped to receive reader 30 therein, permitting reader 30 to nest within bracket or pocket 40 for connection thereto. As reader 30 may tend to wear or even break with extended use, the removability of reader 30 is advantageous.

It is to be understood that card receiving area 20 need not include a recessed or lowered surface 22, but may be co-planar with or even raised from front wall 26. Moreover, reader 30 need not be removably connected to rack 10, but may be integrated therewith as a single unit.

FIGS. 17A-43 show a novel locking cover assembly 60 associated with a chip rack, either of the type having an integrated hole card reader, or a prior art chip rack without an integrated reader.

In one embodiment, cover assembly 60 is adapted to be releasably joined to either chip rack 10, chip rack 210 or a playing table. Cover assembly 60 may or may not define an aperture 62 through which the contents of the chip rack 10 can be viewed. It is customary to employ glass, Lexan® or the like thereover to provide a transparent covering. Cover assembly 60 may, but need not necessarily, define one or more handles 84, 86 to facilitate the raising and lowering of cover assembly 80. Cover assembly 80 may include a lock aperture 88 which is intended to lie in registry with locking device 89. The locking device 89 may be of any suitable type that will occur to those of skill in the art, such as a manual key lock mechanism, a biometrically actuated lock, a key pad lock, or the like.

As best seen in FIGS. 25-31, 38-40 and 43 cover assembly 60 may be comprised of a top or cover member 80 which defines a lower peripheral edge 63, which is adapted to nestably mate in registry with top wall 26 of chip rack 210 when the cover assembly 60 is placed in registry with rack 210. In embodiments where chip rack 10 employs a recessed card receiving area 20, such as that shown in FIGS. 1-3, 7-8, 16-18 and 20, cover member 60 may (but need not) employ an extended area 65 to prevent access into the interior of chip rack 210 when cover assembly 60 is placed thereover.

Figure 17A:
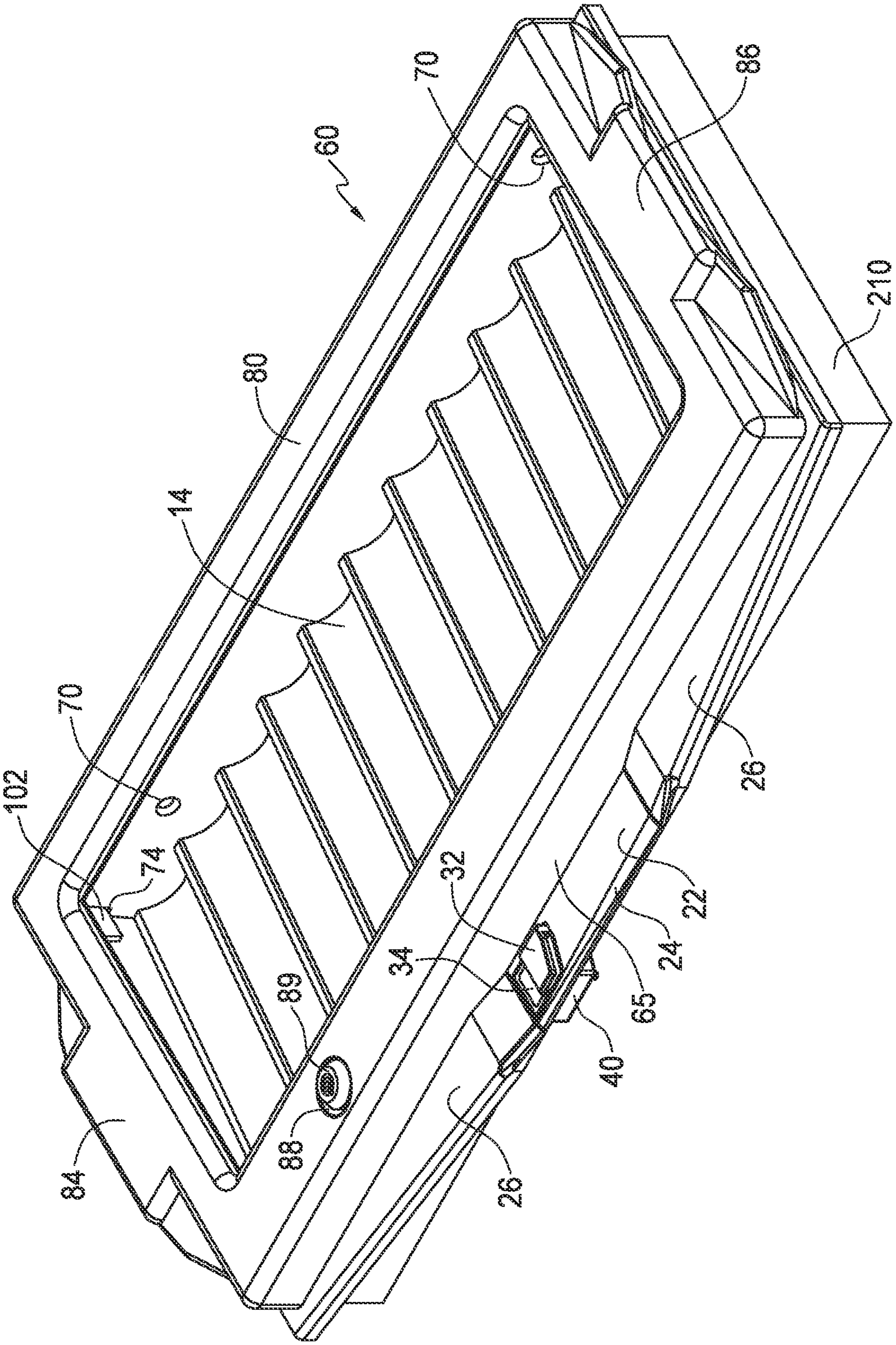
FIG. 17A is a left front perspective view of a chip rack and hole card reader and a locking security cover assembly therefore with the cover assembly in the fully installed position.
Figure 17B:
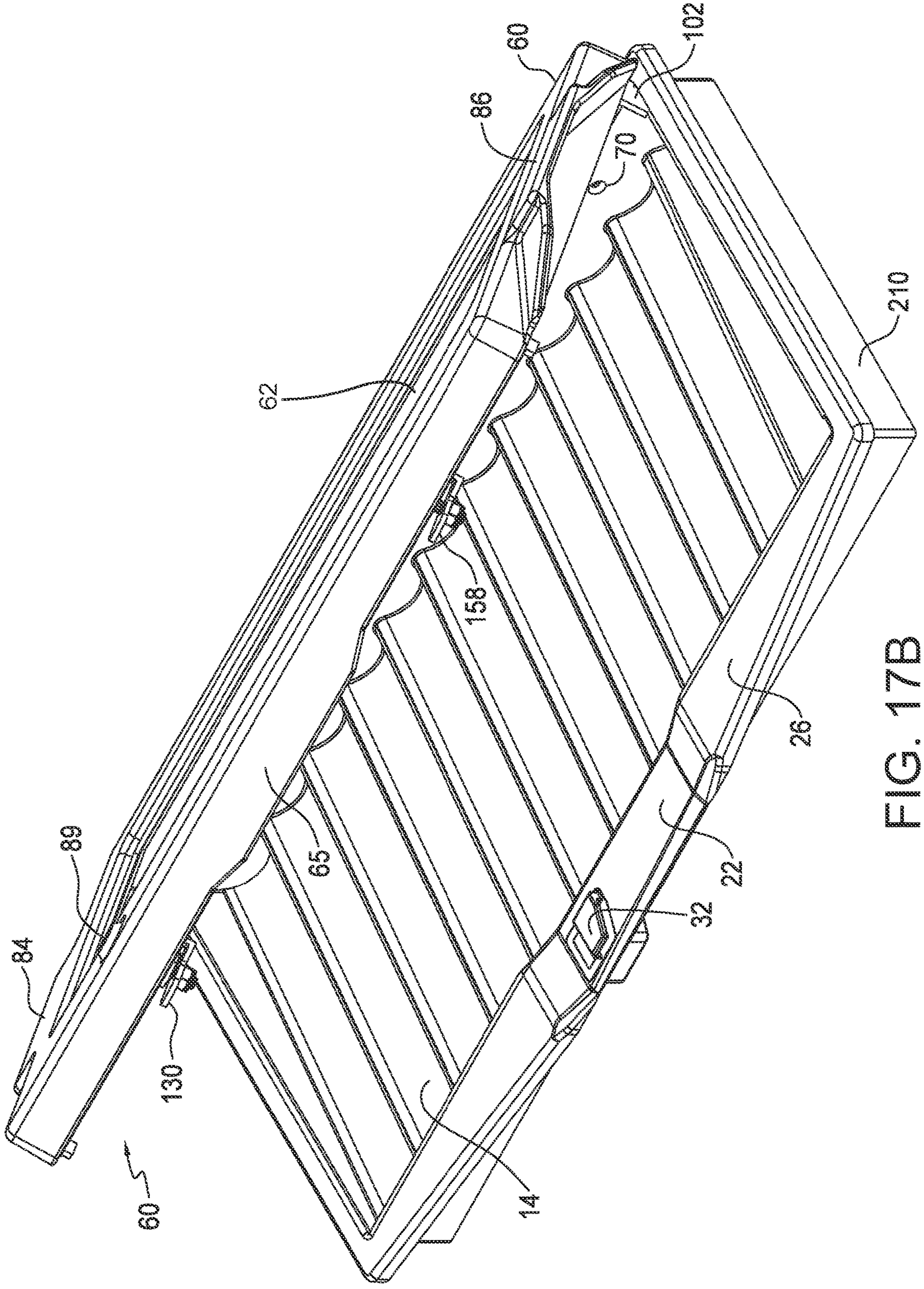
FIG. 17B is a left front perspective view of the chip rack and hole card reader and a locking security cover therefore with the cover assembly in a partially installed/removed position.
Figure 18:
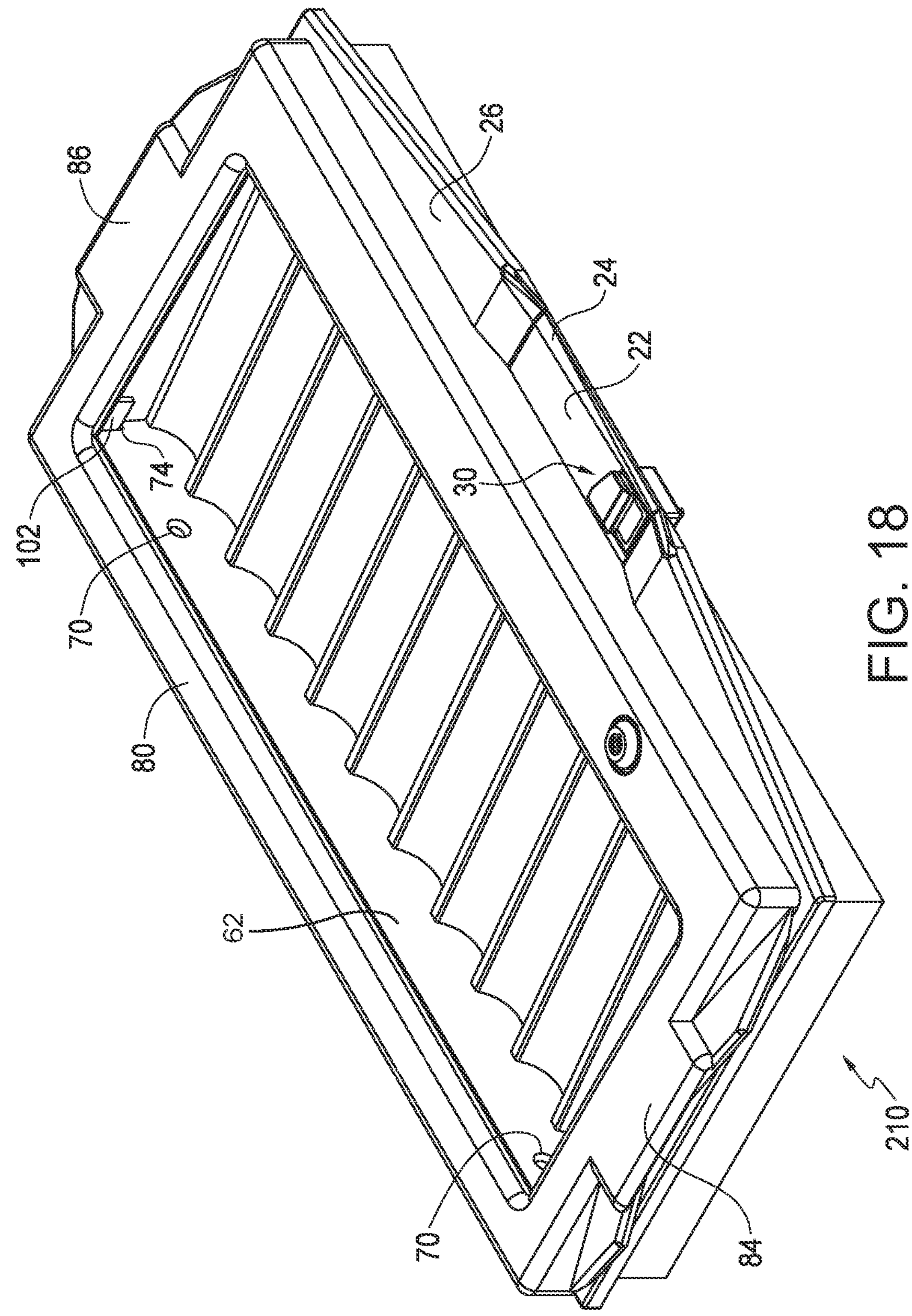
FIG. 18 is a right front perspective view of the assembly shown in FIG. 17.
Figure 19:
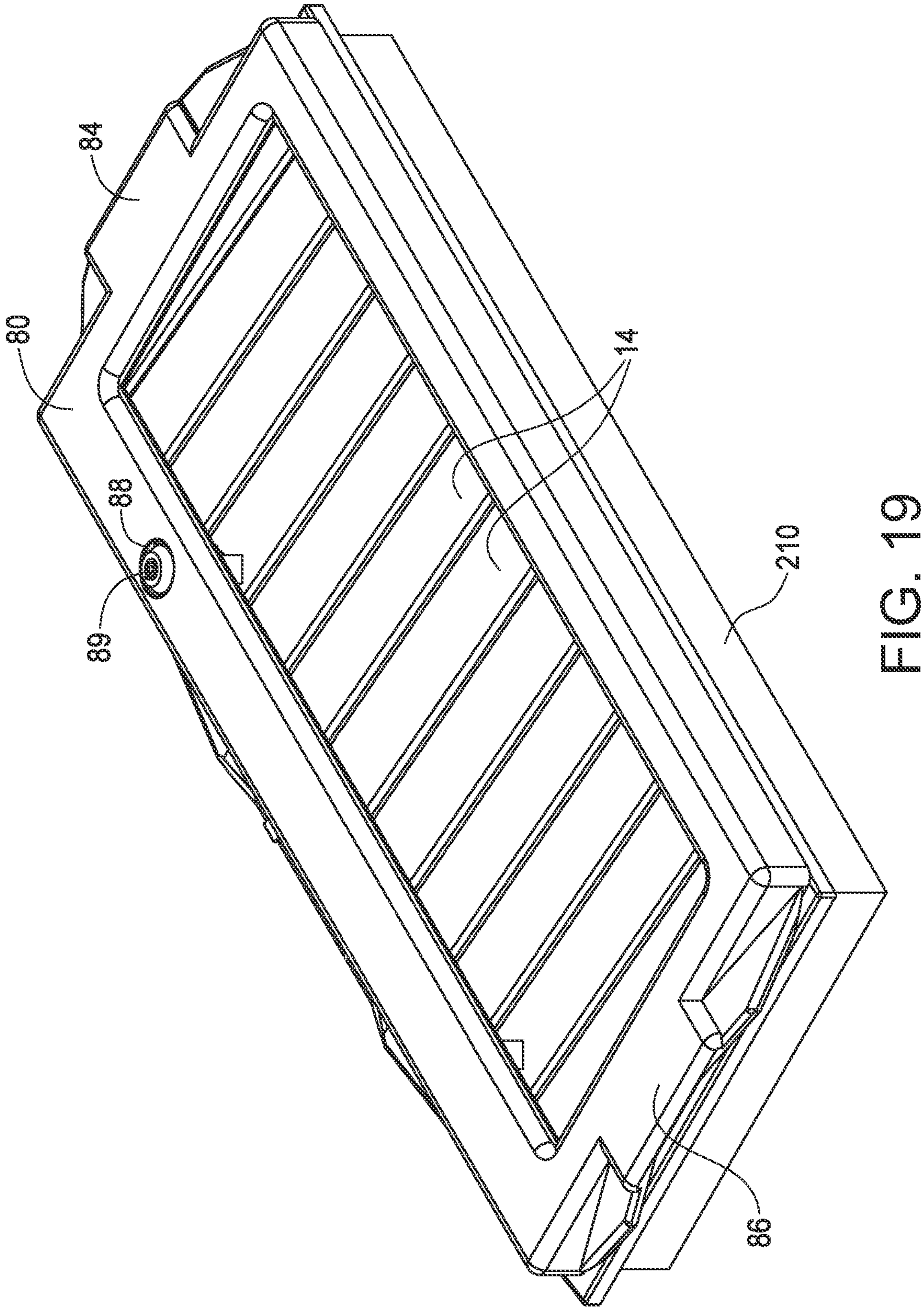
FIG. 19 is a left rear perspective view thereof.
Figure 20A:
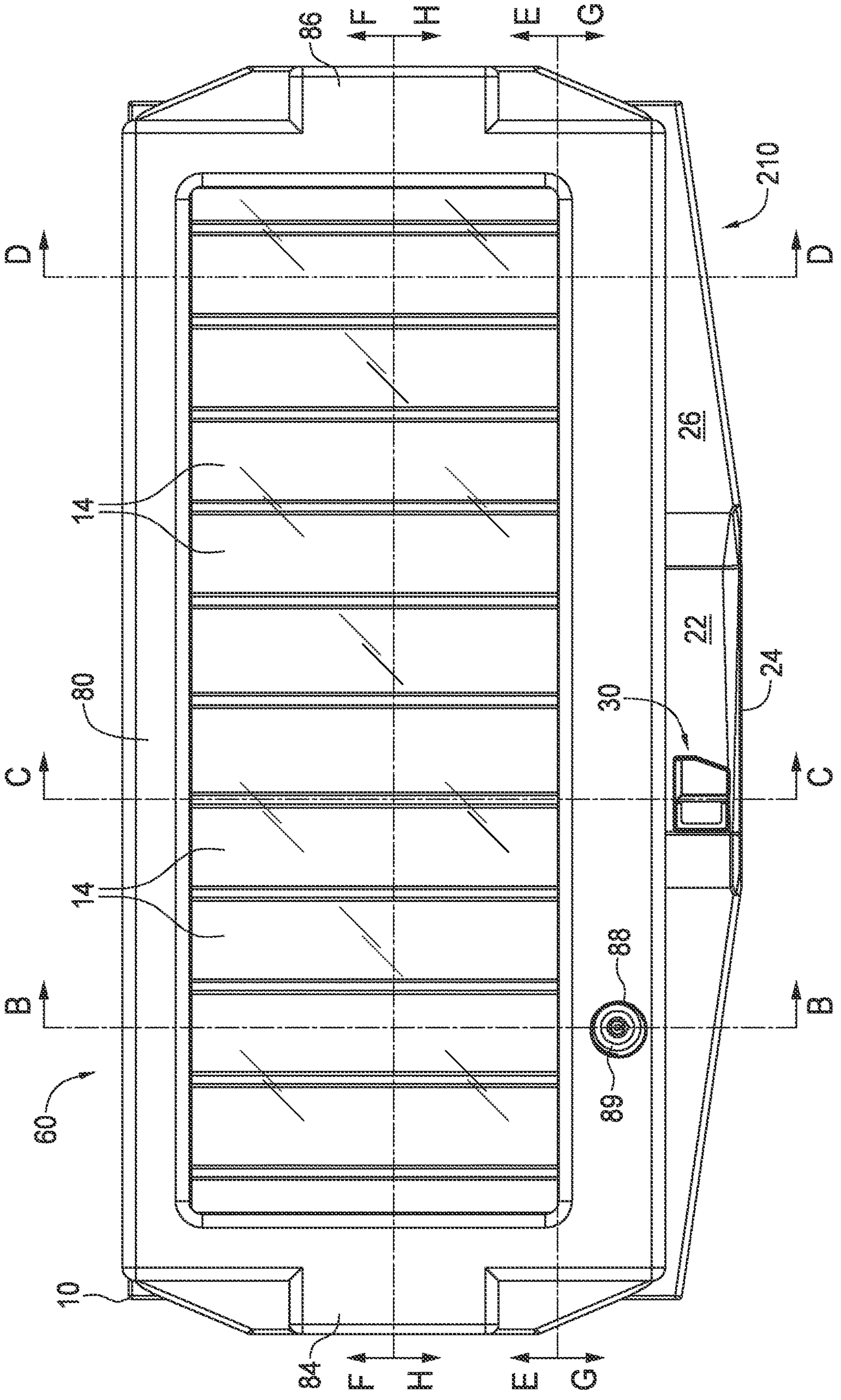
FIG. 20A is a top plan view thereof.
Figure 20B:
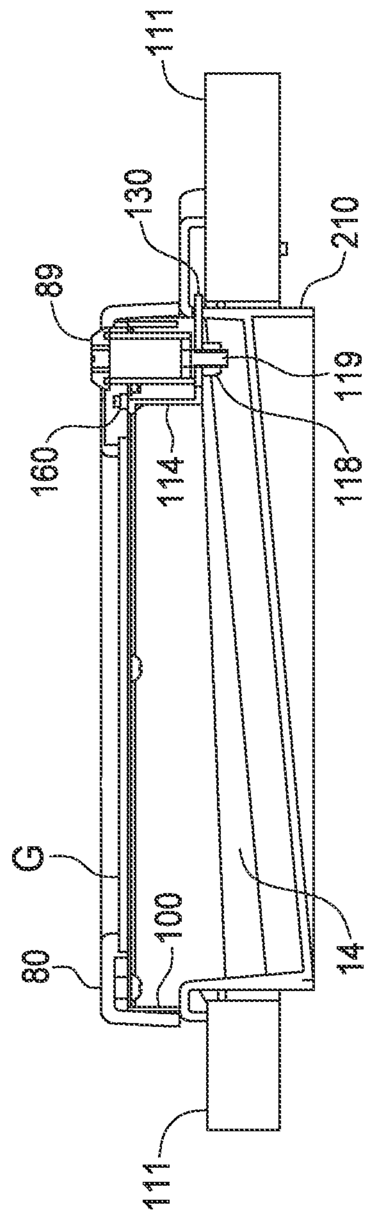
FIG. 20B is a cross sectional elevational view taken along lines B-B of FIG. 20A.
Figure 20C:
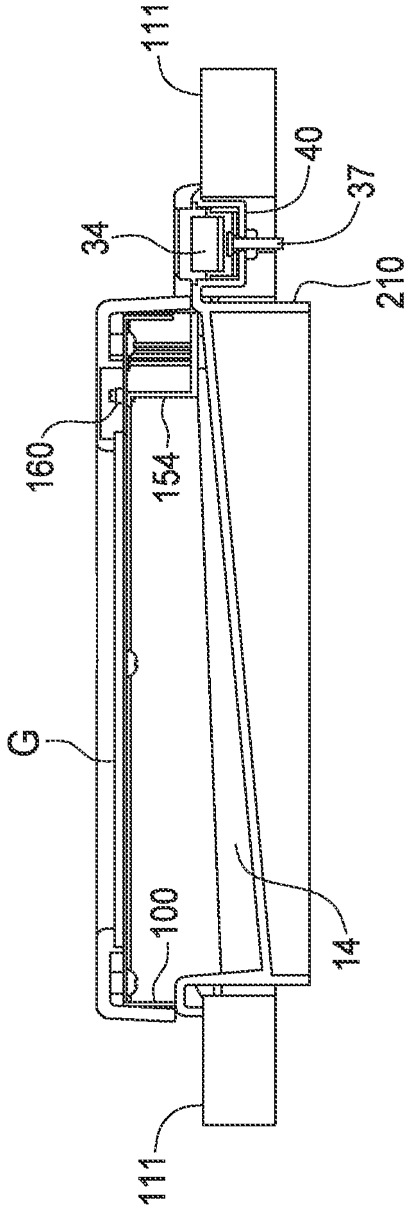
FIG. 20C is a cross sectional elevational view taken along lines C-C of FIG. 20A.
Figure 20D:
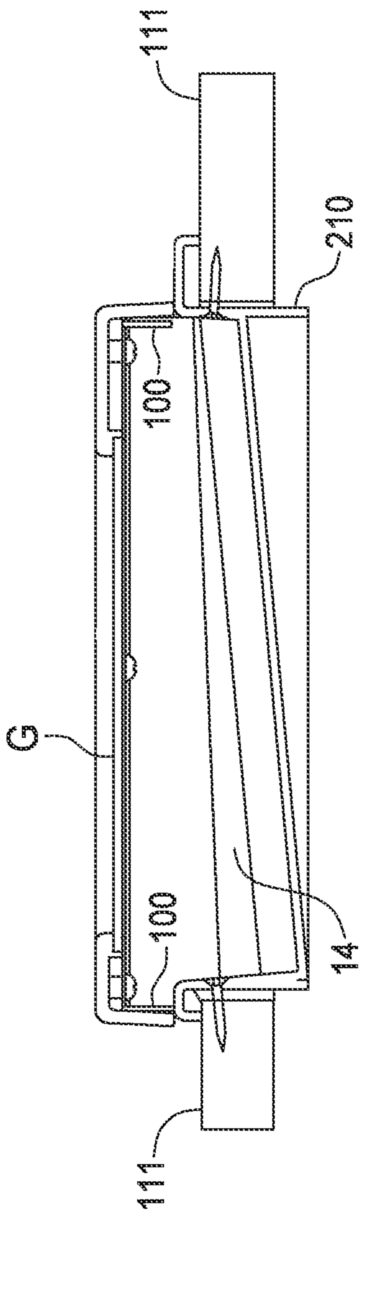
FIG. 20D is a cross sectional elevational view taken along lines D-D of FIG. 20A.
Figure 20E:
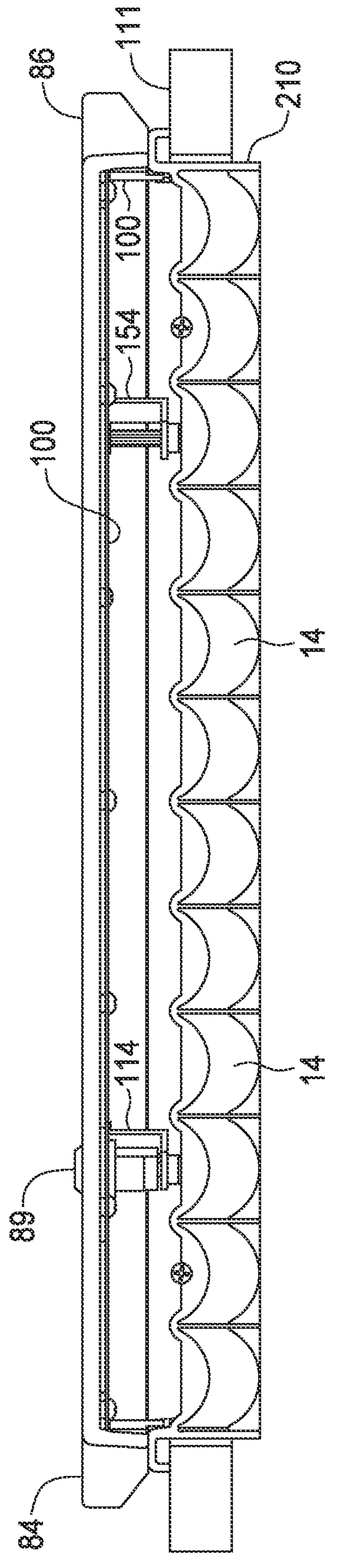
FIG. 20E is a cross sectional elevational view taken along lines E-E of FIG. 20A.
Figure 20F:
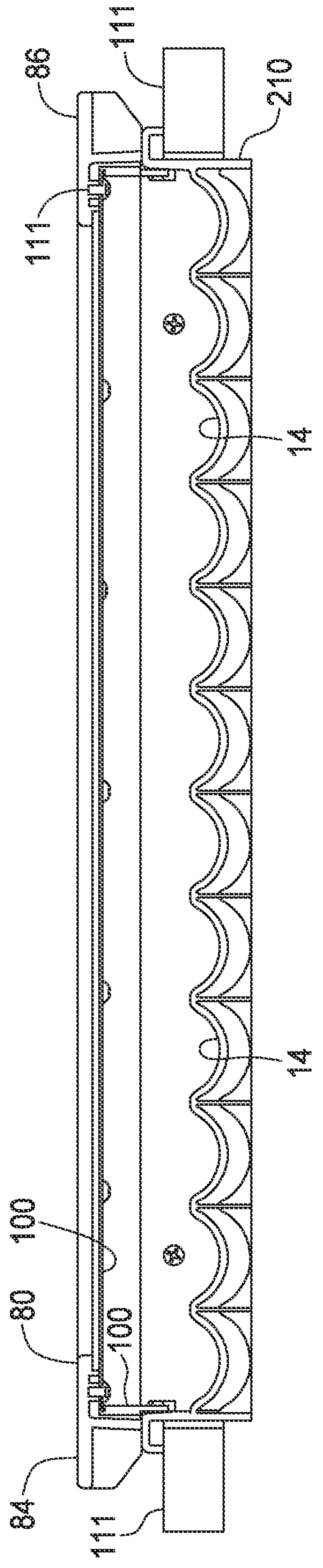
FIG. 20F is a cross sectional elevational view taken along lines F-F of FIG. 20A.
Figure 20G:
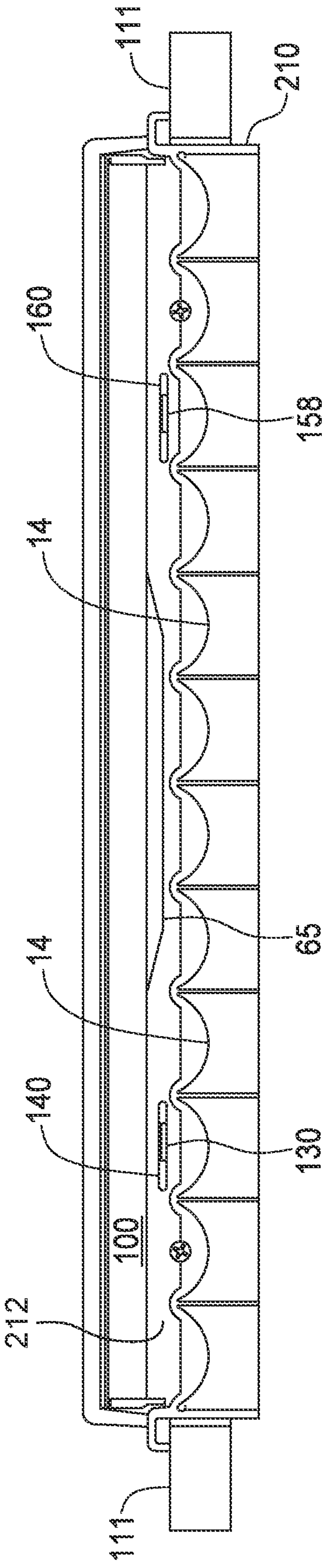
FIG. 20G is a cross sectional elevational view taken along lines G-G of FIG. 20A.
Figure 20H:
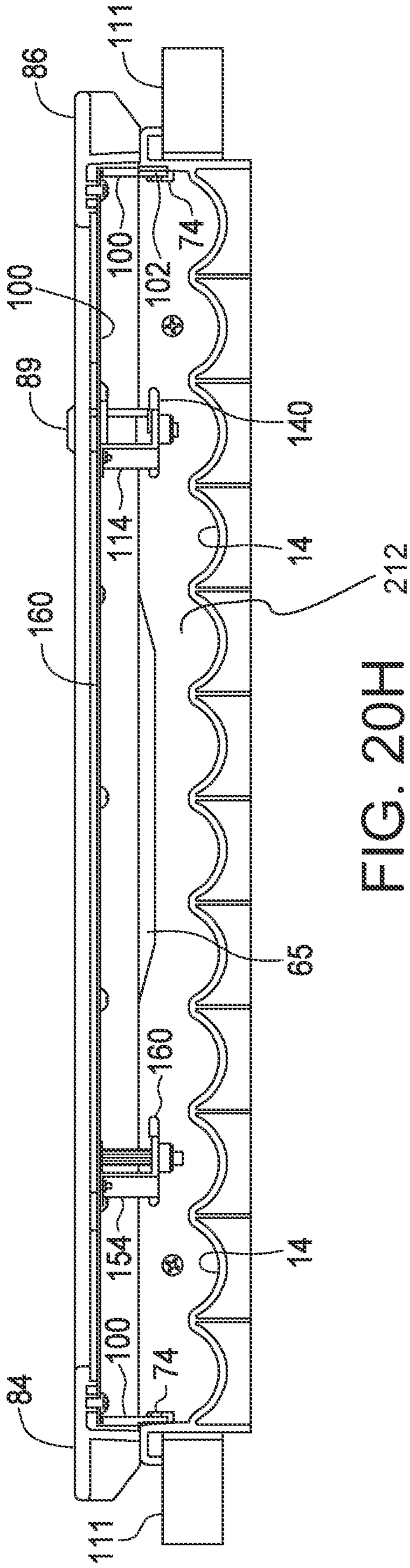
FIG. 20H is a cross sectional elevational view taken along lines H-H of FIG. 20A.
Figure 21A:
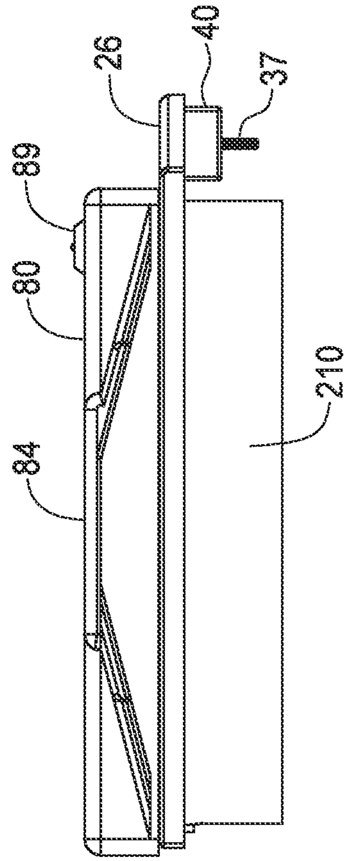
FIG. 21A is a right side elevational view of the assembly shown in FIG. 17A.
Figure 21B:
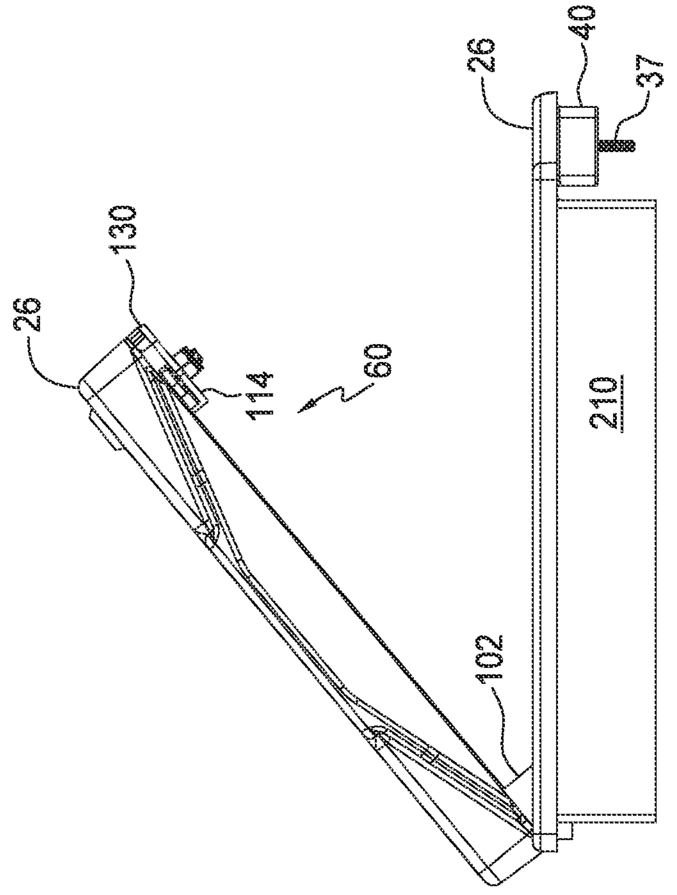
FIG. 21B is a right side elevational view thereof with the cover assembly in a partially installed/removed position.
Figure 22:
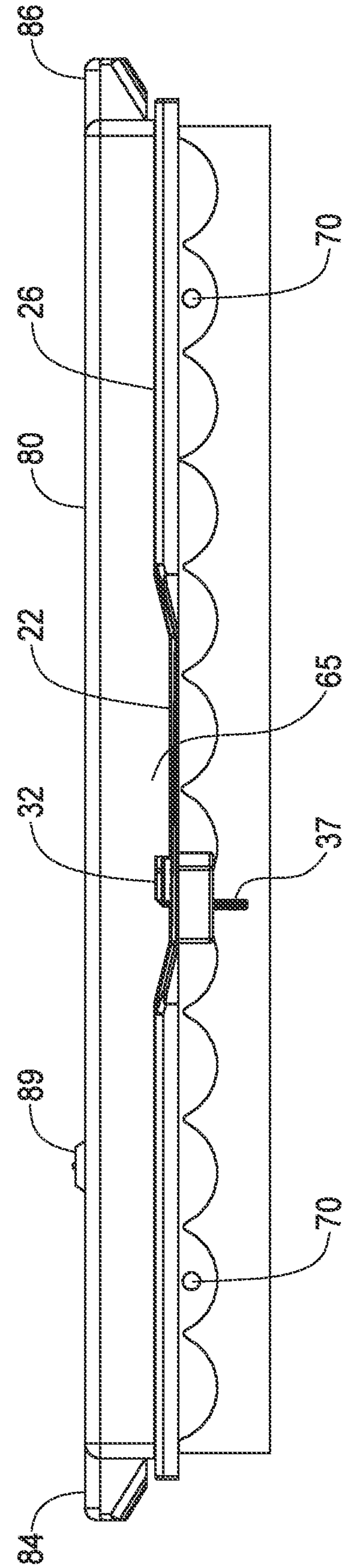
FIG. 22 is a front elevational view of the assembly shown in FIG. 17A.
Figure 23:
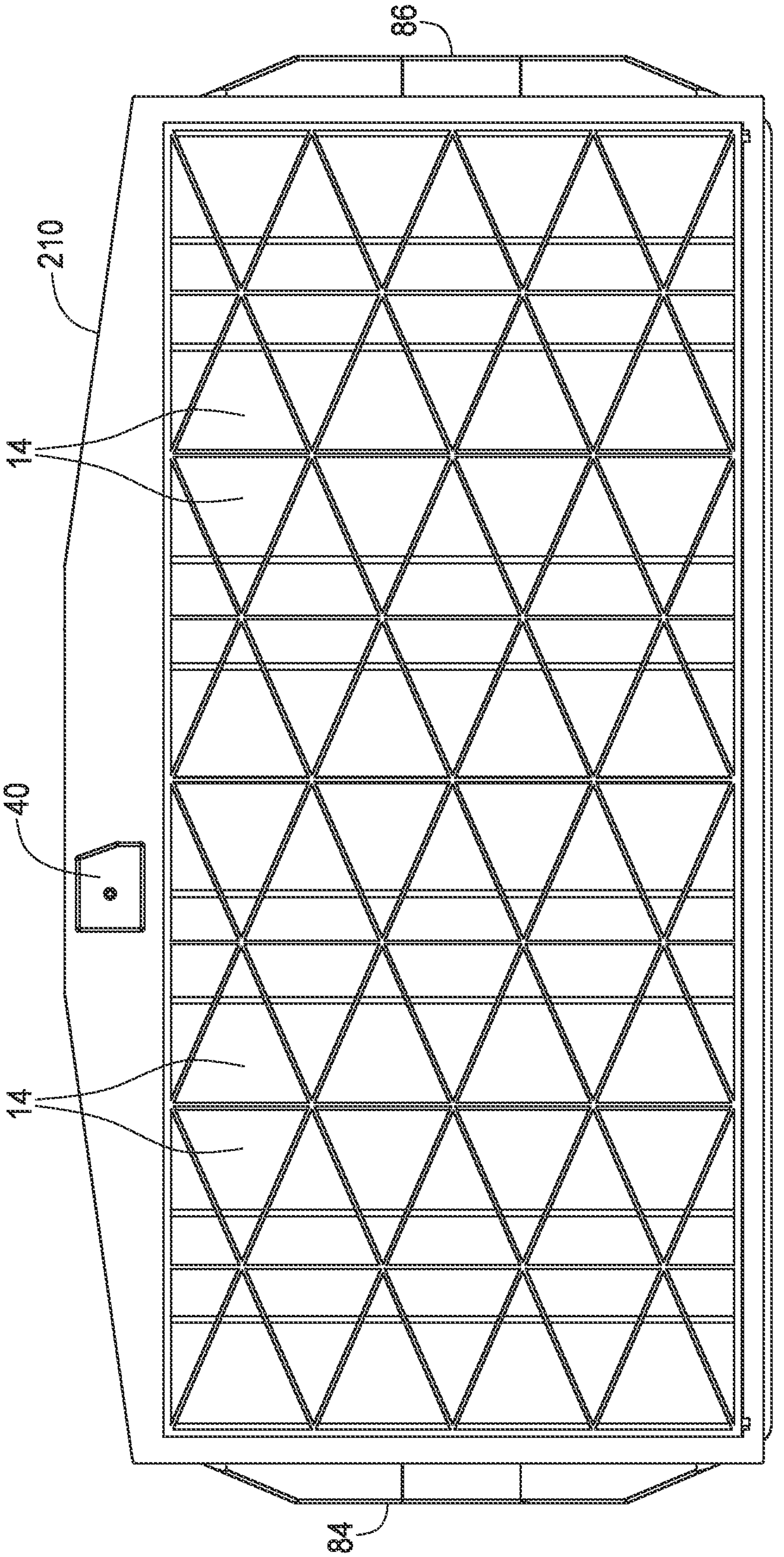
FIG. 23 is a bottom plan view thereof.
Figure 24:
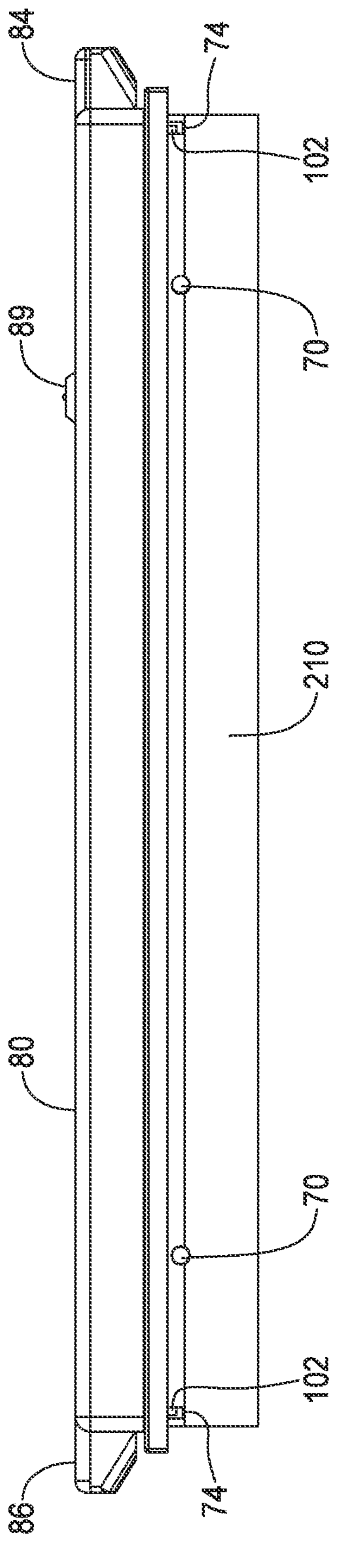
FIG. 24 is a rear elevational view thereof.
Figure 25:
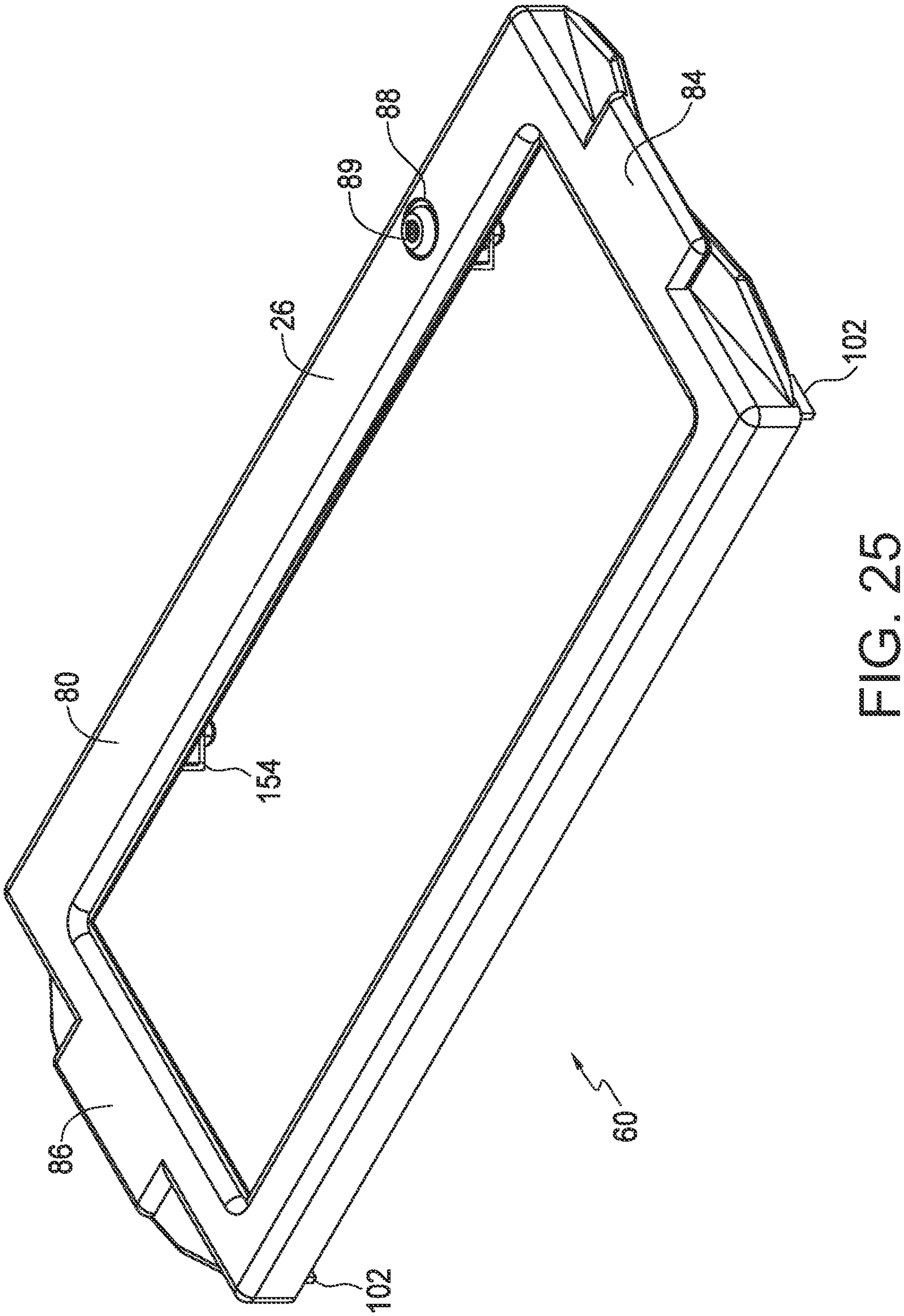
FIG. 25 is a right rear perspective view of the cover assembly removed from its association with the chip rack and hole card reader assembly.
Figure 26:
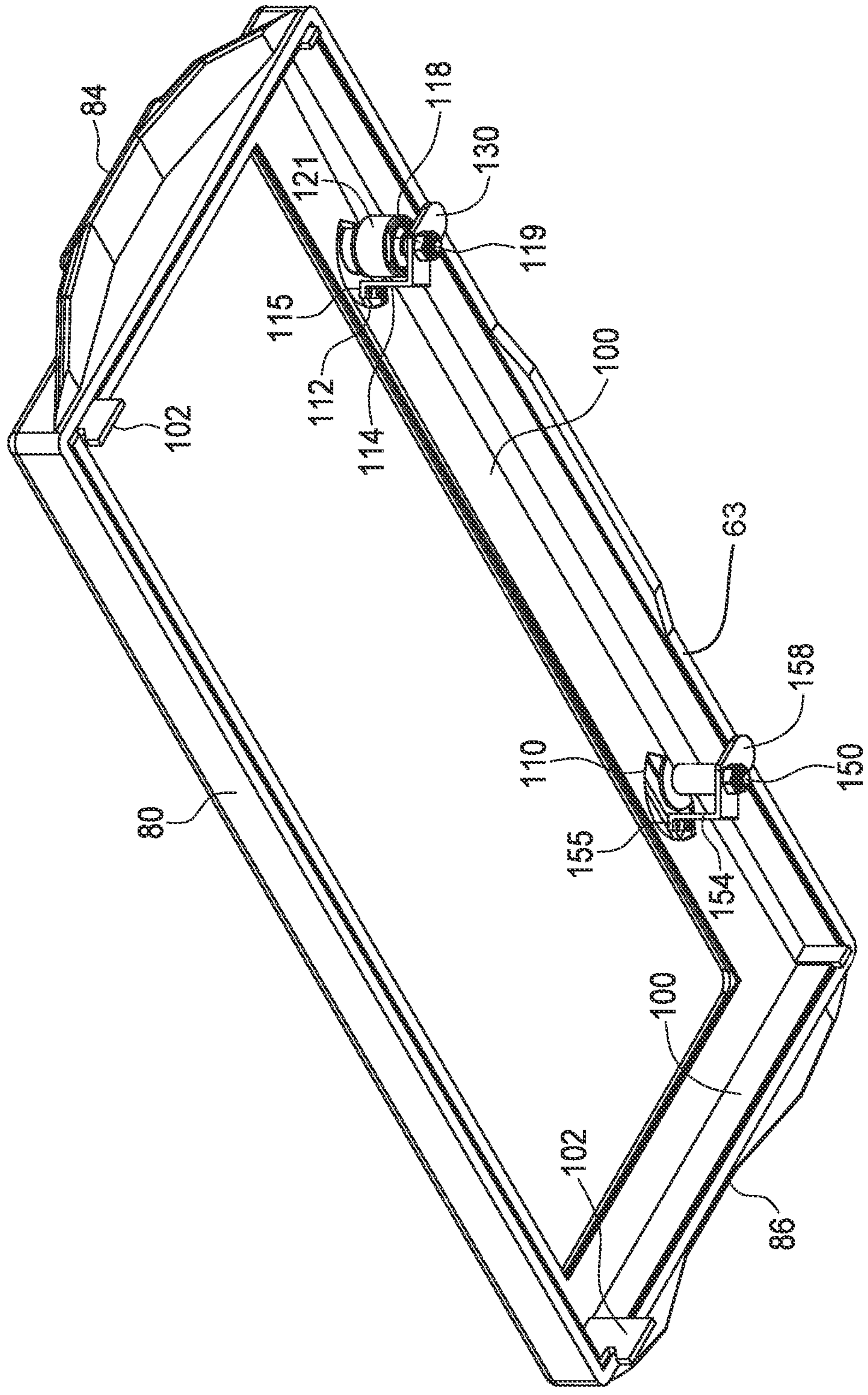
FIG. 26 is a bottom right rear perspective view thereof.
Figure 27:
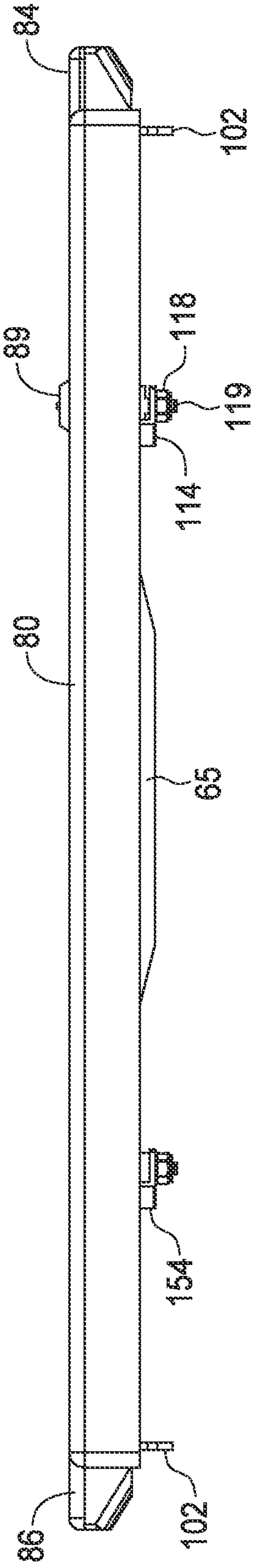
FIG. 27 is a rear elevational view thereof.
Figure 28:
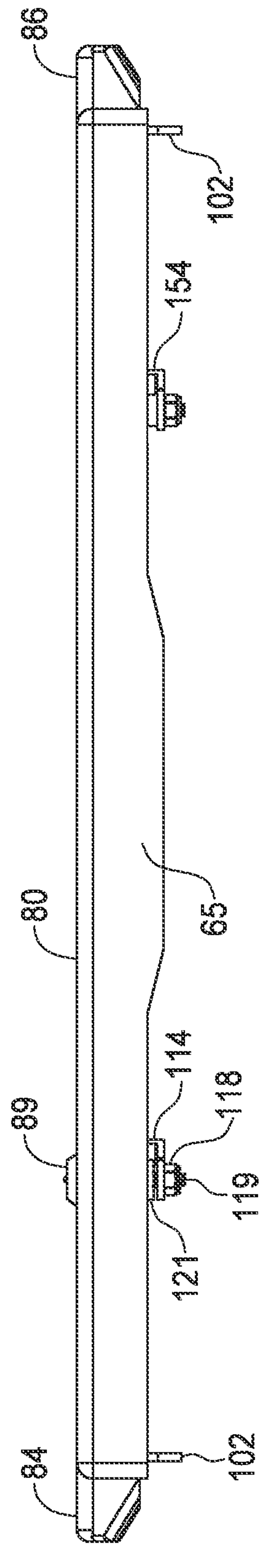
FIG. 28 is a front elevational view thereof.
Figure 29:
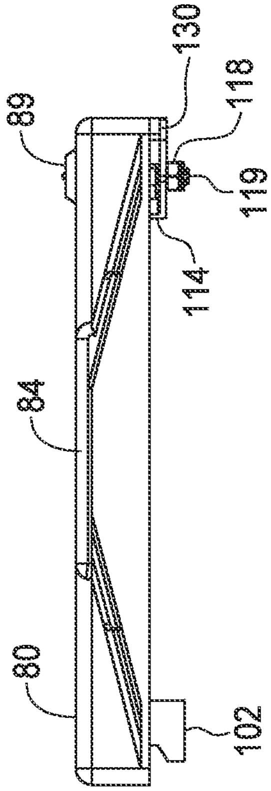
FIG. 29 is a right side elevational view thereof.
Figure 30:
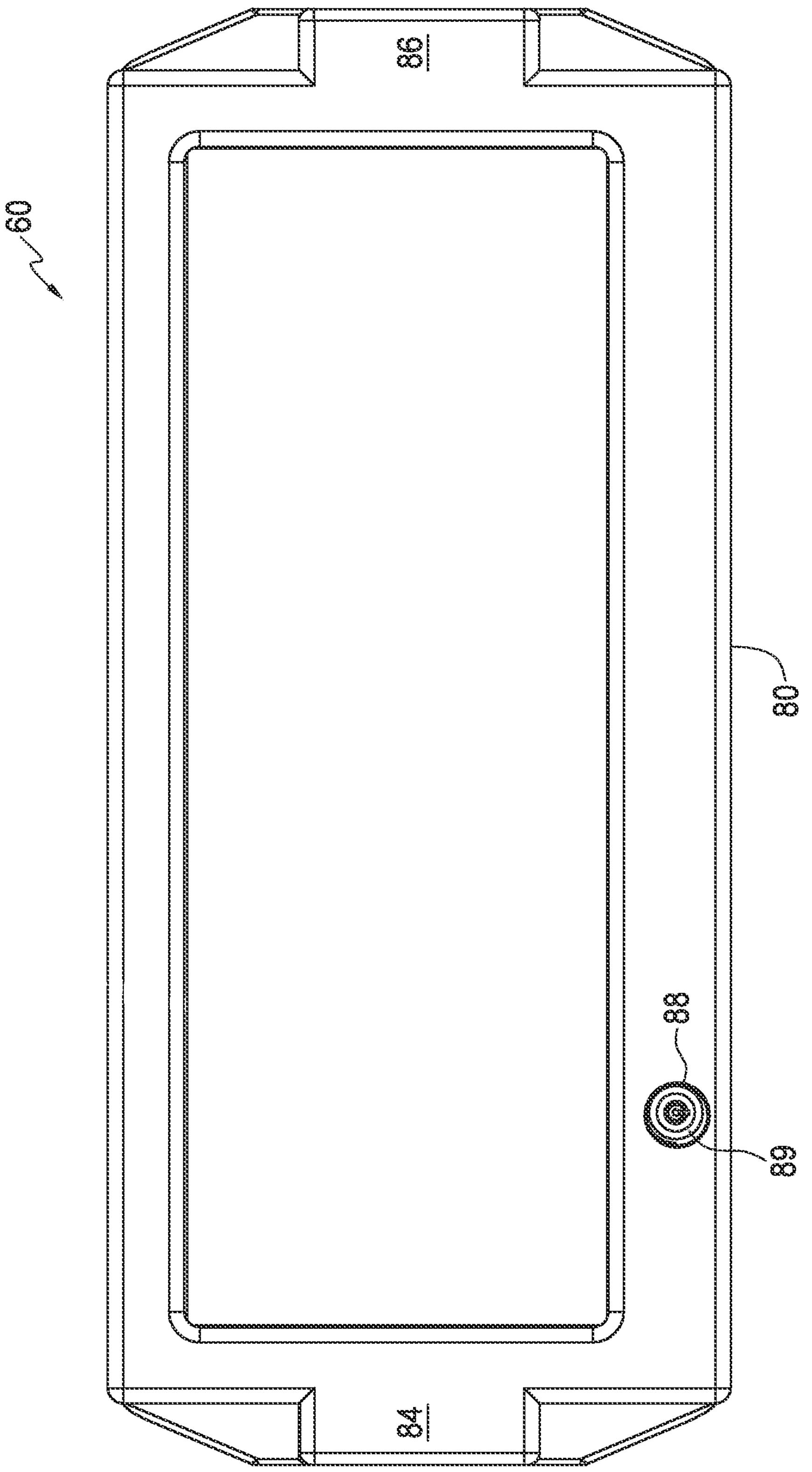
FIG. 30 is a top plan view thereof.
Figure 31:
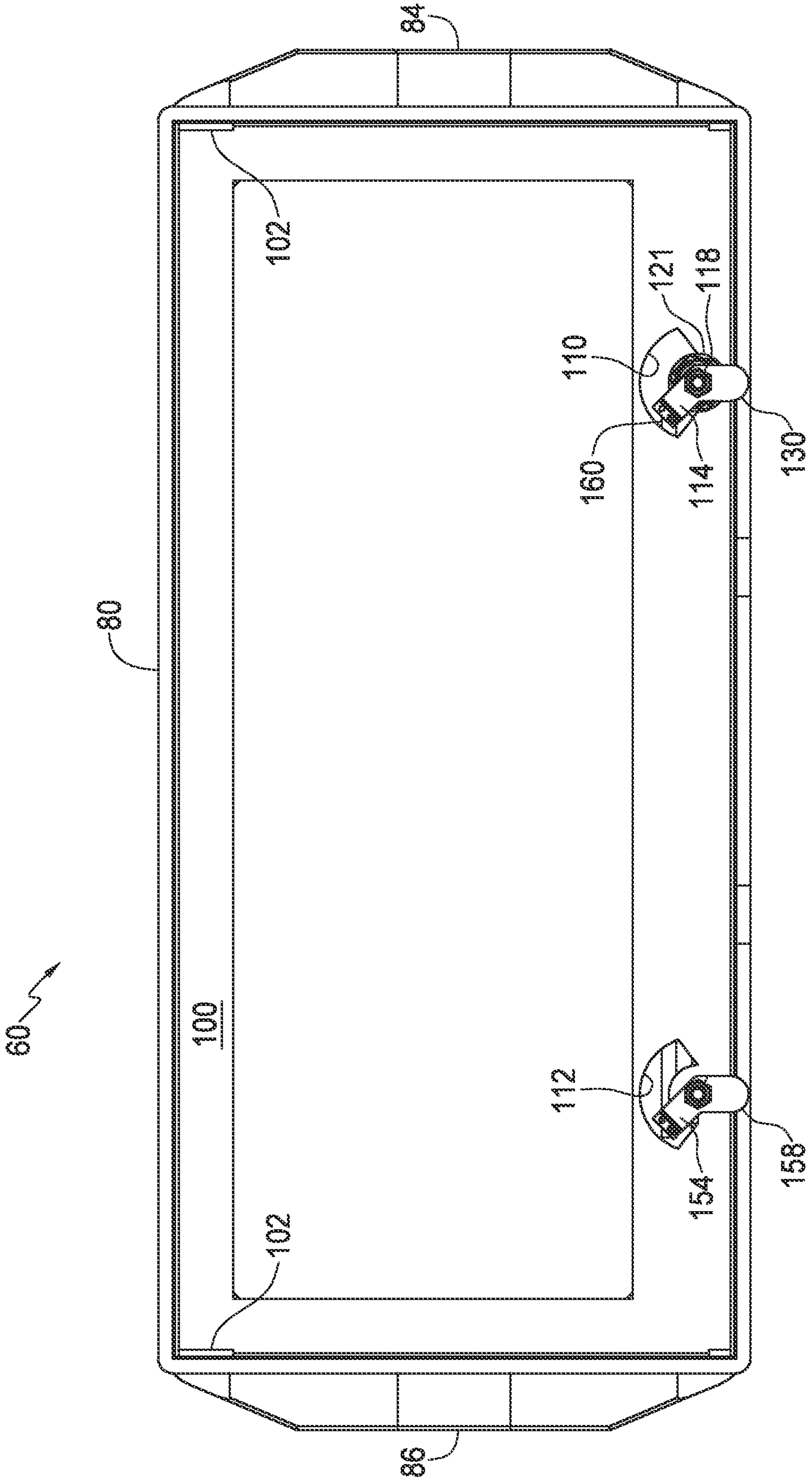
FIG. 31 is a bottom plan view thereof.
Figure 32:
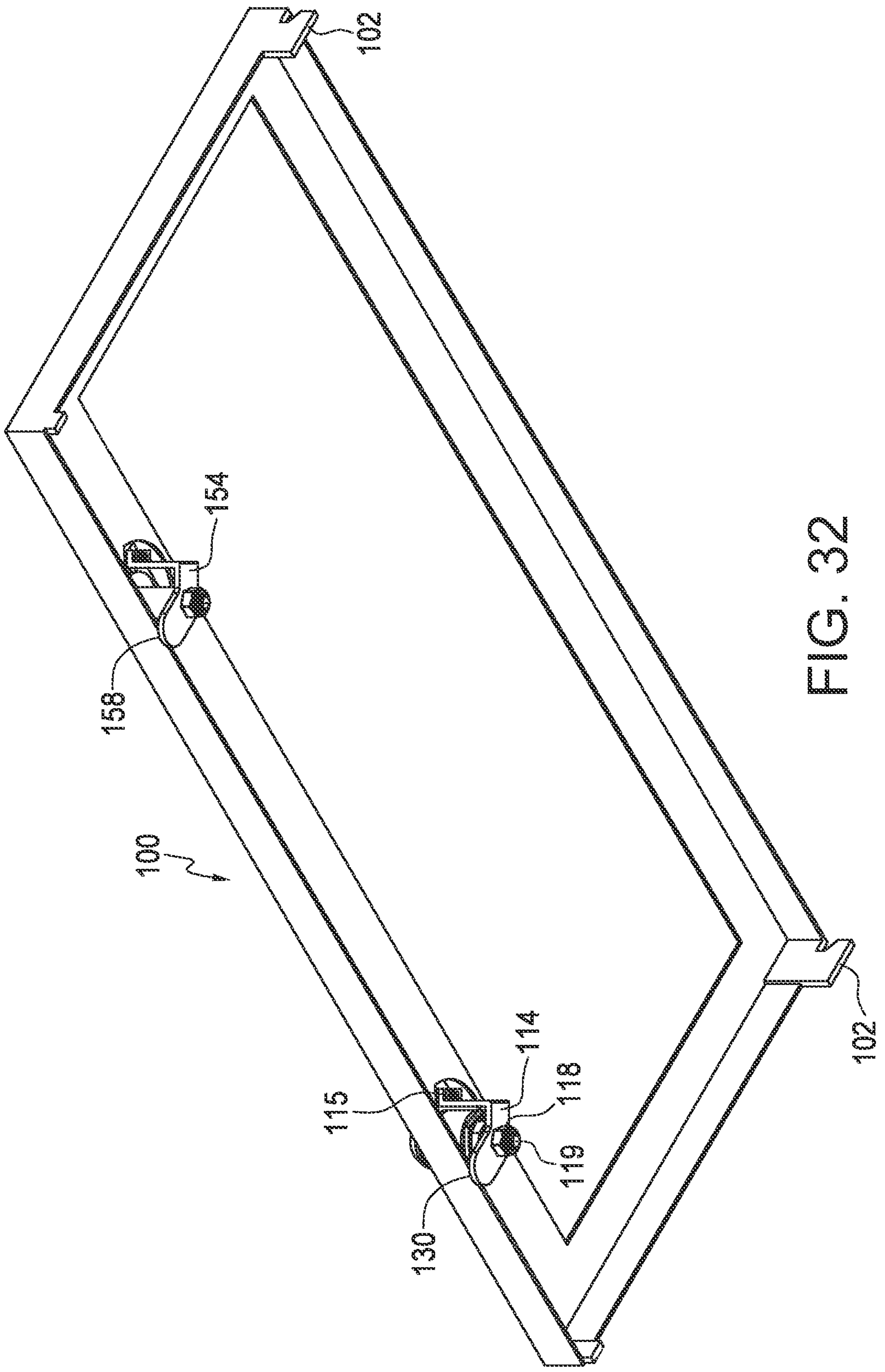
FIG. 32 is a bottom left front perspective view of the cover insert member removed from its association with the cover assembly.
Figure 33:
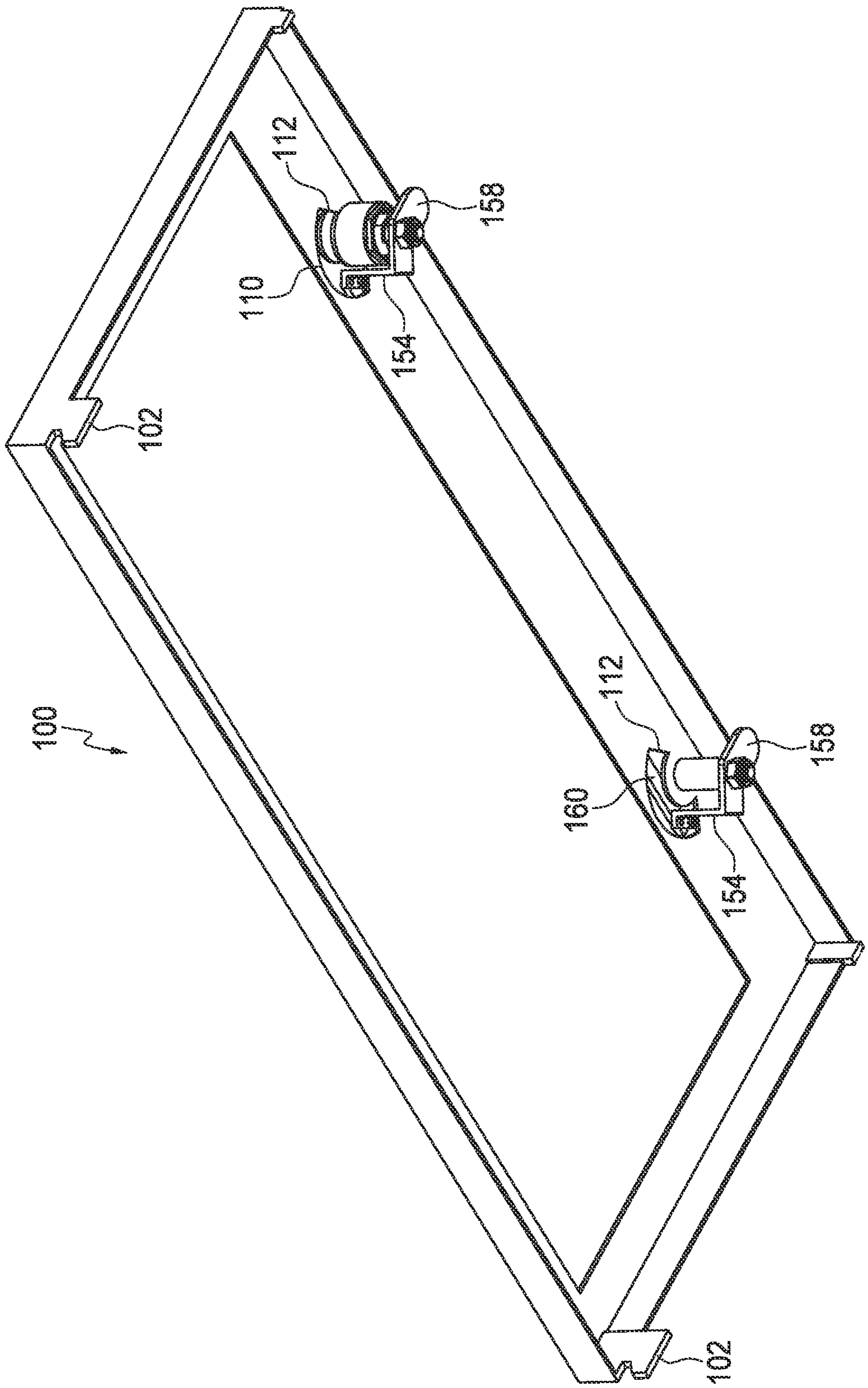
FIG. 33 is a bottom right rear perspective view thereof.
Figure 34:
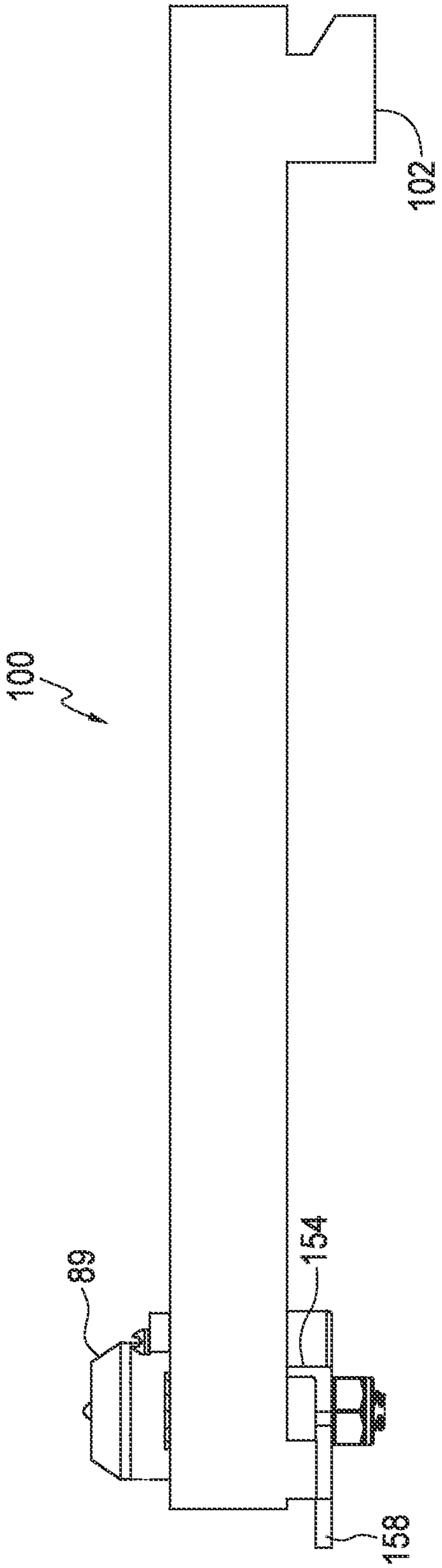
FIG. 34 is a left side elevational view thereof.
Figure 35:
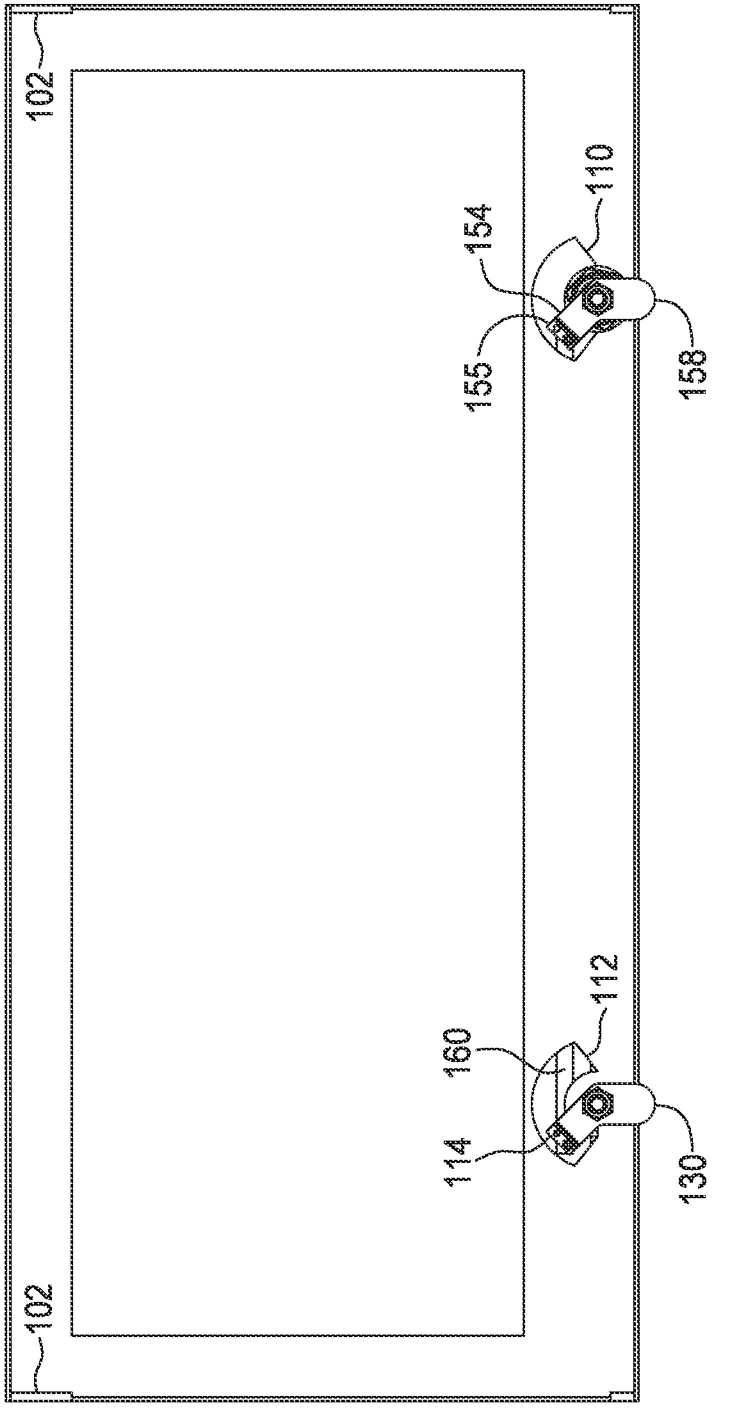
FIG. 35 is a bottom plan view thereof.
Figure 36:
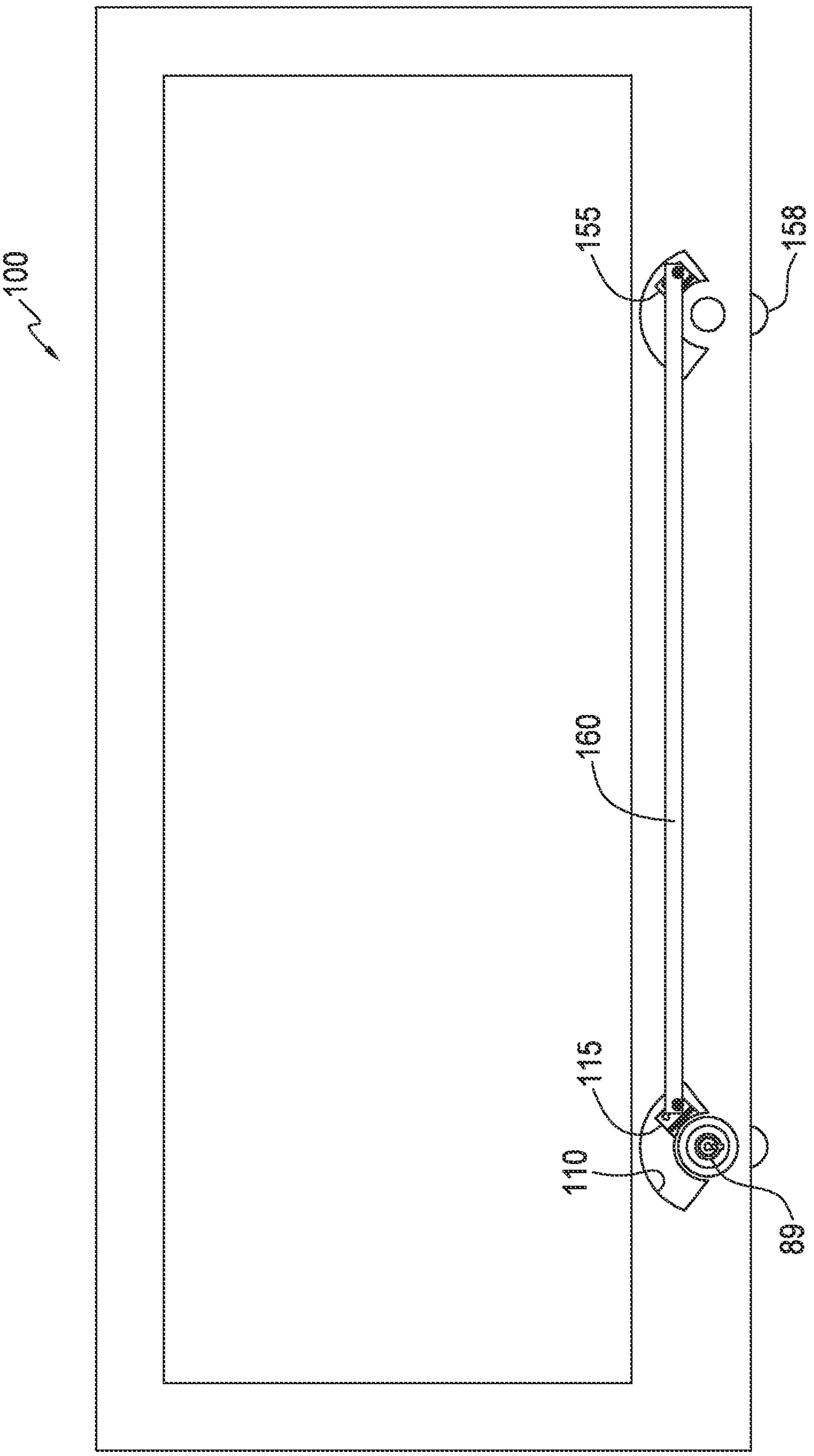
FIG. 36 is a top plan view thereof.
Figure 37:
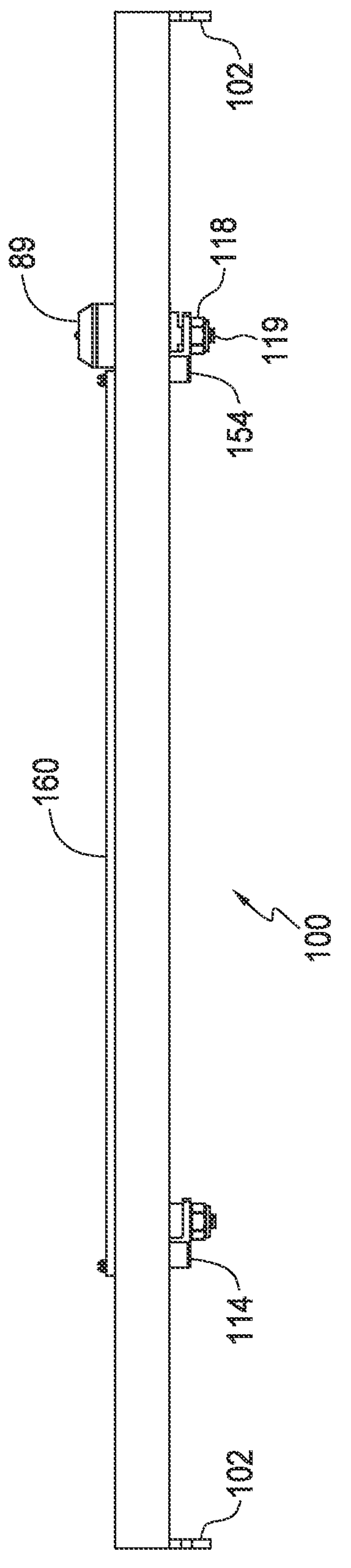
FIG. 37 is a rear elevational view thereof.
Figure 38:
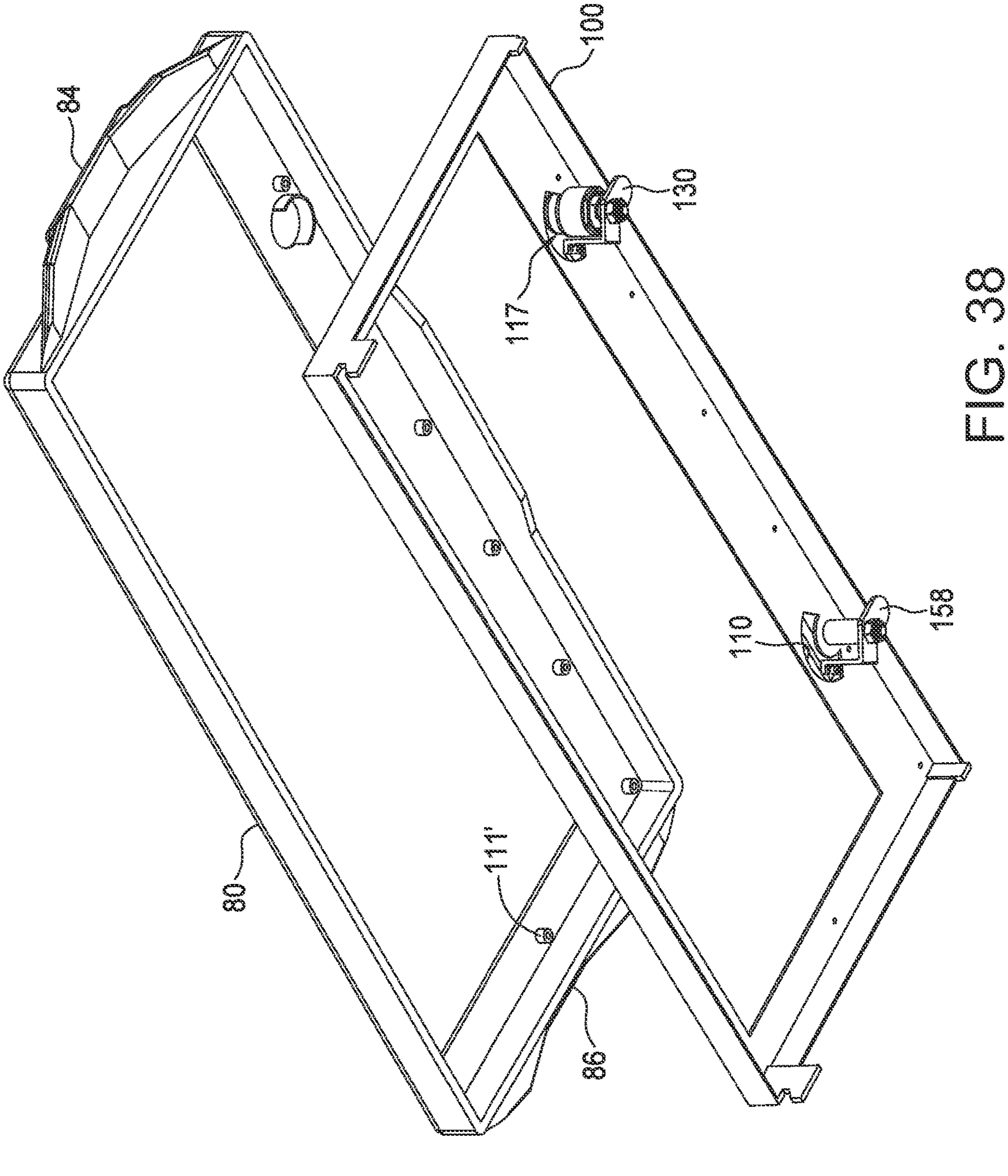
FIG. 38 is a right rear bottom exploded perspective view of the cover assembly.
Figure 39:
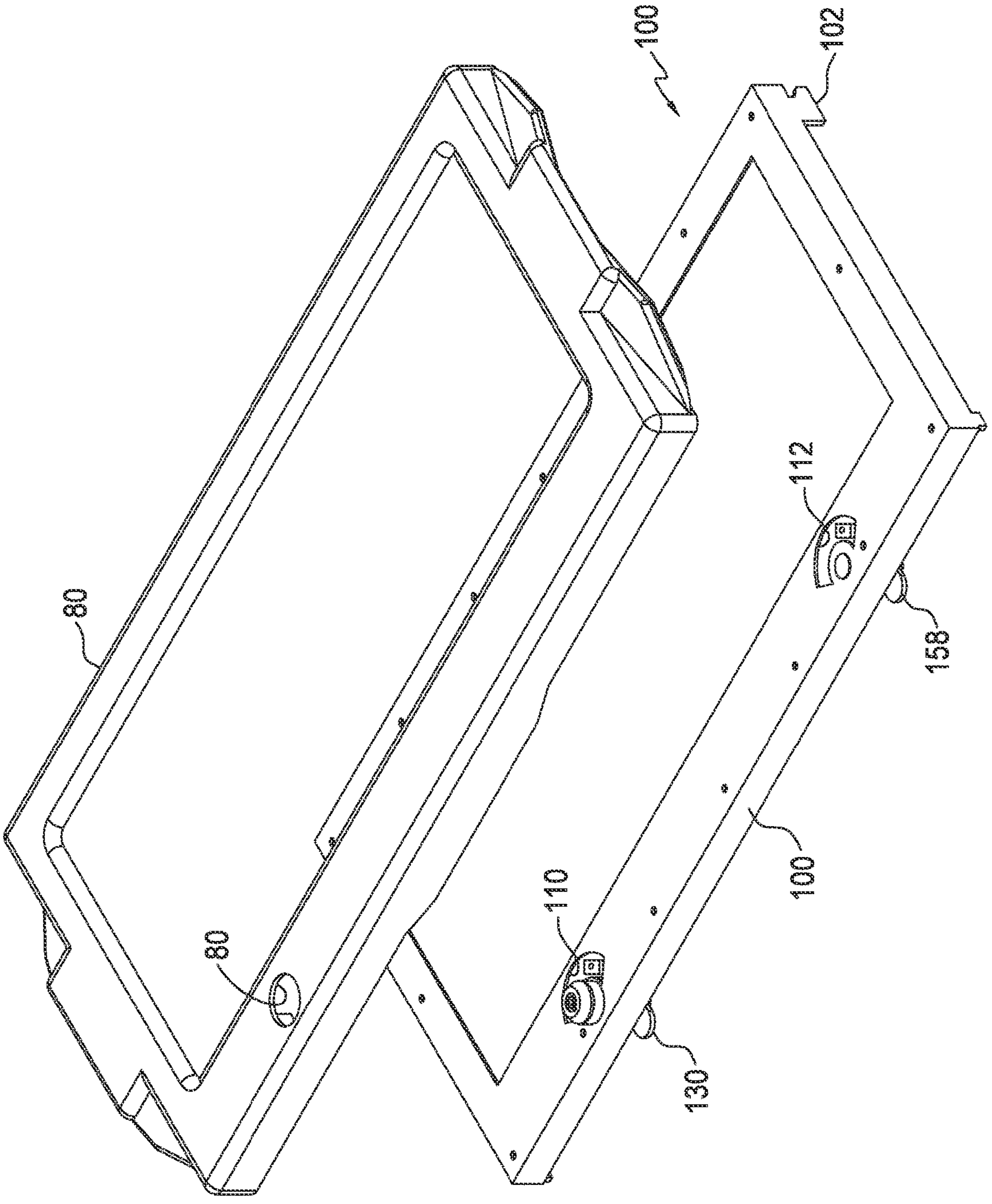
FIG. 39 is an exploded left front top elevational view thereof.
Figure 40:
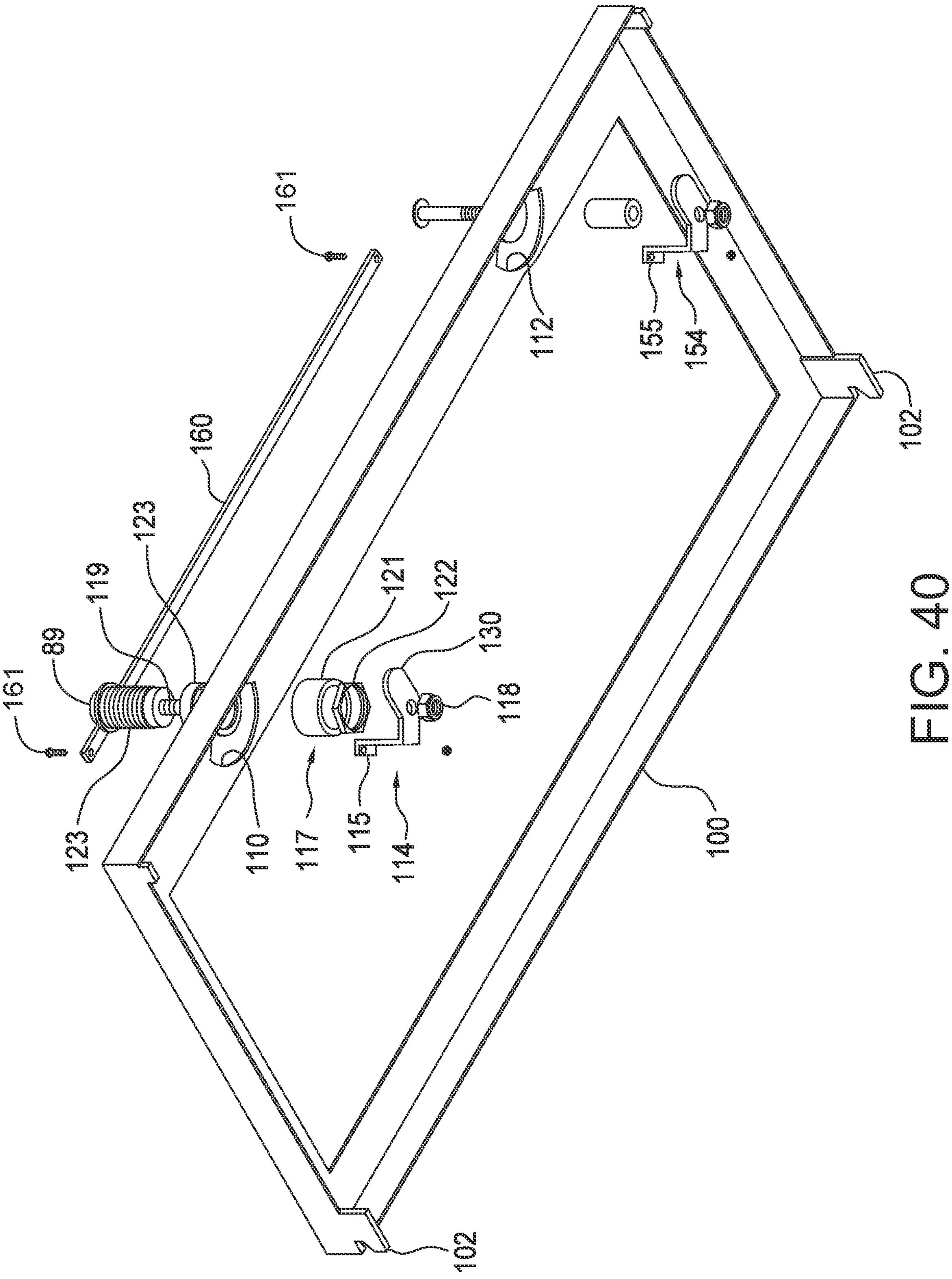
FIG. 40 is a bottom right front perspective exploded view of the cover insert member.
Figure 41:
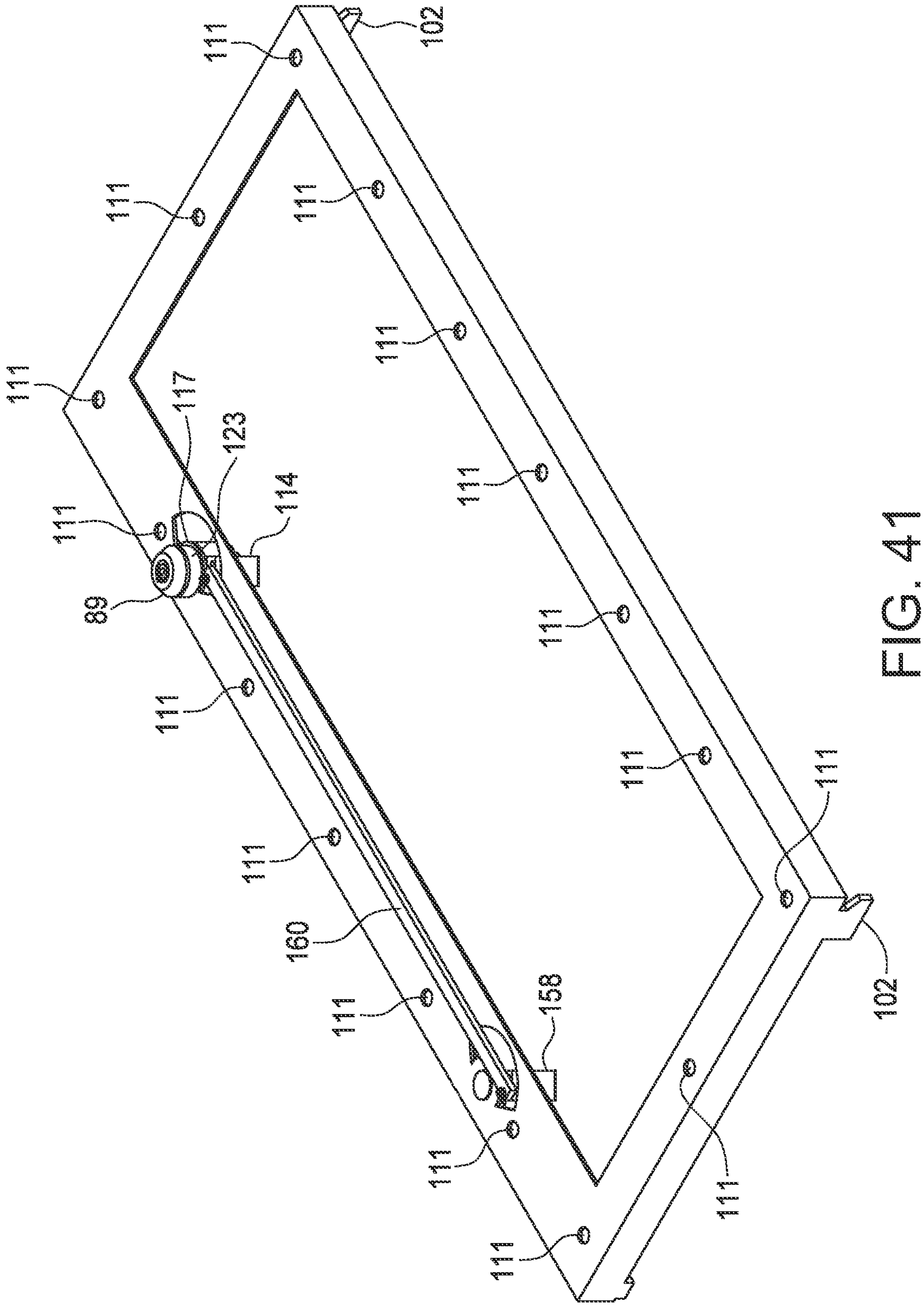
FIG. 41 is a left rear top perspective view of the cover insert member.

In one embodiment, chip rack 210 is attached to the playing table through fasteners (not shown), one type of which are passed through apertures such as apertures 70 shown in FIGS. 17A-18. Other structures for attaching chip rack 210 to the playing table are contemplated to be within the scope of this disclosure. Any number of apertures or other connecting apparatus are envisioned.

Cover assembly 60, as discussed above, is ideally comprised of top or cover member 80 and cover insert member 100. Cover insert member 100 nests within cover member 80 (as seen, for example, in FIG. 26) and has associated therewith a locking mechanism to be discussed in more detail below. Cover insert member 100 may employ one or more tabs 102 adapted to engage corresponding notches 74 defined by chip rack 210.

Cover insert member 100 may connect to cover member 80 in any suitable manner, such as by threaded sockets 111' associated with the underside of cover member 80 being engaged by threaded screws or the like after passing said screws or the like through apertures 111 defined by cover insert 100.

Cover insert member 100 defines a pair of arcuate slots 110, 112 therein adapted to permit the rotational movement of respective cam members 114, 154, respectively. Lock mechanism 89 is connected to cover insert 100 via aperture loop 117 defined by cover insert 100 by passing the barrel of lock 89 therethrough and securing nut 118 to threaded post 119 of lock 89 (threaded post 150 of cam 154), thereby sandwiching cam 114 in place with respect to lock 89. A spacer such as cylindrical collar 121 may be used along with nut 122, which can be threadingly engaged to threads 123 on the exterior wall of the barrel of lock 89.

Cam 114 defines a lock tab 130 at one end thereof which is adapted to be rotatable with cam 114 into and out of engagement with an appropriate receiving slot such as slot 140 defined by sidewall 212 of chip rack 210 (shown in FIGS. 17A-24 and 43-47). In the alternative, or in addition thereto, tab 130 may engage a corresponding slot or other receptacle (not shown) defined by the playing table.

Rack 10 defines a card receiving area 20, which may be comprised of a slightly lowered area 22, which may or may not have a beveled leading edge 24. Sidewalls 12 of chip rack 10 may be of any width desired, the embodiment shown herein including a slightly wider wall width on the player position-facing side 26.

A linkage member, such as link 160, is preferably connected to the upper ends 115, 155 of first and second cams 114, 154. Any suitable fasteners, such as screws 161, may be employed to connect link 160 to first and second cam members 114, 154. In this way, when lock mechanism 89 is rotated, it causes first locking cam 114 to rotate as well, which causes link 160 to drive second locking cam 154 in the same manner. In this way, locking tabs 130, 158 can be caused to be placed into and out of locking engagement with slots 140, 160 of chip rack 210 (or corresponding slots or cutouts in the playing table) (not shown).

Cover insert 100 may be connected to cover member 80 in any suitable manner, such as by the use of fasteners which can be threaded into or otherwise connected to corresponding sockets 111' in the underside of cover member 80 after being passed through corresponding apertures 111 defined cover insert 100. Any other manner of securing cover insert member 100 to cover 80 is contemplated to be within the scope of the disclosure.

Figure 42:
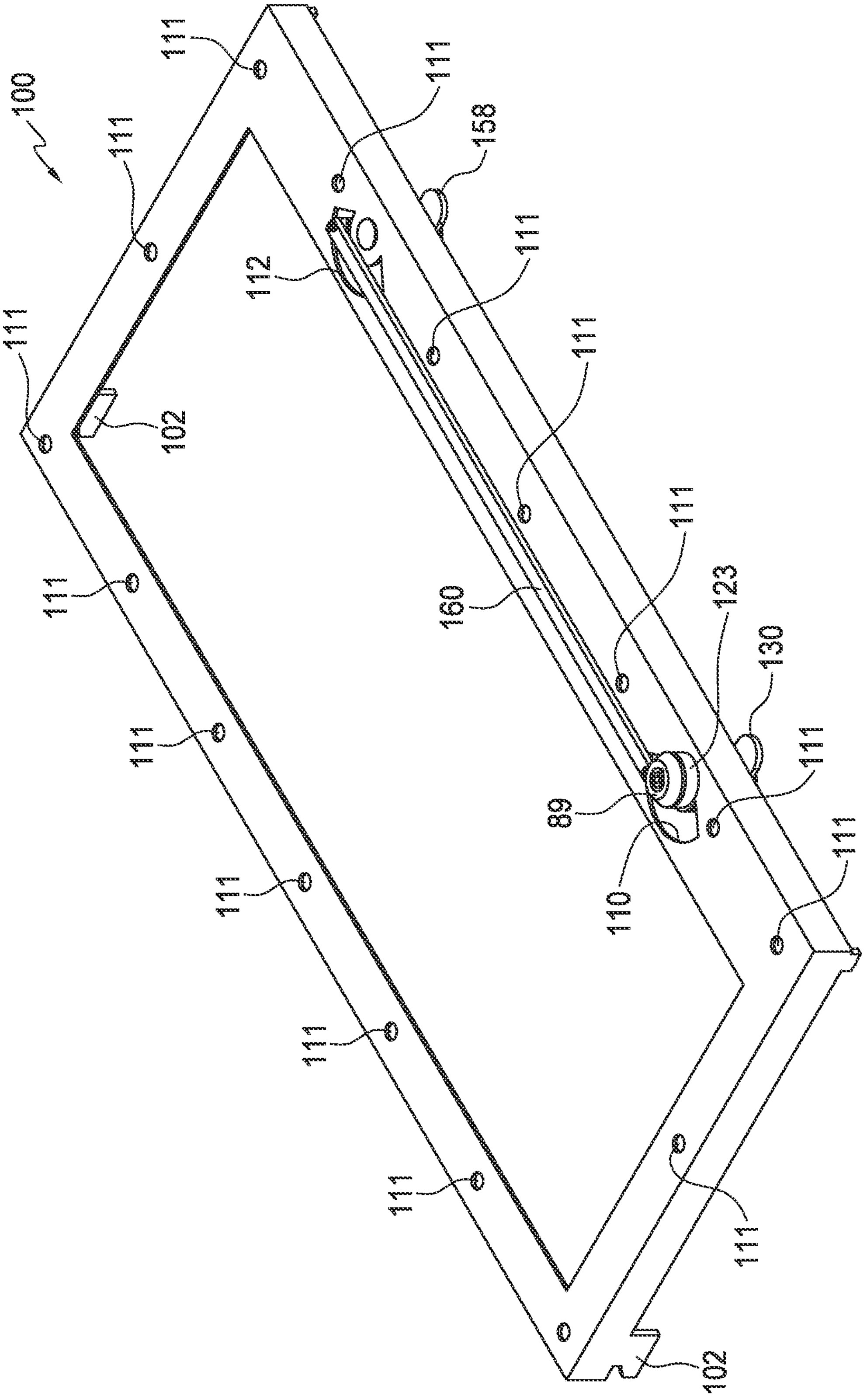
FIG. 42 is a right top front perspective view thereof.
Figure 43:
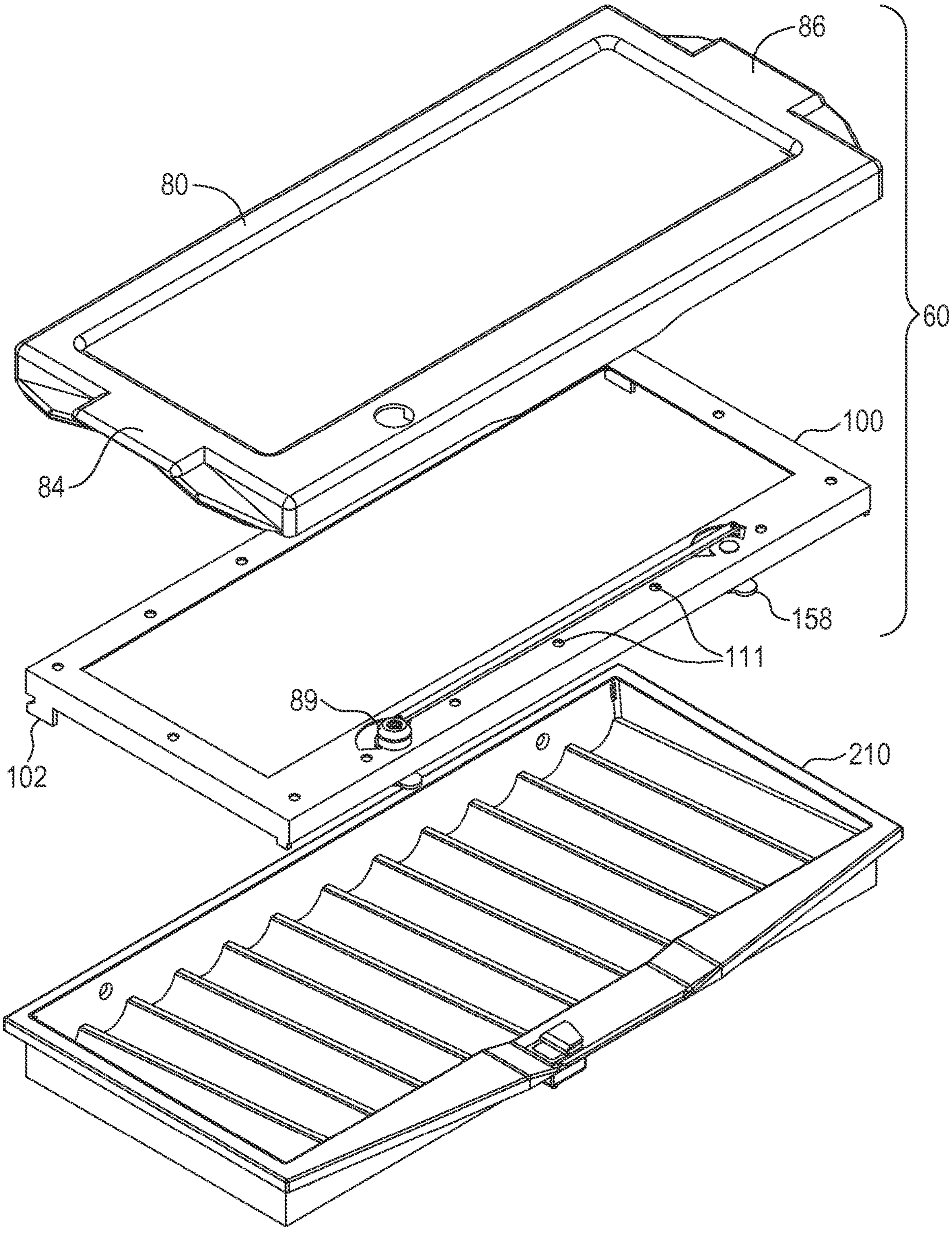
FIG. 43 is an exploded right front perspective view of the chip rack and integrated hole card reader along with the cover assembly.
Figure 44:
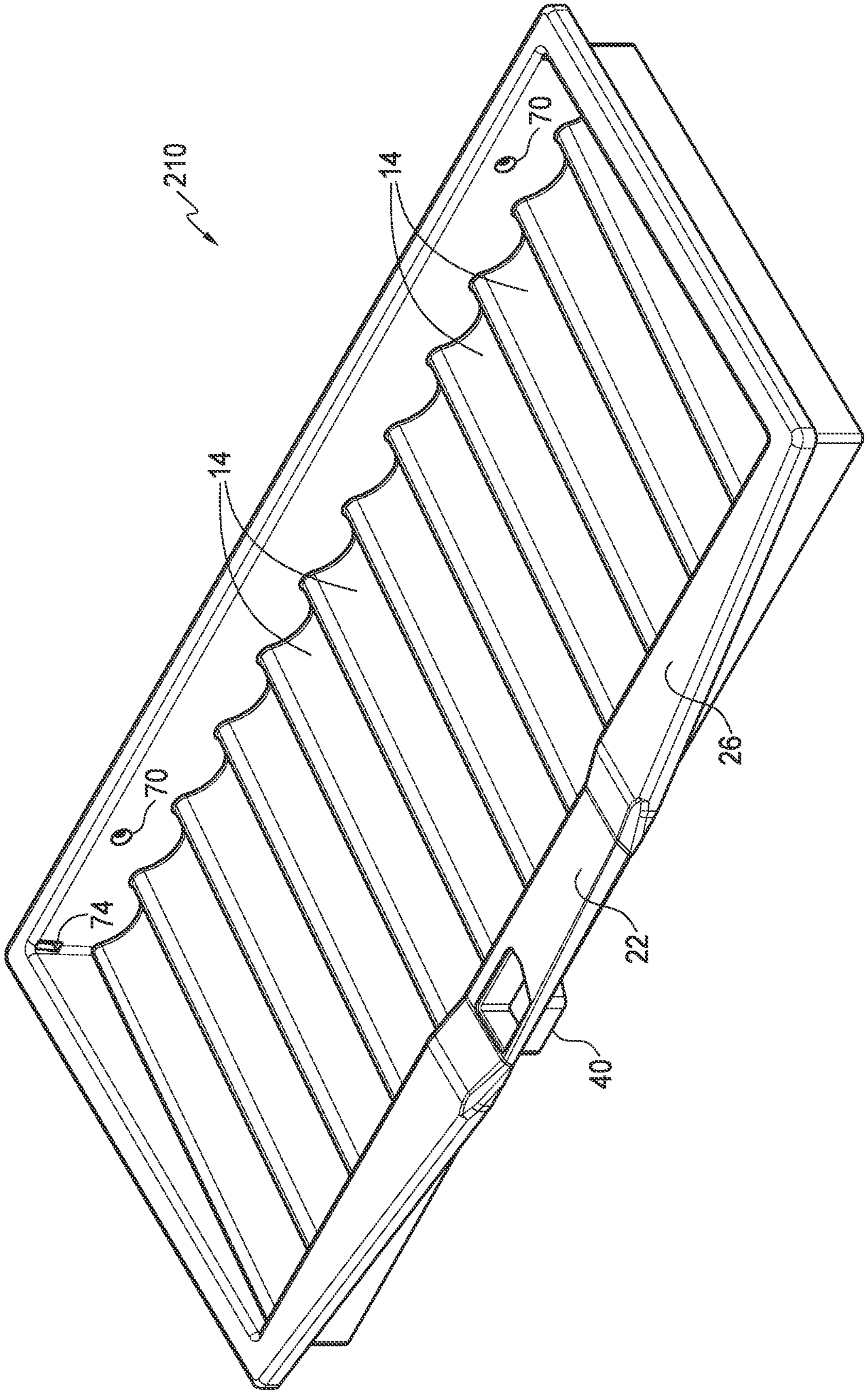
FIG. 44 is a left front top perspective view of another chip rack suitable for use with the cover assembly shown in FIGS. 17-43 with the hole card reader removed therefrom.
Figure 45:
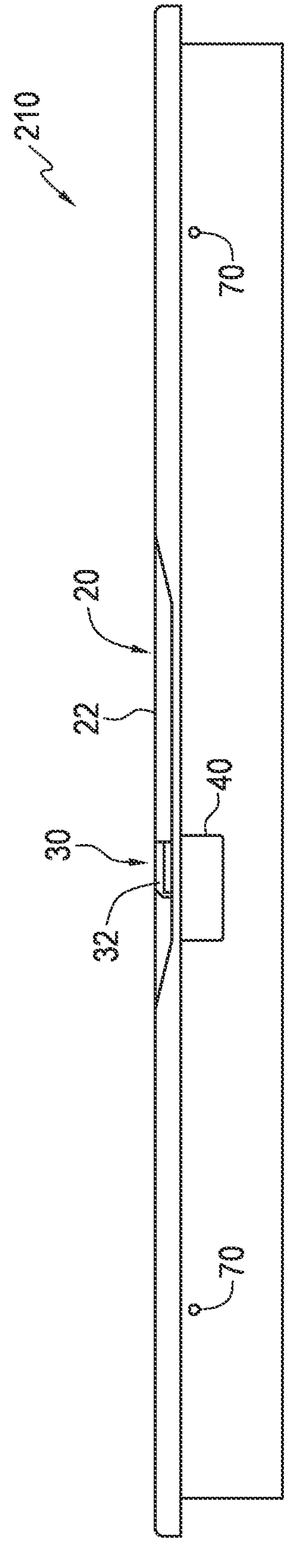
FIG. 45 is a front elevational view thereof.
Figure 46:
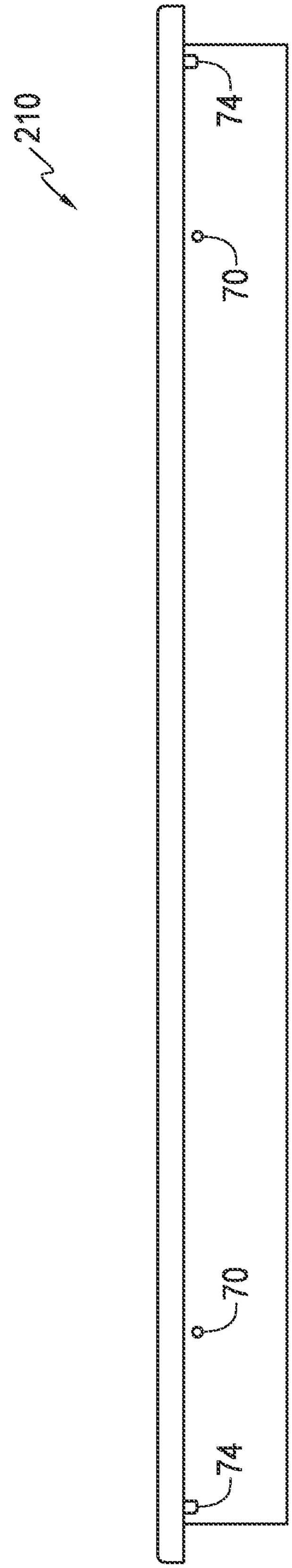
FIG. 46 is a rear elevational view thereof.
Figure 47:
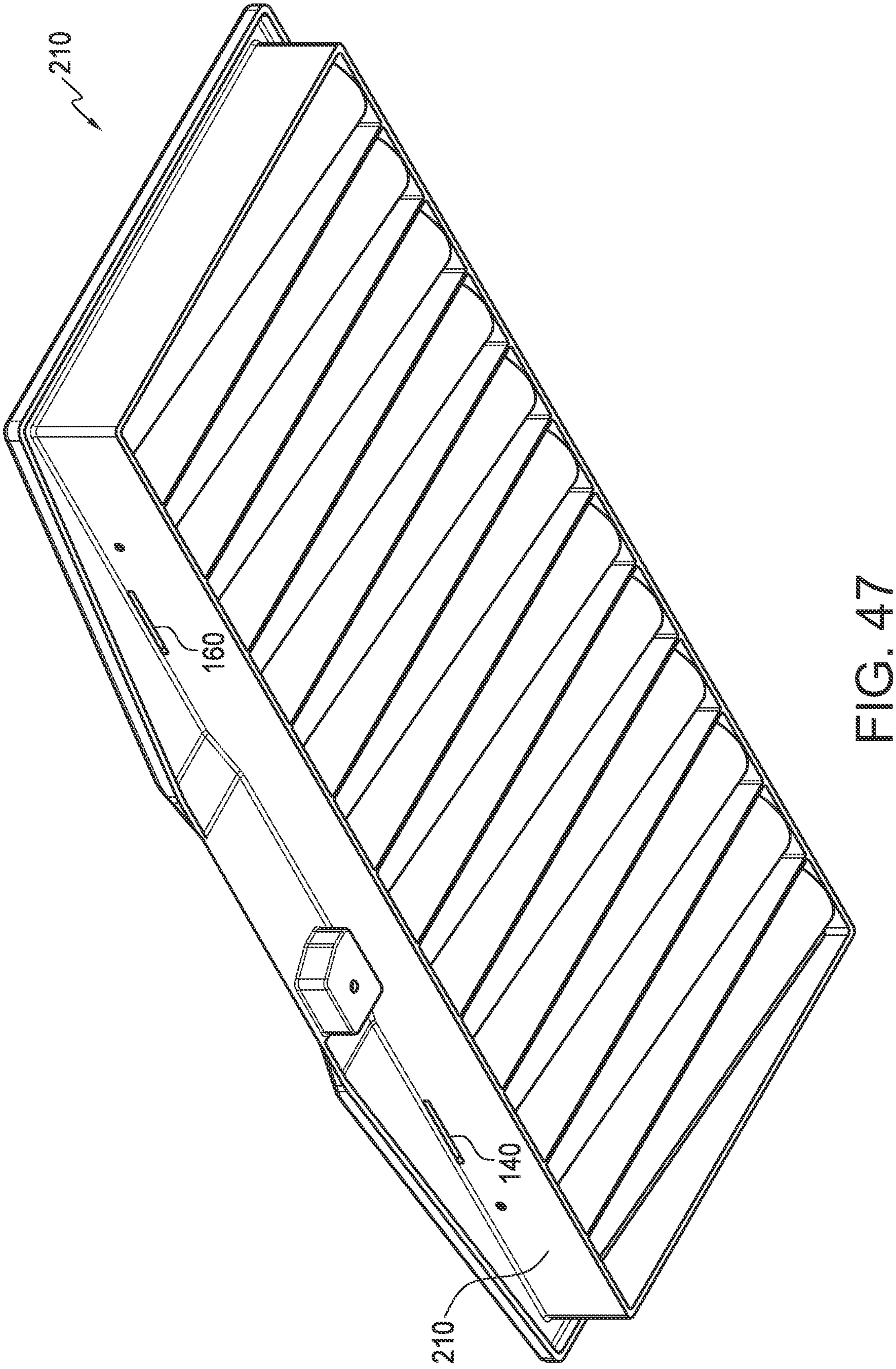
FIG. 47 is a bottom left front perspective view thereof.
Figure 48:
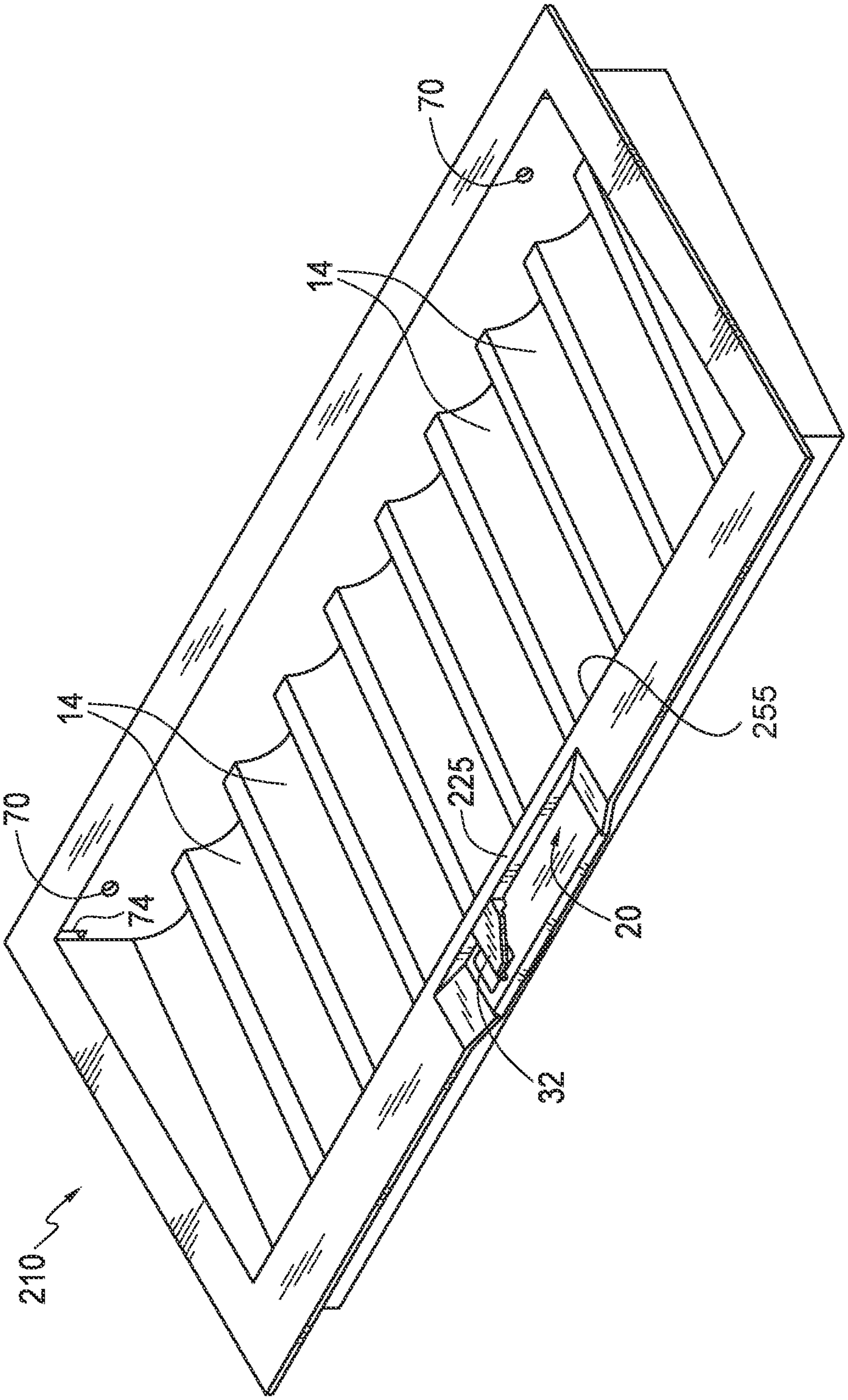
FIG. 48 is a left front top perspective view of an integrated chip rack and hole card reader.
Figure 49:
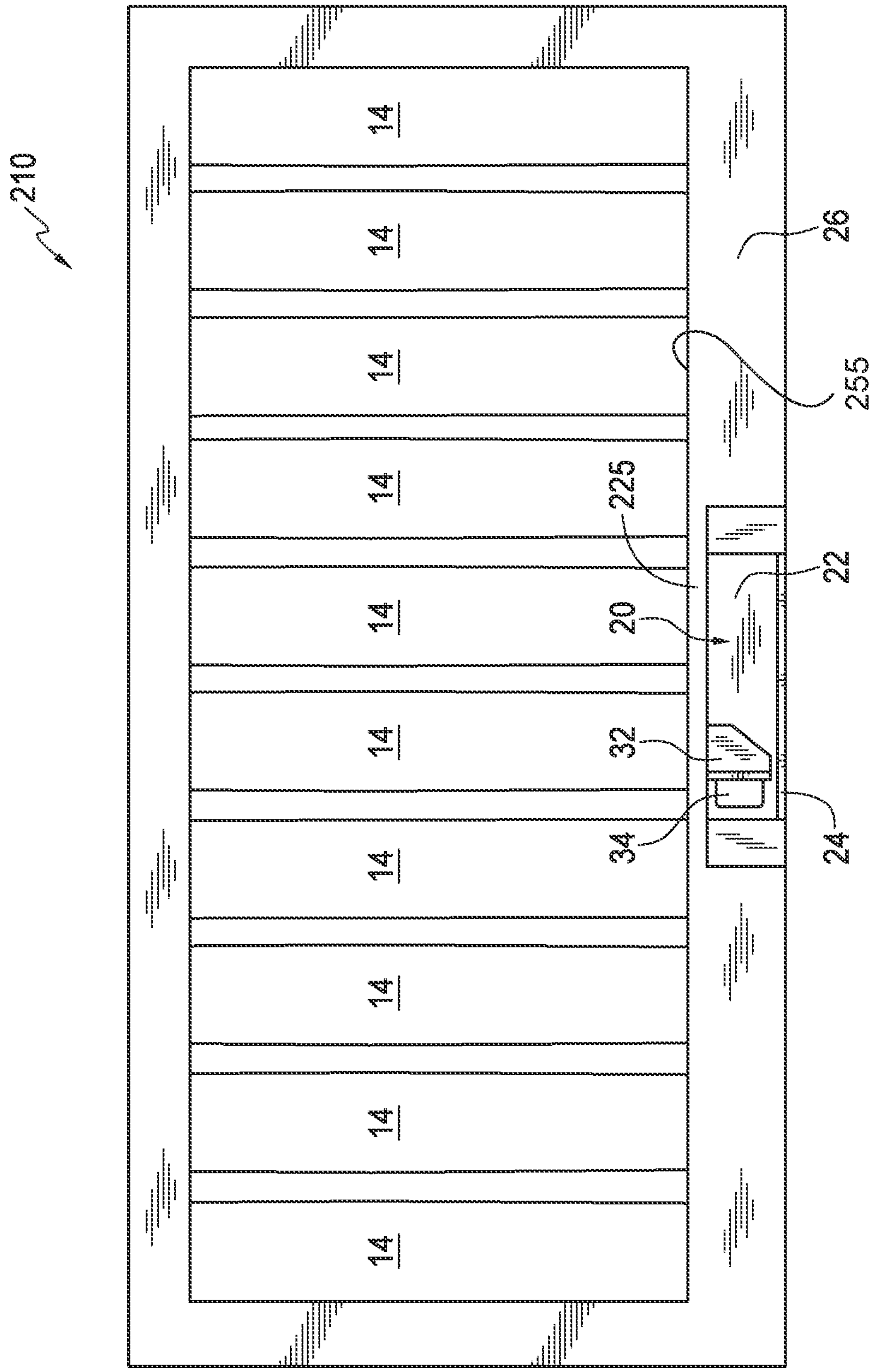
FIG. 49 is a top plan view thereof.
Figure 50:
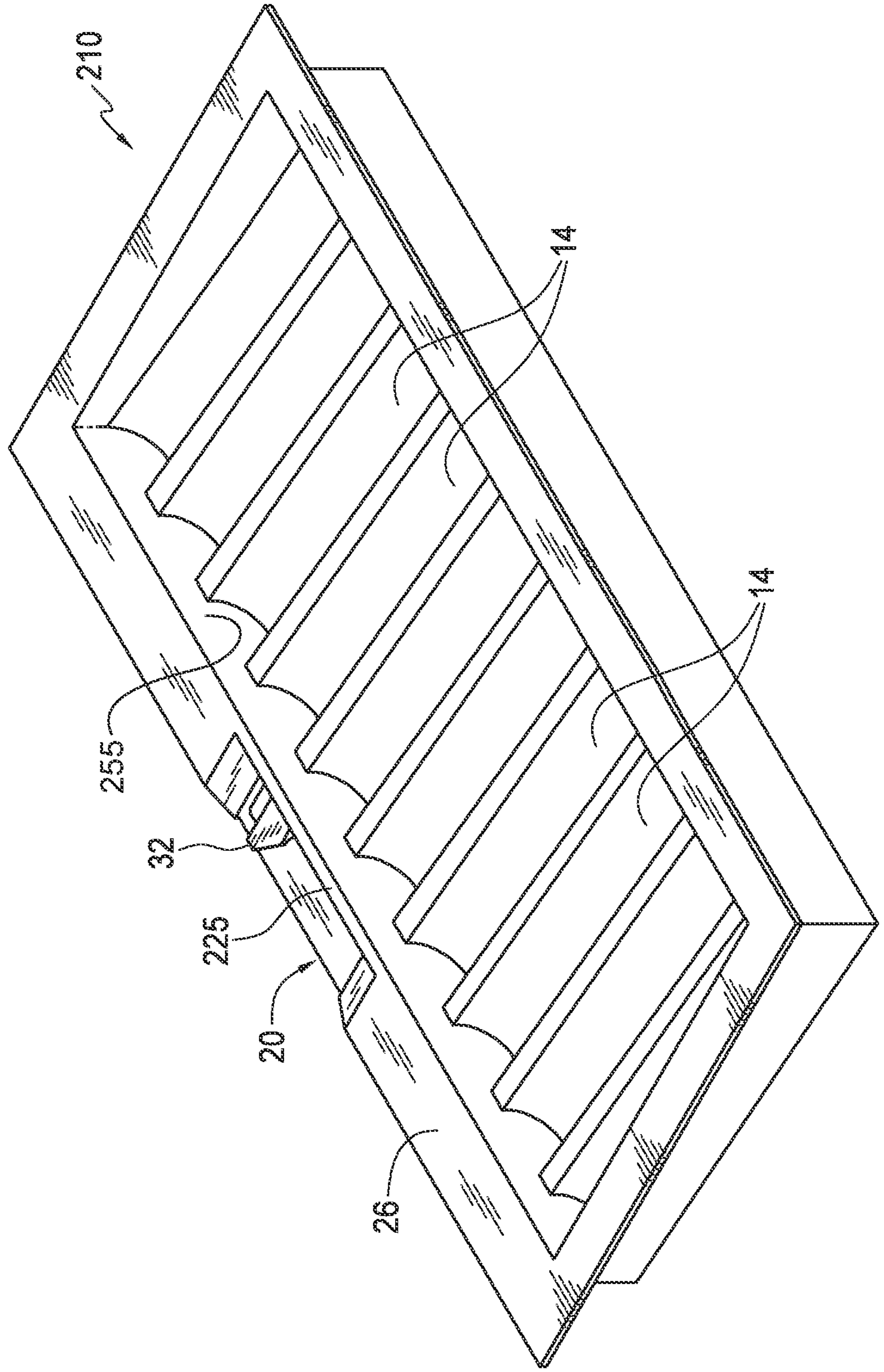
FIG. 50 is a left rear top perspective view thereof.
Figure 51:
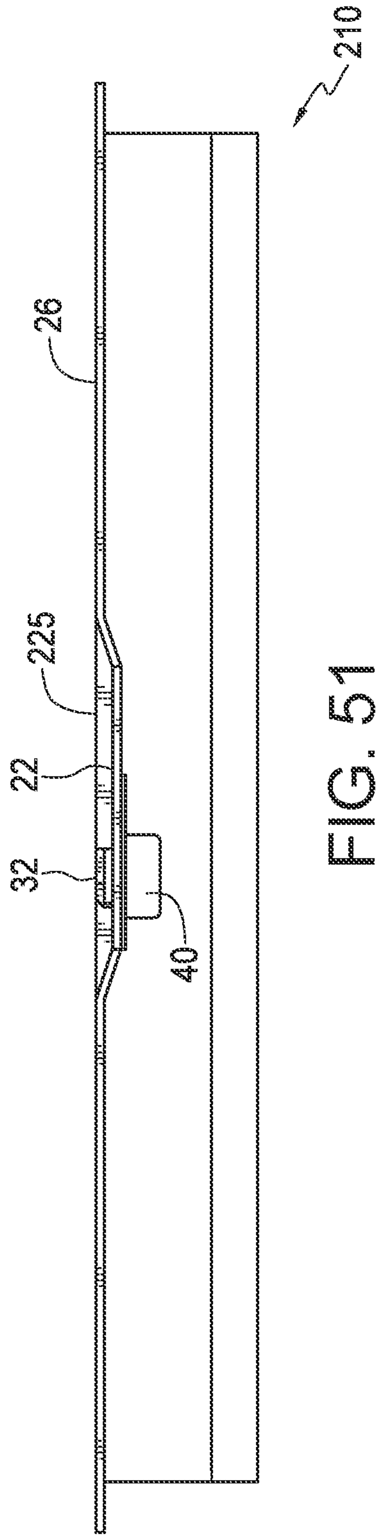
FIG. 51 is a front elevational view thereof.
Figure 52:
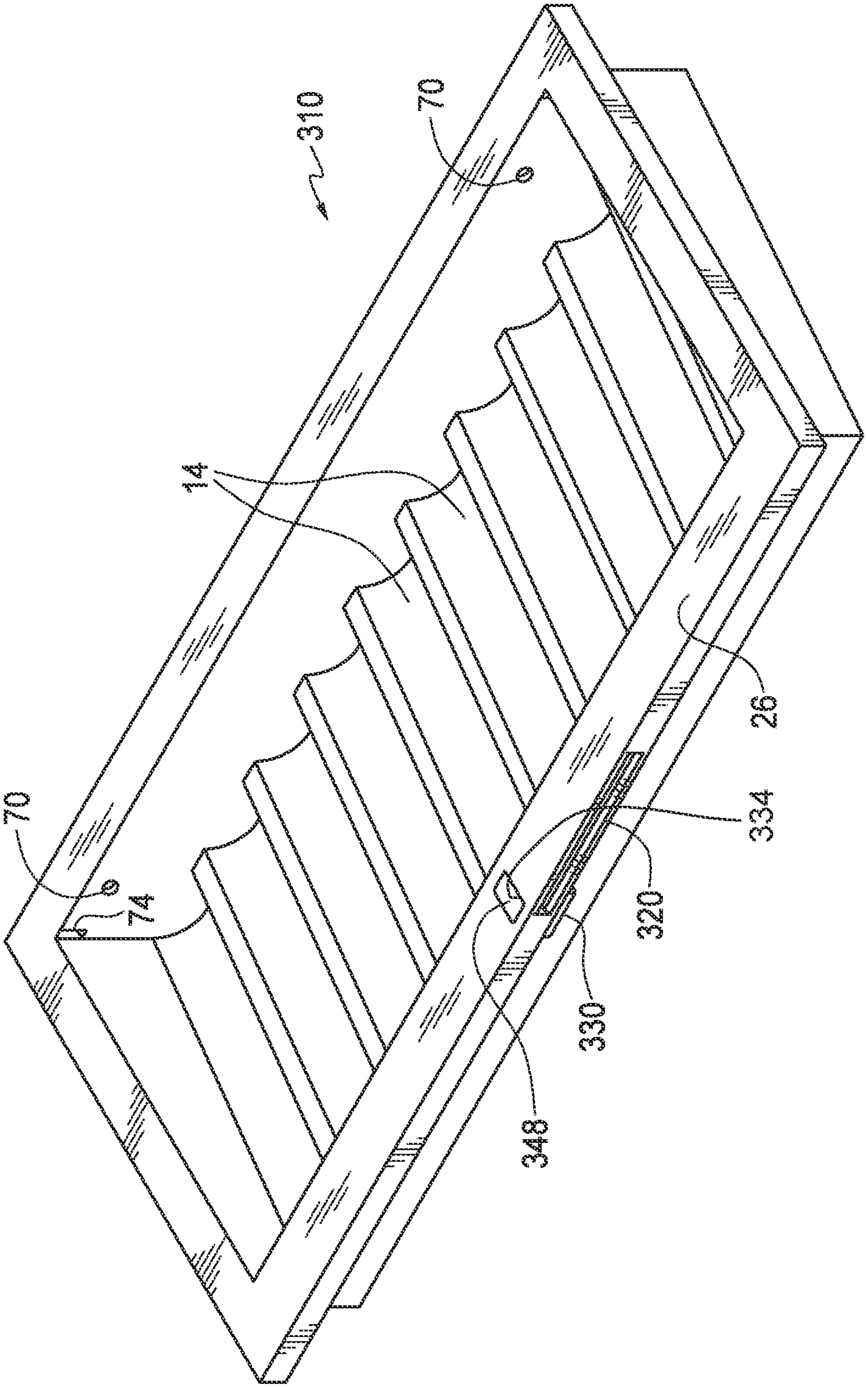
FIG. 52 is a left front top perspective view of an alternative embodiment of an integrated chip rack and hole card reader.
Figure 53:
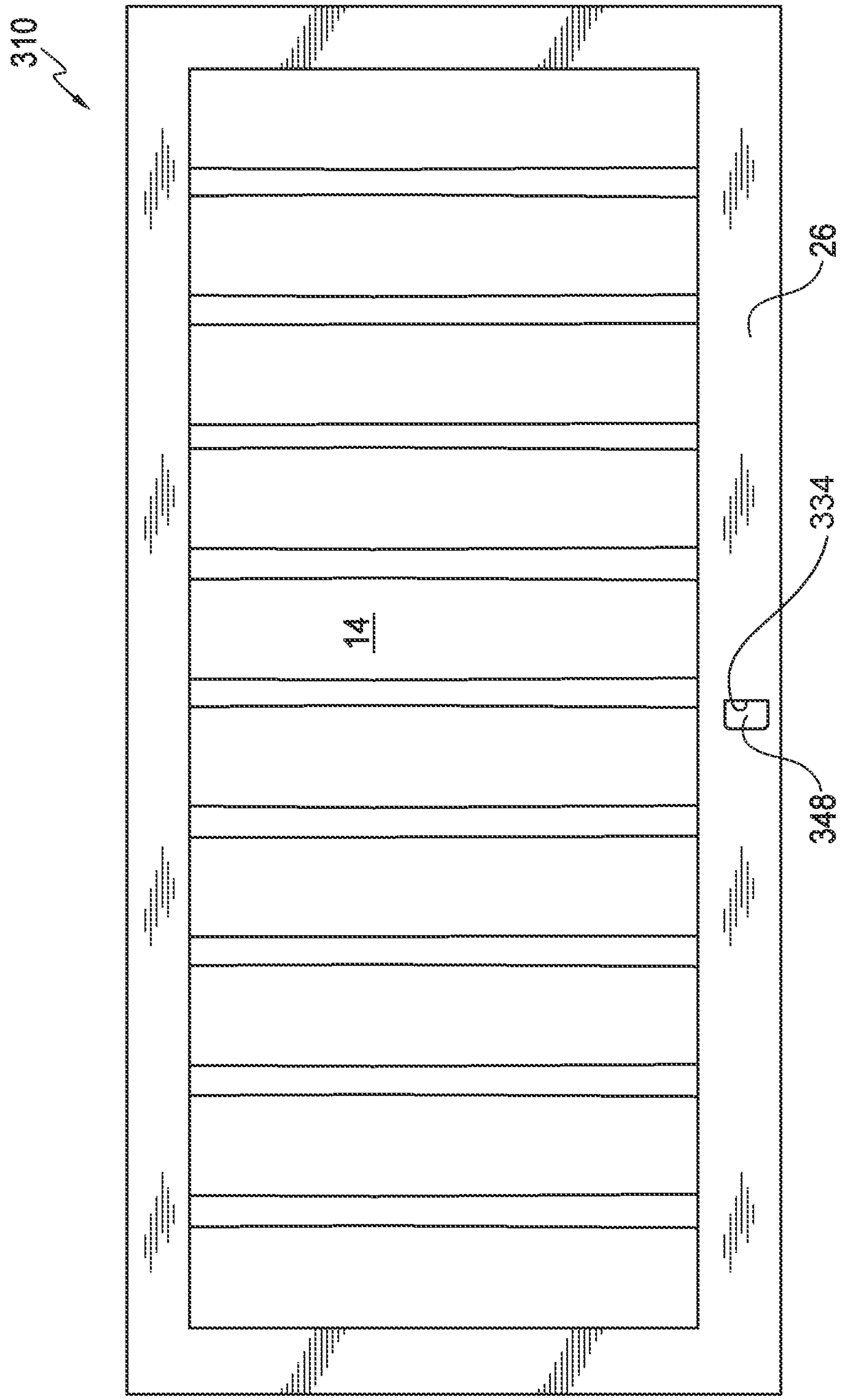
FIG. 53 is a top plan view thereof.
Figure 54:
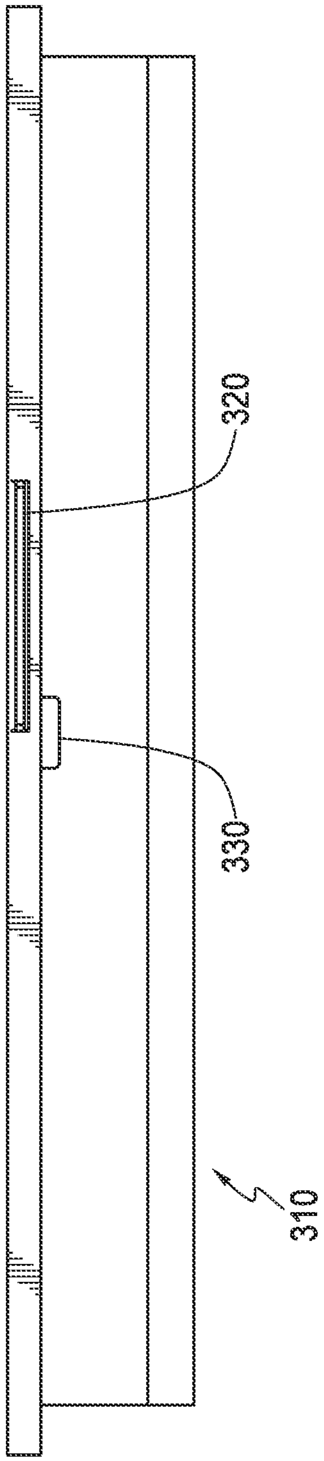
FIG. 54 is a front elevational view thereof.
Figure 55:
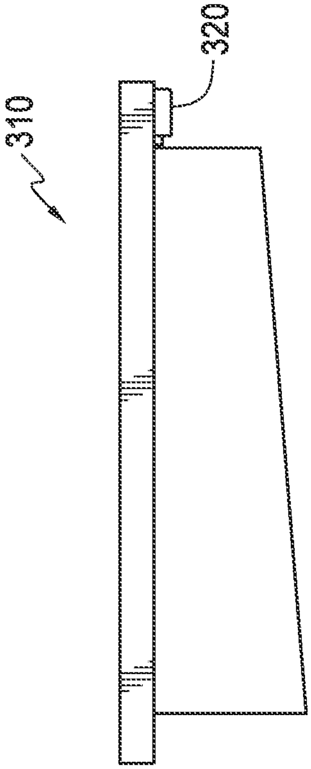
FIG. 55 is a right side elevational view thereof.
Figure 56:
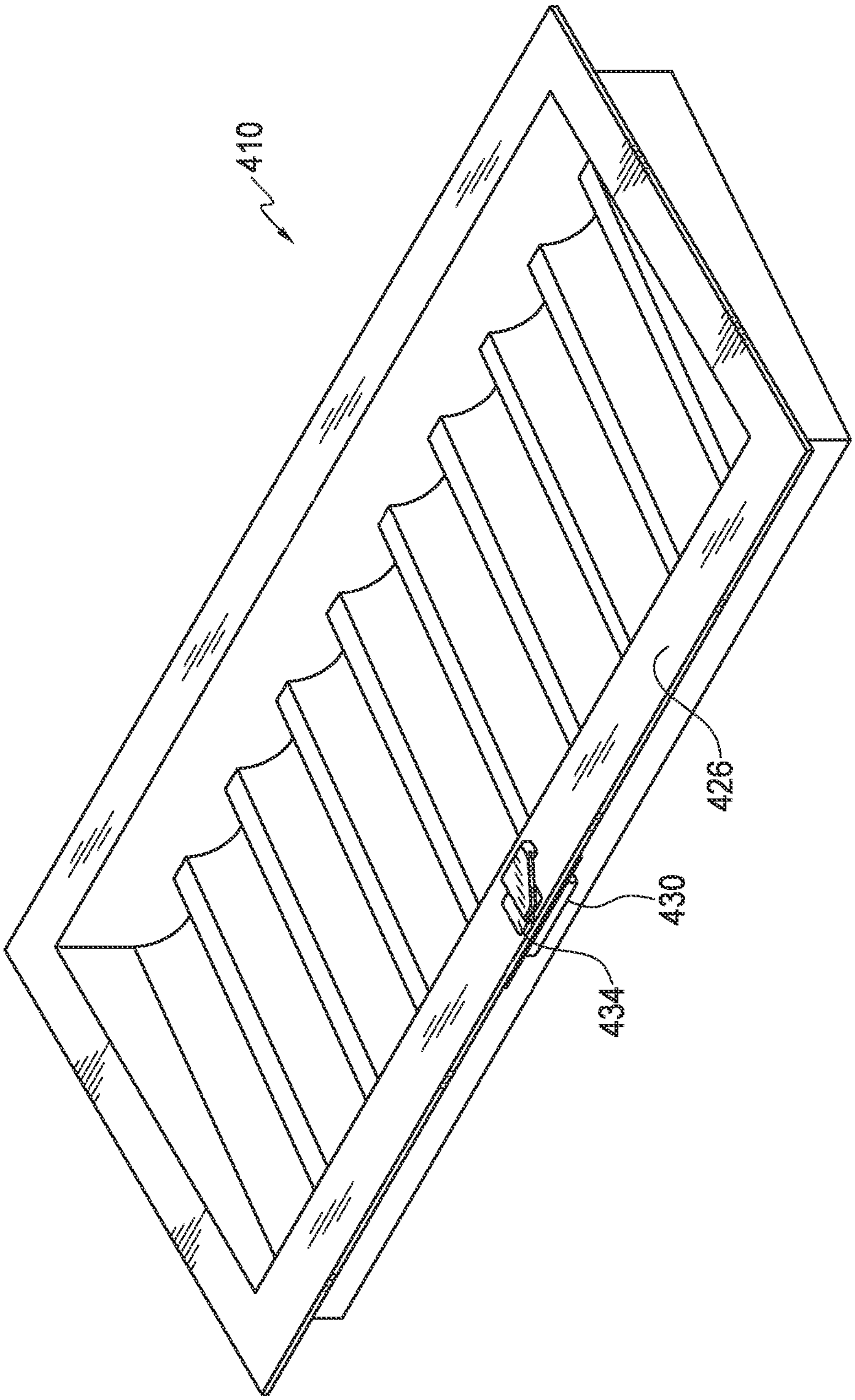
FIG. 56 is atop left front perspective view of a further alternative embodiment of a chip rack and integrated hole care reader.
Figure 57:
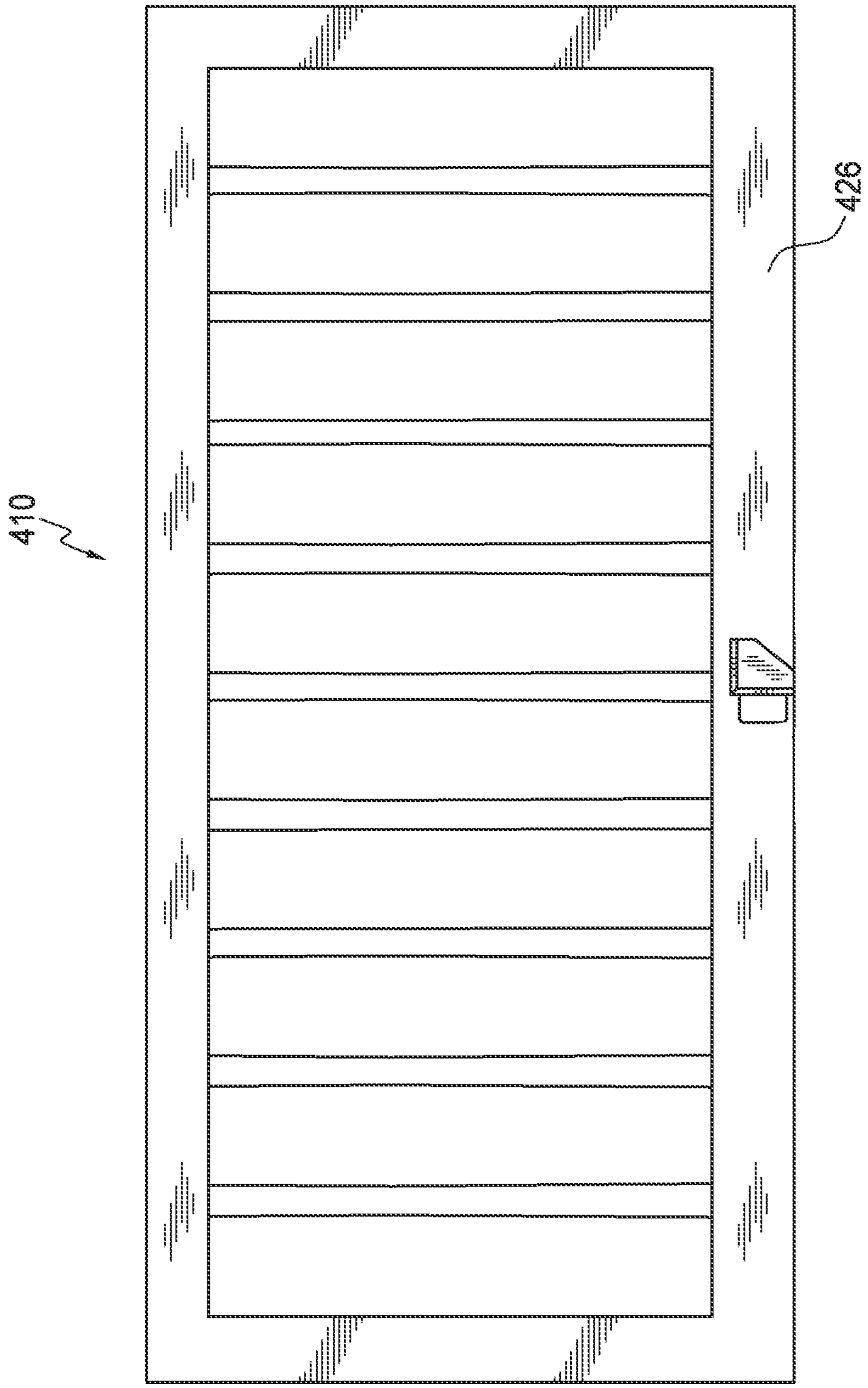
FIG. 57 is a top plan view thereof.
Figure 58:
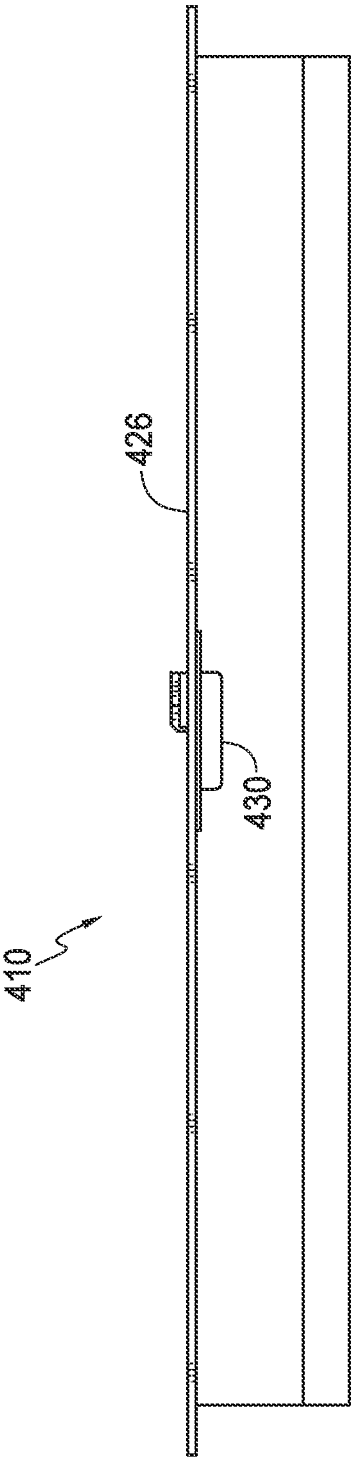
FIG. 58 is a front elevational view thereof.
Figure 59:
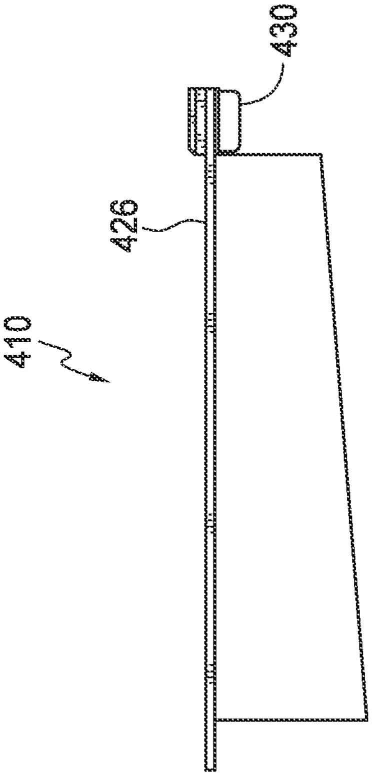
FIG. 59 is a right side elevational view thereof.

Link 160 may be located above or below the upper surface 101 of cover insert member 100 (shown in FIG. 42). The location of link 160 above surface 101 was chosen because locating link 160 in this manner places it between cover member 80 and cover insert member 100, such that it is not able to contact any of the contents of chip rack 210 while it and the first and second locking cams 114, 154 are being moved to lock and unlock cover 60, and is more pleasing aesthetically.

Upper housing section 46 defines aperture 48 through which the dealer may view the reflected portion of his or her down card to be read when the down card is placed in registry with aperture 46. Top piece 32 and upper housing section 46 define a slot 33 into which may be placed the dealer's down card. However, neither top piece 32 nor slot 33 are necessary elements of the functional aspects of the disclosure.

Mounting means such as bracket or pocket 40 may be employed to secure reader 30 to rack 10. Bracket 40 defines a lower aperture through which is passed a fastener such as bolt 37. Thereafter, a fastener such as nut 41 may be threaded thereon to removably connect reader 30 to rack 10. Other structure for mounting reader 30 to rack 10 will occur to those of skill in the art after having the benefit of reviewing this disclosure.

FIGS. 52-55 depict another modified chip rack 310 in accordance with this disclosure. In this embodiment, card reader prism 334 is integrated within top wall 26 of chip rack 310, and playing cards can be placed at least partially in registry with at least a portion of prism 334 through which a dealer can view said portion of a downwardly facing playing card.

FIGS. 55-59 depict yet another modified embodiment of a chip rack 410 of this disclosure, in which a hole card reader 430 is permanently or removably integrated into chip rack 410 in such a manner that upper wall 426 of chip rack 410 is substantially coplanar. Wall 426 defines an aperture in which prism 434 may reside to facilitate reading of cards as discussed previously. Again, this modification is for esthetic purposes only as it provides a pleasing and streamlined appearance.

Figure 60:
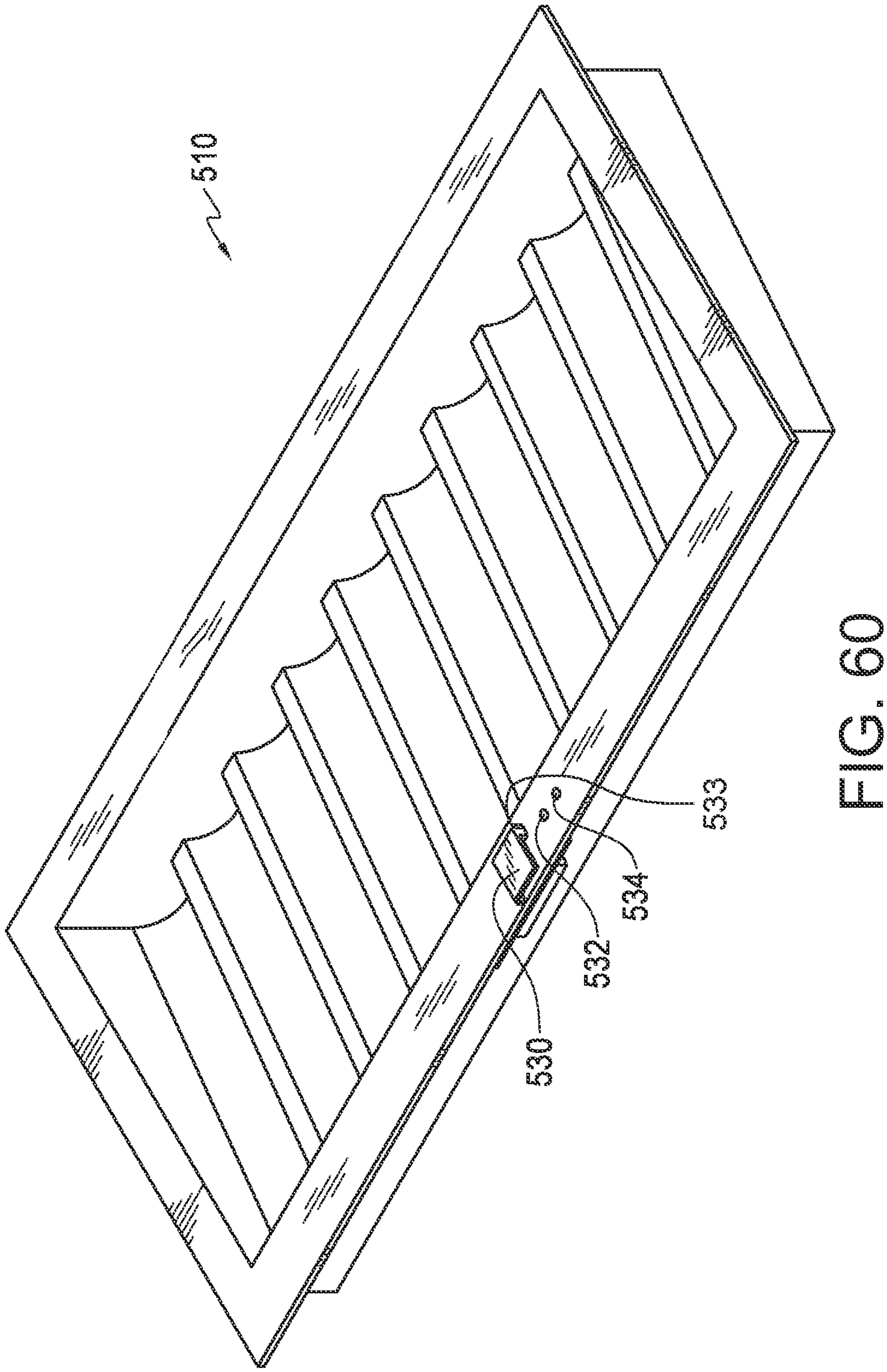
FIG. 60 is a still further alternative embodiment of an integrated chip rack and hole card reader.

FIG. 60 depicts a still further modified variation of the chip rack of this disclosure. In this embodiment, a digital hole card reader such as digital reader 530 is integrated, either removably or permanently, with chip rack 510. Indicator lights, such as lights 532 and 534, or other indication apparatus, such as an audible sound generator, are activated by reader 530 in accordance with pre-determined programming within reader 530, or in accordance with an electrical circuit associated with reader 530. Any of the known digital hole card readers, or compatible apparatus, may be employed in this embodiment, such as the reader taught by U.S. Pat. No. 5,110,134 to Laughlin. It is to be understood that a digital reader, such as reader 530 and indicator lights 532, 534, may be utilized with any of the chip racks disclosed herein, and may also be utilized with cover apparatus 60.

Moreover, cover apparatus 60 may be employed with any embodiment of the chip racks disclosed herein or those chip racks which do not employ a hole card reader, which will become apparent to those of skill in the art after having the benefit of reading this disclosure.

FIGS. 48 through 51 depict a slightly modified chip rack and integrated hole card reader, wherein a wall 255 is interposed between the card reading area 225 and chip slots 14.

FIGS. 52 through 55 depict a still further embodiment of a chip rack and integrated hole card reader, wherein a card receiving slot 320 is defined by wall 26 of housing 310. A card reader 330 is integrated within wall 26 in such a way that, when a playing card is placed in slot 320, a corner of said card can be read through aperture 348. The arrangement shown in FIGS. 52 through 55 presents a more aesthetically pleasing appearance.

FIGS. 56 through 59 depict yet another chip rack and integrated hole card reader, wherein card reading area 22 is disposed of, such that wall 26 of rack 410 is flat, which also provides a more appealing appearance.

FIG. 60 depicts a further embodiment of an integrated chip rack and hole card reader in which a digital hole card reader is incorporated into the chip rack. In this embodiment, a digital reader such as reader 530 is incorporated with rack 510 in such that a card, or portion thereof, that is placed in registry with an aperture 533 in wall 26 will be electronically read or sensed and the value of the card determined. If the dealer has a blackjack pair, blackjack will be indicated by an audible, visible or tactile alarm. One such alarm may be blackjack indicator light 532. If the dealer does not have blackjack, either no alarm is provided or a blackjack absence alarm may be given, such as through blackjack absence indicator light 534.

Benefits, other advantages, and solutions to problems have been described above with regard to specific embodiments of the present disclosure. However, the benefits, advantages, solutions to problems, and any element(s) that may cause or result in such benefits, advantages, or solutions to become more pronounced are not to be construed as a critical, required, or essential feature or element of any or all the claims. The disclosure is defined solely by the appended claims including any amendments made during the pendency of this application and all equivalents of those claims as issued.

What is claimed is:

1. An arrangement comprising:

a chip rack including a plurality of chip-receiving slots and a front wall extending outward from the plurality of chip-receiving slots, the plurality of chip-receiving slots being positioned between a dealer and the front wall; and a hole card reader located in line with the front wall and oriented to receive the dealer's down card for reading a portion thereof, wherein the hole card reader is located in the front wall and wherein the front wall includes a pair of side sections and a center section between the pair of side sections, the center section being recessed relative to the pair of side sections, the hole card reader being located in the center section.

2. The arrangement of claim 1, wherein the hole card reader is removably mounted to the front wall.

3. The arrangement of claim 1, wherein the hole card reader is permanently integrated with the front wall.

4. The arrangement of claim 1, wherein the front wall includes a beveled leading edge over which the dealer's down card is slid.

5. The arrangement of claim 1, wherein the hole card reader includes an aperture through which the portion of the dealer's down card is viewable by the dealer.

6. The arrangement of claim 5, wherein the hole card reader includes an element to refract or reflect an image of the portion of the dealer's down card when placed in registry with the aperture.

7. The arrangement of claim 5, wherein the hole card reader includes a housing section and a top piece coupled to the housing section, the housing section defining the aperture, the top piece and the housing section defining a slot configured to receive the dealer's down card.

8. The arrangement of claim 1, wherein the hole card reader is configured to detect an aspect of the dealer's down card to give rise to an output signal indicating whether the dealer has a blackjack.

9. The arrangement of claim 8, further including an indicator mounted to the front wall and configured to activate an audible, visual, or tactile alarm in response to a value of the dealer's down card determined by the hole card reader.

10. An arrangement comprising:

a chip rack including a plurality of chip-receiving slots and a front wall extending outward from the plurality of chip-receiving slots, the plurality of chip-receiving slots being positioned between a dealer and the front wall; and a hole card reader located in line with the front wall and oriented to receive the dealer's down card for reading a portion thereof, wherein the hole card reader is located in the front wall and wherein the front wall includes a beveled leading edge over which the dealer's down card is slid.

11. The arrangement of claim 10, wherein the hole card reader is removably mounted to the front wall.

12. The arrangement of claim 10, wherein the hole card reader is permanently integrated with the front wall.

13. The arrangement of claim 10, wherein the front wall includes a pair of side sections and a center section between the pair of side sections, the center section being recessed relative to the pair of side sections, the hole card reader being located in the center section.

14. The arrangement of claim 10, wherein the hole card reader includes an aperture through which the portion of the dealer's down card is viewable by the dealer.

15. The arrangement of claim 14, wherein the hole card reader includes an element to refract or reflect an image of the portion of the dealer's down card when placed in registry with the aperture.

16. The arrangement of claim 14, wherein the hole card reader includes a housing section and a top piece coupled to the housing section, the housing section defining the aperture, the top piece and the housing section defining a slot configured to receive the dealer's down card.

17. The arrangement of claim 10, wherein the hole card reader is configured to detect an aspect of the dealer's down card to give rise to an output signal indicating whether the dealer has a blackjack.

18. The arrangement of claim 17, further including an indicator mounted to the front wall and configured to activate an audible, visual, or tactile alarm in response to a value of the dealer's down card determined by the hole card reader.

19. An arrangement comprising:

a chip rack including a plurality of chip-receiving slots and a pair of front wall side sections extending outward from the plurality of chip-receiving slots, the plurality of chip-receiving slots being positioned between a dealer and the pair of front wall side sections; and a hole card reader located between and in line with the pair of front wall side sections, the hole card reader oriented to receive the dealer's down card for reading a portion thereof, the arrangement further including a front wall center section located between and in line with the pair of front wall side sections and connected to the pair of front wall side sections, the hole card reader being located in the front wall center section and wherein the front wall center section is recessed relative to the pair of front wall side sections.

20. The arrangement of claim 19, wherein the hole card reader is removably mounted to the front wall center section.

21. The arrangement of claim 19, wherein the front wall includes a beveled leading edge over which the dealer's down card is slid.

22. The arrangement of claim 19, wherein the hole card reader includes an aperture through which the portion of the dealer's down card is viewable by the dealer.

23. The arrangement of claim 22, wherein the hole card reader includes an element to refract or reflect an image of the portion of the dealer's down card when placed in registry with the aperture.

24. The arrangement of claim 22, wherein the hole card reader includes a housing section and a top piece coupled to the housing section, the housing section defining the aperture, the top piece and the housing section defining a slot configured to receive the dealer's down card.

25. The arrangement of claim 19, the hole card reader is configured to detect an aspect of the dealer's down card to give rise to an output signal indicating whether the dealer has a blackjack.

26. An arrangement comprising:

a chip rack including a plurality of chip-receiving slots and a pair of front wall side sections extending outward from the plurality of chip-receiving slots, the plurality of chip-receiving slots being positioned between a dealer and the pair of front wall side sections; and a hole card reader located between and in line with the pair of front wall side sections, the hole card reader oriented to receive the dealer's down card for reading a portion thereof, the arrangement further including a front wall center section located between and in line with the pair of front wall side sections and connected to the pair of front wall side sections, the hole card reader being located in the front wall center section and wherein the front wall includes a beveled leading edge over which the dealer's down card is slid.

27. The arrangement of claim 26, wherein the hole card reader is removably mounted to the front wall center section.

28. The arrangement of claim 26, wherein the front wall center section is recessed relative to the pair of front wall side sections.

29. The arrangement of claim 26, wherein the hole card reader includes an aperture through which the portion of the dealer's down card is viewable by the dealer.

30. The arrangement of claim 29, wherein the hole card reader includes an element to refract or reflect an image of the portion of the dealer's down card when placed in registry with the aperture.

31. The arrangement of claim 29, wherein the hole card reader includes a housing section and a top piece coupled to the housing section, the housing section defining the aperture, the top piece and the housing section defining a slot configured to receive the dealer's down card.

32. The arrangement of claim 26, the hole card reader is configured to detect an aspect of the dealer's down card to give rise to an output signal indicating whether the dealer has a blackjack.

* * * * *